United States Patent
Mizrah

(10) Patent No.: US 8,627,088 B2
(45) Date of Patent: Jan. 7, 2014

(54) SYSTEM AND METHOD FOR IN- AND OUT-OF-BAND MULTI-FACTOR SERVER-TO-USER AUTHENTICATION

(75) Inventor: Len L. Mizrah, San Carlos, CA (US)

(73) Assignee: Authernative, Inc., Redwood City, CA (US)

( * ) Notice: Subject to any disclaimer, the term of this patent is extended or adjusted under 35 U.S.C. 154(b) by 489 days.

(21) Appl. No.: 12/703,685

(22) Filed: Feb. 10, 2010

(65) Prior Publication Data
US 2011/0197070 A1  Aug. 11, 2011

(51) Int. Cl.
*H04K 1/00* (2006.01)

(52) U.S. Cl.
USPC ............................. 713/176; 726/4; 709/203

(58) Field of Classification Search
USPC ............................. 713/176; 726/4; 709/203
See application file for complete search history.

(56) References Cited

U.S. PATENT DOCUMENTS

| | | | |
|---|---|---|---|
| 5,434,918 A | 7/1995 | Kung et al. | |
| 7,047,408 B1 | 5/2006 | Boyko et al. | |
| 7,073,067 B2 | 7/2006 | Mizrah | |
| 7,082,532 B1 | 7/2006 | Vick et al. | |
| 7,188,314 B2 | 3/2007 | Mizrah | |
| 7,266,693 B1 | 9/2007 | Potter et al. | |
| 7,506,161 B2 | 3/2009 | Mizrah | |
| 7,533,257 B2 | 5/2009 | Lee et al. | |
| 7,552,330 B2 | 6/2009 | Kokumai | |
| 7,577,987 B2 | 8/2009 | Mizrah | |
| 7,644,433 B2 | 1/2010 | Mizrah | |
| 7,853,794 B2 | 12/2010 | Jeffries et al. | |
| 8,006,300 B2 * | 8/2011 | Mizrah | ............................. 726/20 |
| 2007/0037552 A1 | 2/2007 | Lee et al. | |
| 2008/0072045 A1 | 3/2008 | Mizrah | |
| 2008/0098464 A1 | 4/2008 | Mizrah | |
| 2008/0179401 A1 * | 7/2008 | Hart et al. | ..................... 235/449 |
| 2008/0313726 A1 | 12/2008 | Gardner | |

OTHER PUBLICATIONS

Further Simplifications in Proactive RSA Signatures. Stanis_law Jarecki and Nitesh Saxena UC Irvine, Irvine, CA pp. 1-19.*
"Extended Validation Certificate" from Wikipedia, found at http://en.wikipedia.org/wiki/Extended_Validation_Certificate, as of Feb. 10, 2010, 5 pages.
"Pharming" from Wikipedia, found at http://en.wikipedia.org/wiki/Pharming, as of Feb. 10, 2010, 3 pages.

(Continued)

*Primary Examiner* — Kambiz Zand
*Assistant Examiner* — Ghodrat Jamshidi
(74) *Attorney, Agent, or Firm* — Haynes Beffel & Wolfeld LLP

(57) ABSTRACT

A method to authenticate a server to a client is provided, including in-band and out-of-band techniques. At least a first shared secret identifies a server path, including a plurality of pre-defined locations on a frame of reference (e.g. a grid). An authentication session is initiated upon receiving a client identifier at the server-side resources. A current session instance of the grid is presented to the client, populated with characters. The process includes sharing between the client and the server a challenge identifying a random subset of the plurality of predefined locations in the server path, and a response including characters that match the characters in the locations on the server path identified by the challenge. As a result, client is capable of verifying that the server has access to the first shared secret. Then a protocol is executed to authenticate the client to the server.

42 Claims, 30 Drawing Sheets

(56) References Cited

OTHER PUBLICATIONS

"Phishing" from Wikipedia found at http://en.wikipedia.org/wiki/Phishing as of Feb. 10, 2010, 17 pages.
"Public key certificate" from Wikipedia, found at http://en.wikipedia.org/wiki/Ssl_certificate, as of Feb. 10, 2010, 5 pages.
"SiteKey" from Wikipedia, as of Feb. 10, 2010, found on http://en.wikipedia.org/wiki/Site_key 2 pages.
Anti-Phishing World Group (APWG) "Phishing Activity Trend Report 1st Half 2009," found at http://www.antiphishing.org/reports/apwg_report_h1_2009.pdf, as early as Jan. 2009, 11 pages.
Tec-Ed, Inc. Whitepaper, "Extended Validation and VeriSign Brand," found at http://www.verisign.com/static/040655.pdf. As early as Aug. 28, 2008, 18 pages.

* cited by examiner

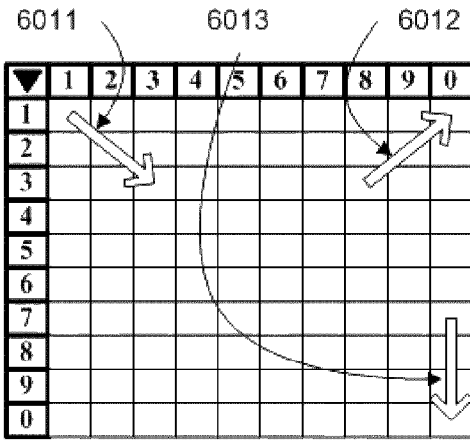
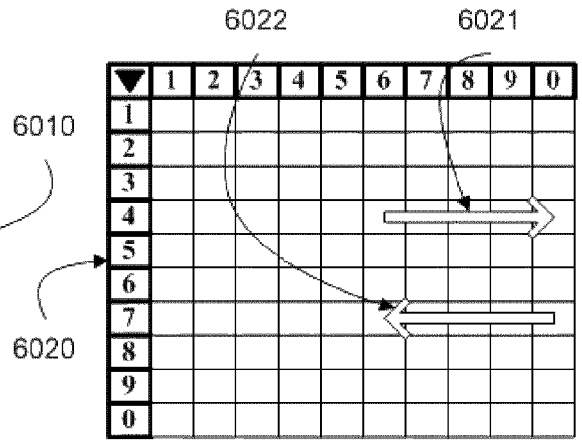
FIG. 6A-1　　FIG. 6B-1
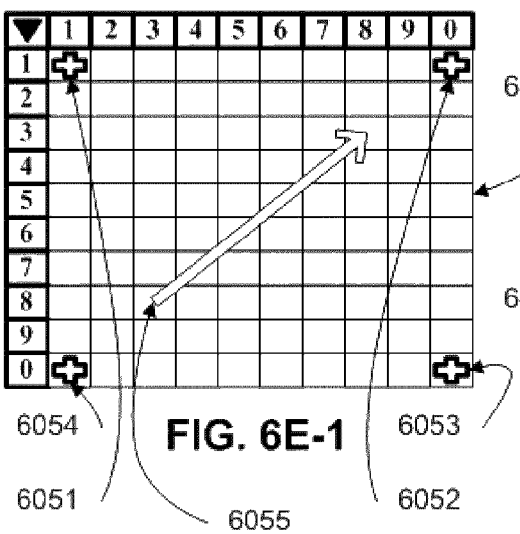
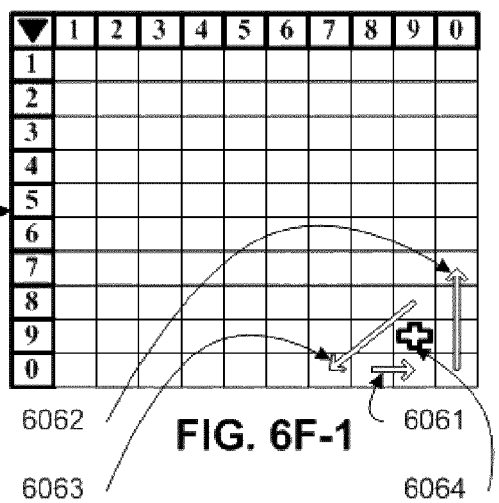
FIG. 6C-1　　FIG. 6D-1
FIG. 6E-1　　FIG. 6F-1

SYSTEM AND METHOD FOR IN- AND OUT-OF-BAND MULTI-FACTOR SERVER-TO-USER AUTHENTICATION

BACKGROUND OF THE INVENTION

1. Field of the Invention

The invention relates generally to client (or a user at a client platform)/server multi-factor mutual authentication systems and methods for computer and network security access control systems employing Random Partial Shared Secret Recognition (RPSSR) algorithms with a focus on in- and out-of-band multi-factor authentication of a server to the user; and more particularly multi-factor authentication of a server to the user based on virtual reference grids of data with low entropy leakage of user personalized, embedded, and hidden in the grid server credentials (entropy leakage per an authentication session), and high resilience against online identity theft attacks like guessing, phishing (using social engineering techniques) and/or pharming attacks.

2. Description of the Related Art

Server Authentication to a User (at a Client Platform)

For both, business-to-consumer (B2C) and business-to-business (B2B) transaction networks, online e- and m-commerce require a certain level of trust between parties to perform a variety of business transactions with typical parties to a transaction being an online consumer or a business representative (a user at a client platform) and a server providing services, applications, and goods. There are user authentication systems integrated with and trusted by servers. So that a user proves one's identity by submitting a user ID (or a username, or an email address, or any other pre-arranged digital identifier) and authentication credential(s) (typically, it is either a PIN, or a password, or a hardware token pass code (PIN+a currently indicated token number in a case of a two-factor authentication). There is a variety of authentication factors, and authentication credentials associated with them, that are used alone or in multi-factor combinations to enhance user authentication security.

The common security feature of these authentication systems is a fundamental reliance on the user/server shared secrets whether it be "what user knows" PINs or passwords, or "what user is" biometric traits like fingerprints or sound bites, or "what user has" like hardware tokens or software tokens on mobile devices. Illegal activities by hackers and criminal organizations utilizing hacker talents are centered in many cases on attacks aiming at stealing user authentication credentials, which is the most efficient way to preempt user identities and deplete user accounts. Among best known are social engineering attacks like "shoulder surfing", allegedly administrator's calls, Trojan horse attacks, guessing attacks, Man-in-the-Middle (MITM) and Man-in-the-Browser (MITB) attacks, brute force attacks, keyboard memory sniffing, network sniffing, video recording of credential entry sessions, authentication system user store breaches, etc.

Phishing and Pharming Attacks

During the last several years, a couple of new social engineering attacks called phishing (http://en.wikipedia.org/wiki/Phishing) and pharming (http://en.wikipedia.org/wiki/Pharming) attacks were employed by intruders to the significant detriment of e- and m-commerce security. Without providing here a detailed technique used in initiating these attacks, it is sufficient to note that during such an attack a user is brought to a false server which looks very similar to the real one, and the user is lured to enter one's user credentials into this false graphical user interface. The scale of phishing attacks can be seen from the following citation of quite eloquent data presented by the Anti-Phishing World Group (APWG) (http://www.antiphishing.org/) in PHISHING ACTIVITY TREND REPORT $1^{st}$ HALF 2009 (see the full report in http://www.antiphishing.org/reports/apwg_report_h1_2009.pdf):

"1st Half '09 Phishing Activity Trends Summary

Unique phishing reports submitted to APWG recorded a high of 37,165 in May, around 7 percent higher than last year's high of 34,758 in October. [p. 4]

The number of unique phishing websites detected in June rose to 49,084, the highest recorded since April, 2007's record of 55,643. [p. 4]

Brand☐domain pairs increased to a record 21,085 in June, up 92 percent from the beginning of 2009. [p. 5]

The number of hijacked brands ascended to a high of 310 at the end of Q1. [p. 6]

Payment Services became phishing's most targeted sector, displacing Financial Services in Q1 & Q2. [p. 7]

Banking Trojan/password☐stealing crime ware infections detected increased during more than 186 percent between Q4, 2008 and Q2, 2009. [p. 10]

The total number of infected computers rose more than 66 percent between Q4 2008 and the end of the half, 2009 to 11,937,944, representing more than 54 percent of the total sample of scanned computers. [p. 10]

Sweden moved ahead of the United States as the nation hosting the most phish web sites at the half's end. [p. 7]

China hosted the most websites harboring Trojans and Downloaders from March through June. [p. 9]"

Site Key, SSL Certificate, and Extended Validation (EV) SSL Certificate Technologies Some of these attacks described above became so ubiquitous and efficient that a significant number of potential e- and m-commerce users decline to do business online or they would keep it highly limited in scope, unless stronger protection services/technologies/laws are becoming available to protect security of users' authentication credentials. There are conventional technologies like server SSL certificates (http://en.wikipedia.org/wiki/Ssl_certificate) and server extended validation (EV) SSL certificates (http://en.wikipedia.org/wiki/Extended_Validation_Certificate), or server's image/text mark (like site key technology http://en.wikipedia.org/wiki/Site_key)—all these technologies allowing with a varying level of assurance to authenticate a server to the user, before the user enters either one's authentication credentials, or some personally identifiable information (PII), or any other data potentially jeopardizing privacy, security, confidentiality, and business interests of transacting parties.

Hence, the security tiers to thwart phishing or pharming attacks are based on a mutual authentication of first a server to the user and then second, the user to the server. In a case of server certificates utilizing Public Key Infrastructure and the existence of Certification Authorities, users see either a lock icon on the browser frame or the same icon inside an address bar along with the green colored background of the address bar. The site key is the only user/server shared knowledge-based secret technology which is requiring hackers' personalized attacks, instead of hackers using a standard scheme, to harvest numerous user credentials with minimal efforts. Nevertheless, the security level of site keys against personalized attacks does not seem strong enough to protect user credentials.

EV SSL certificate technology looks stronger than the site key one. However, it is a relatively new technology and its resilience against phishing and pharming attacks remains to be tested yet. As a commodity mass protection layer, EV SSL certificate technology looks quite simple to use. However, for a certain amount of proficient users and ones that are highly concerned with their security, this technology is not user personalized, it is not user/server interactive, engaging, and providing a personalized sense of security. With regard to Extended Validation's defense against phishing, according to Tec-Ed Inc. "Extended Validation and VeriSign Brand" http://www.verisign.com/static/040655.pdf. Retrieved 2008-08-28 Tec-Ed research reveals that when a site adopts green address bars, then 23% of specially trained users visiting what appears to be the same site but without the green address bar will complete the transaction. It is difficult to anticipate behavior of non-trained users, though most likely the number of users ignoring the absence of the green bar will grow.

Hardware Token Based Server Authentication to the User

VASCO Data Security International, Inc. (http://www.vasco.com) offered several hardware token based solutions to authenticate a server to the user. In the first solution (dated 2004), the user was sending to a server's Web site the user name along with several first digits (say four digits) displayed by the user's token that time. Then, this server was expected to send back to the user the remaining digits currently displayed by the token (let's say the last four digits). Otherwise, if digits were not sent, or the sent digits did not match with the last four digits displayed at the token that time, the server was not authenticated.

Lately (in 2009), the company revealed another hardware token based solution. The user sends to a server the user name and obtains back from the server a certain one-time code (for example, 391483). The user is to enter this code into the user's token, and if the token positively authenticates the server, then the token generates another one-time code (say One-Time PIN; for example, 204817) which the user is to enter into a browser or another GUI, and sent to the server to authenticate the user. If the user is positively authenticated by the server, it completes the mutual authentication process and the user is provided the access requested.

In the first described solution, the user has to check personally if the last digits match, while also performing simple instructions of entering the digits into the browser or another GUI. In the second solution, the user is performing simple instructions only, without a need to make any decisions. In both cases, the disadvantage of such solutions is a necessity to carry a hardware device with the user all the time. Usability level of these solutions and their total cost of ownership are to be other points to consider as well. Another disadvantage yet, there is no protection if the hardware token gets into "wrong hands."

Back-End Client (User at a Client Platform)/Server Mutual Authentication Protocols It is important to outline to what extent user (at a client platform)/server mutual authentication protocols, that are available at the back end, complement a server to the user authentication on the front-end. User/server back end mutual authentication protocols (for instance, Kenneth C. Kung et al., U.S. Pat. No. 5,434,918, Victor Vladimir Boyko et al, U.S. Pat. No. 7,047,408, Len L. Mizrah, U.S. Pat. No. 7,506,161) are typically a series of client/server encrypted messages enabled by knowledge-based credentials that are used in the protocol on both ends of a user/server communication pair but never transmitted in any form over non-trusted communication media. Normally, when the user and the server are who they claim they are, the failure of the protocol's positive mutual authentication with back end protocols would mean that somehow messages have been tampered with during transmission over the communication lines. That is, the protocols would report intrusion detection based on the server side logic (the client side Graphical User Interface (GUI) logic, unless there is a permanent software client installed at the client platform and communicating with the server, is defined by the server side logic as well).

However, in a case of phishing or pharming attacks, the user deals with a fraudulent server, so that a server side logic cannot be trusted in the first place. Therefore, back end protocols are not much help in such cases, and what is needed is that the control be given directly to the user to decide through user's cognitive recognition of server's personalized credentials as to whether the user communicates to the truly authenticated server. Certainly, the key requirements for such user control would be a very strong protection of server credentials against various attacks, and first of all a very low credential entropy leakage (per server-to-user authentication session) and a high combinatorial capacity of server credential(s) against guessing attacks.

PRIOR ART

Representative prior art solutions addressing server authentication to a user at a client platform and more broadly their mutual authentication technologies are described in Kenneth C. Kung et al., U.S. Pat. No. 5,434,918, Victor Vladimir Boyko et al, U.S. Pat. No. 7,047,408, Cornelius V. Vick et al., U.S. Pat. No. 7,082,532, Eric R. Potter at al., U.S. Pat. No. 7,266,693, Sok Joon Lee et al., U.S. Pat. No. 7,533,257, Hiroshi Kokumai, U.S. Pat. No. 7,552,330, Timothy Lee et al., Pub. No. U.S. 2007/0037552, Richard Mervyn Gardner, Pub. No. U.S. 2008/0313726.

Also, earlier work of the present inventor in this field is described in U.S. Pat. No. 7,073,067 entitled AUTHENTICATION SYSTEM AND METHOD BASED UPON RANDOM PARTIAL DIGITIZED PATH RECOGNITION, U.S. Pat. No. 7,644,433 entitled AUTHENTICATION SYSTEM AND METHOD BASED UPON RANDOM PARTIAL PATTERN RECOGNITION, U.S. Pat. No. 7,188,314 entitled SYSTEM AND METHOD FOR USER AUTHENTICATION INTERFACE, U.S. Pat. No. 7,577,987 entitled OPERATION MODES FOR USER AUTHENTICATION SYSTEM BASED ON RANDOM PARTIAL PATTERN RECOGNITION, U.S. Pat. No. 7,506,161 entitled COMMUNICATION SESSION ENCRYPTION AND AUTHENTICATION SYSTEM, U.S. Pat. No. 8,006,300 entitled TWO-CHANNEL CHALLENGE-RESPONSE AUTHENTICATION METHOD IN RANDOM PARTIAL SHARED SECRET RECOGNITION SYSTEM, U.S. Pat. No. 7,849,321 entitled AUTHENTICATION METHOD OF RANDOM PARTIAL DIGITIZED PATH RECOGNITION WITH A CHALLENGE BUILT INTO THE PATH, all invented by Mizrah.

Aspects of this invention are particularly concerned with security of B2B and B2C transaction networks users (at a variety of client computing platforms) with respect to phishing and pharming attacks. Prior art server-to-user authentication algorithms and protocols are quite limited in the scope, they are either not sufficiently secure or usable, or fail to satisfy personalized security requirements of a vast plurality of users. There is a substantial need for competing, improved and more efficient server-to-user authentication algorithms and protocols, addressing more versatile security requirements, usability, less complex infrastructures required, and less costly for practical implementation. These improved authentication algorithms and protocols should also include secure mutual authentication capabilities built into them as well.

SUMMARY OF THE INVENTION

An authentication paradigm is provided for a client-server system to authenticate a server to a client, which can be used in advance of a protocol to authenticate the client to the server. The method provides protection against phishing and pharming attacks, while being easy to use, low-cost and adaptable to versatile security requirements and simple infrastructures.

An interactive, computer implemented method for execution by server-side computer resources in a client-server system is described to authenticate a server to a client according to the authentication paradigm described herein. The method includes processes storing data identifying a graphical representation of a frame of reference (e.g. a grid) adapted for rendering on the display, wherein the frame of reference includes a number of pre-defined locations having coordinates on the frame of reference. Also, a data set is stored associated with the client in a memory accessible using the server-side computer resources. The data set includes at least a first shared secret identified a server path, where the server path includes a plurality of pre-defined locations on the frame of reference. An authentication session is initiated upon receiving a client identifier at the server-side resources. During the session, a current session instance of the graphical representation of the frame of reference for the current session is presented via data communications to the client, where the current session instance shows the frame of reference populated with characters in the number of predefined locations according to a different pattern than used in other sessions with the client. The characters used to populate the locations on the frame of reference preferably represent numbers. Utilizing a variety of techniques, such as the examples described herein, the process includes sharing between the client and the server a challenge for use in the current session identifying a random subset of the plurality of predefined locations in the server path. Also, the process includes sharing between the client and the server a response including characters that match the characters positioned in a random subset of the plurality of predefined locations in the server path. As a result of presentation of the current session instance, and the sharing of the challenge and the response, the client is capable of verifying that the server has access to the first shared secret identifying the server path. Thus, the client can be assured that the server is authentic.

In various embodiments described herein, the process may include storing a second shared secret associated with the client in memory accessible using server-side computer resources, where the second shared secret identifies a response path including a plurality of predefined locations on the frame of reference used for sharing the response between the server and the client, and in which characters in the response path in the current session instance comprise the response. The server is capable of creating a current session instance to meet this rule when the challenge is known to the server in advance of the composition of the current session instance of the frame of reference.

Also, the process may include storing a third shared secret associated with the client, or the third shared secret identifies a challenge path including a plurality of predefined locations on the frame of reference used for sharing the challenge between the server and the client, and in which characters in the challenge path in the current session instance comprise the challenge.

Embodiments described herein also provide for storing an additional shared secret associated with the client, where the additional shared secret identifies a watermark path including a plurality of predefined locations on the frame of reference, and in which the watermark contents include indicators such as colors are characters, are positioned in the watermark path in the current session instance of the frame of reference.

According to additional aspects of the authentication process described herein, an out-of-band technology is applied. The out-of-band technology can be applied where the client has access to first and second data processing machines. In this case, the process can include receiving the data communication to initiate the session via data communication on a first channel from the first data processing machine, while the sharing of at least one of the challenge and the response is carried out outside of the first channel using the second data processing machine. For another example, in an embodiment utilizing a watermark path, data matching the watermark contents can be shared with the client outside of the first channel using a second processing machine. In yet another embodiment, the process includes presenting the current session instance of the graphical representation of the frame of reference to the client outside the first channel using the second data processing machine, such as by causing rendering of the current session instance on a display screen of a mobile phone.

Further advantageous combinations and embodiments of the processes described above are set forth in the application below. Also, persons of skill in the art will recognize additional possible variations.

As described herein, after executing the process to allow the client to authenticate the server, including sharing the response and the challenge with the client, the server-side computer resources initiate an authentication protocol for authentication of the client to the server. The client can refuse to enter authentication credentials for the authentication to the server if the client is not satisfied with the preceding authentication of the server. Upon authentication the client to the server, the server can enable access by the client to a protected resource.

In addition, an authentication system comprising data processing resources, including a processor, memory and a communication interface such as typically utilized for executing server programs, are described, which are adapted for executing the authentication processes described above.

Likewise, an article of manufacture is described which includes a machine readable data storage medium that stores a computer program executable to perform a protocol enabling authentication of a server by a client as described above.

Other aspects and advantages of the invention can be seen with reference to the drawings, the detailed description and the claims.

BRIEF DESCRIPTION OF THE DRAWINGS

FIG. 4 illustrates a frame of reference rendered in the form of a virtual reference grid of data fields in one of the preferred embodiments of this invention.

FIGS. 5A-1 to 5E-1 provide various examples depicted by arrows with continuous paths having ten field positions along the path for online server/user (at a client platform) shared secret set up in support of a server to the user authentication process during the login sessions according to one of the preferred embodiments of the present invention.

FIGS. 5A-2 to 5E-2 provide a secret graphical ordered path selection grid and various examples depicted by digits and shadowed grid fields with continuous paths having ten field positions for online server/user (at a client platform) shared secret set up in support of a server to the user authentication process during the login sessions according to one of the preferred embodiments of the present invention.

FIGS. 6A-1 to 6F-1 provide various examples depicted by arrows with graphical non-continuous paths having ten field positions for online server/user (at a client platform) shared secret set up in support of a server to the user authentication process during the login sessions according to one of the preferred embodiments of the present invention.

FIGS. 6A-2 to 6F-2 provide various examples of graphical non-continuous paths having ten field positions depicted by digits and shadowed grid fields for online server/user (at a client platform) shared secret set up in support of a server to the user authentication process during the login sessions according to one of the preferred embodiments of the present invention.

DETAILED DESCRIPTION

A detailed description of embodiments of the present invention is provided with reference to FIGS. 1 through 9.

Figure 1:
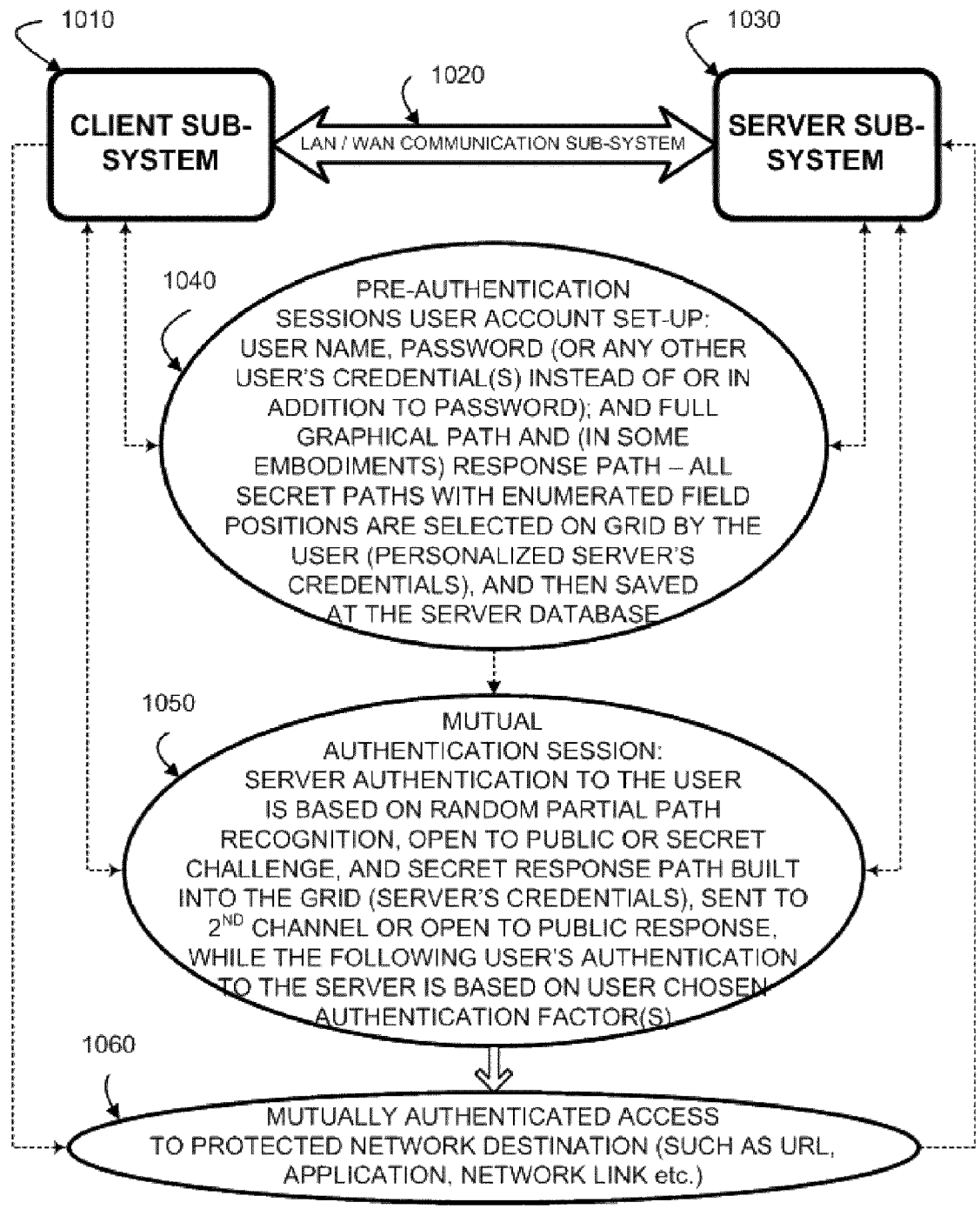
FIG. 1 illustrates a basic communication set up for one of the preferred embodiments of a mutual authentication processes according to the present invention.

FIG. 1 illustrates a basic communication set up for a representative Random Partial Digitized Path Recognition (RPDPR) authentication protocol utilized for a server authentication to the user at a client platform, according to the present invention. A client subsystem 1010 communicates by communication media, such as a local area network or wide area network communications subsystem 1020, with server subsystem 1030. Protected network destination 1060 controls access to resources such as secure web sites identified by URLs, links to secure networks, applications, and the like.

To set up access, pre-authentication session 1040 is executed by client subsystem 1010 and server subsystem 1030. In pre-authentication session 1040, a user account is set up in server subsystem 1030, the user name and a shared secret digitized path represented by an ordered data set of data fields is selected by the user and stored in server subsystem 1030 as a personalized server credential that would be used later to authenticate the server to this particular user. The ordered data set characterizes the server's full pattern, in which the data fields have enumerated positions in the data set and have respective field contents. For RPDPR, the field contents include combinations of field coordinates on a frame of reference of points. The coordinates characterize data field locations along a directed digitized path on the frame of reference. The position in the data set corresponds to the enumerated position (e.g. field number) of a corresponding point on the directed digitized path, which has coordinates known to the user at a client platform on the frame of reference. The position in the data set therefore indicates such coordinates to the user at a client platform, and the coordinates or the random session-only digital content randomly populated by the server in the appropriate fields can be used to select an indicator to be supplied as a fulfillment of a part of the authentication factor that corresponds to the position indicated by the One-Time Authentication Challenge (OTAC). Hence, the authentication response can be either position based or content based. The latter allows reducing credential entropy leakage by entering as the authentication response the appropriate content either by clicking on the other fields, where such content is met during the session, or entering the content needed from a keyboard. The former would require clicking on the right fields to generate a One-Time Authentication Response (OTAR), which is more vulnerable to credential reengineering if recorded during the entry process, and it would lead to a higher entropy leakage as compared to a content based approach. Nevertheless, in both cases OTAC challenges to enter only a session-only random subset of the credential, hence the OTAR response does not allow to reengineer the entire credential, keeping entropy leakage much lower than in password/PIN cases.

The user account information, the user name and the ordered set of data fields being a shared secret between the user and the server and used later as the user personalized server's credential utilized to authenticate the server to the user. This information is stored in a secure server database, along with other credentialing information employed during an authentication of the user to the server to complete a mutual authentication session. In some embodiments, the user's credential(s) could be a password, or another ordered set of data fields being a shared secret between the user and the server, and it is used later as a user's credential to authenticate the user to the server. Alternatively, both user credentials can be stored in the database in a case of two-factor layered user authentication. These are the preferred embodiments, though any types of user authentication credentials can be used for a single factor as well as a multi-factor user authentication to the server.

To gain access to protected network destination 1060, client subsystem 1010 and server subsystem 1030 execute mutual authentication session 1050 that includes a user at a client platform/server interactive communication based on RPDPR for a server authentication to the user and any chosen by the user authentication factors to authenticate a user to the server. A more detailed description of an embodiment of authentication session 1050 is provided with reference to FIGS. 2A and 2B.

According to one basic flow, an authentication session is initiated when the user tries to reach a protected resource in a network destination (block 1060). The protected network destination redirects the user's attempted access to the authentication server, or the attempted access is otherwise detected at the authentication server 1030. In one example, where the user is attempting access (block 2010, FIG. 2A) using for instance an Internet browser, a communication interface is returned to the user's browser including a graphical user interface having links to authentication server 1030 (block 2020, FIG. 2A). The communication interface may be returned through redirection for example, by the authentication server or another network resource. Via the communication interface, the server prompts the user to enter a user name into a field in the Graphical User Interface (GUI), or in another preferred embodiment, the server prompts the user to enter the user name and a user-manually-created or user-edited a one-time authentication challenge to a server (Server Challenge; in other preferred embodiments it can be user-edited a one-time authentication response—Server Response, to for example, FIG. 3E (block 2030, FIG. 2A)). In yet another preferred embodiment, the user generated Server Challenge or Server Response is requested to be entered and sent to a server utilizing a second communication channel, for instance user's email address, or SMS address, or user's hardware token, or delivered to a server with the user's phone (block 2030, FIG. 2A).

Figure 2A:
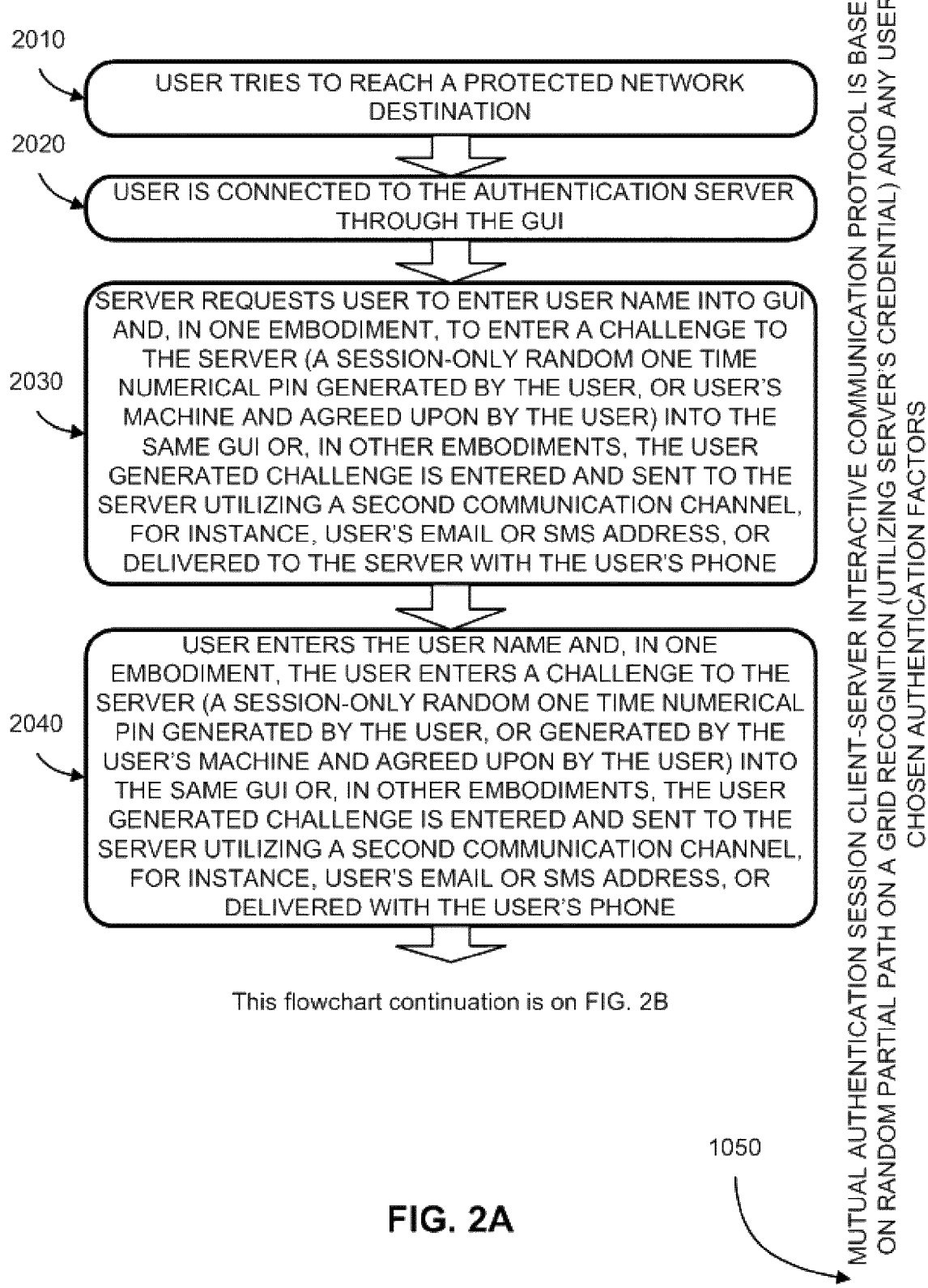
FIG. 2A and FIG. 2B present a flowchart for one of the preferred embodiments of the basic Random Partial Digitized Path Recognition (RPDPR) algorithm which is modified with a user generated challenge sent to the Server, and the Server's authentication response delivered to the user during the mutual authentication session according to the present invention.

Hence, in one embodiment the user enters only the user name, whereas in another embodiment, the user along with the user name also enters a Server Challenge (a session-only random One-Time Authentication Challenge (OTAC)) or a Server Response (a session-only random One-Time Authentication Response (OTAR)) to the server being each a numerical code looking like a digits only PIN generated by the user, or generated by the user's machine and either agreed upon or edited by the user) into the same GUI or, in other embodiments, the user generated challenge or response is entered and sent to the server utilizing a second communication channel, for instance, user's email address, or SMS address, or user's hardware token, or delivered with the user's phone (block 2040, FIG. 2A).

Figure 2B:
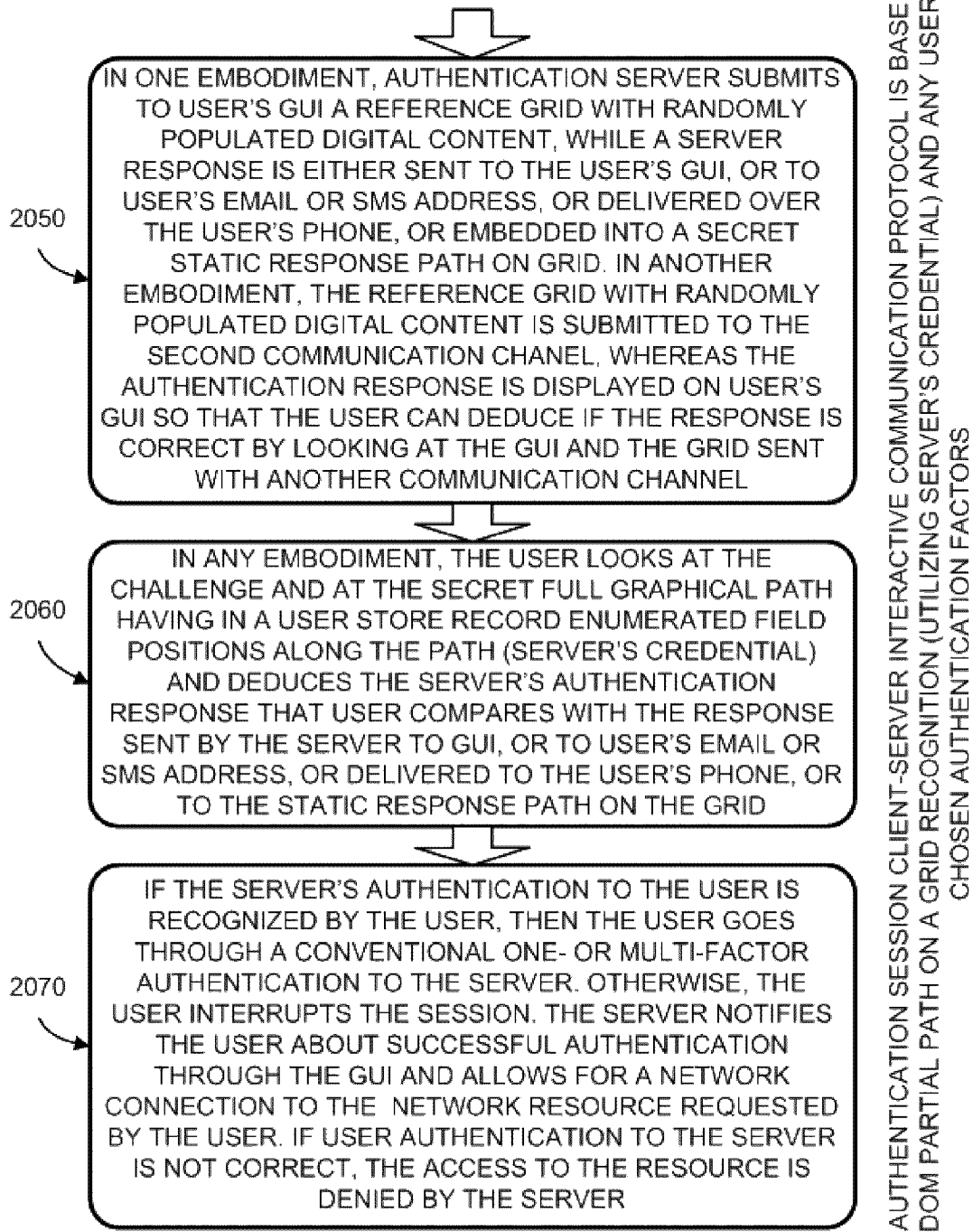

Then, in one embodiment, the authentication server submits to the user's GUI a reference grid with randomly populated digital content placed in grid's fields (having a digit per field), while a server's response is either sent to the user's GUI, or to the user's email address, or SMS address, or delivered over the user's phone, or embedded into a server/user shared secret static server's response path (Server Path) on a grid (block 2050, FIG. 2B). In other embodiments, the reference grid with randomly populated digital content and Server Challenge are submitted to the second communication channel, whereas the session-only One-Time Authentication Response (OTAR) generated by the server to the user (Server Response) is displayed on the user's GUI, so that the user can deduce if the response is correct by looking at the GUI and the grid and the Server Challenge sent with another communication channel (block 2050, FIG. 2B). In yet another preferred embodiment of this invention, OTAR generated by the user is sent to a server (like in FIG. 3E), and then displayed on the user's GUI while the reference grid with randomly populated digital content and the Server Challenge are submitted to the second channel, so that the user can deduce if the response is correct by looking at the GUI and the grid with the Server Challenge sent with another communication channel (block 2050, FIG. 2B). The only difference in these last two preferred embodiments is a tradeoff between security, usability, and computer/network resource utilization. OTAR generated by the user is providing some additional security against replay attacks at expense of lower usability and higher requirements to the bandwidth and the server CPU power.

In any embodiments, the user looks at the challenge and at the secret full graphical path having in a user store record enumerated field positions along the path (the server's credential personalized for this particular user) and deduces the server's authentication response that user compares with the response sent by a server to the GUI, or to the user's email address, or SMS address, or hardware token, or delivered to the user's phone (a software client or a software token in a mobile device), or to the static response path on the grid (block 2060, FIG. 2B).

If the server's authentication to the user is recognized by the user, then the user goes through a conventional one- or multi-factor user authentication to the server. Otherwise, the user interrupts the session. The server notifies the user about successful authentication through the GUI and allows for a network connection to the network resource 1060 requested by the user. If the user authentication to the server is not correct, the access to the resource is denied by the server (block 2070, FIG. 2B).

For instance, in one preferred embodiment of this invention and for one particular authentication session, an instance of a graphical representation of the frame of reference consists of a 10 by 10 grid of data field locations, where a random character (where the characters are digits, letters or other characters that can be used to suggest an order) is positioned at each data field location in the grid. For a particular instance of the grid, the character positioned at each data field location is session specific, so that the instance is used for only one authentication session. In a representative example, consider a full path including ten data fields storing coordinates of ten data field locations on the frame of reference, with the starting field location for the full path in position 1 and a random character being the digit 3, next consecutive field location in position 2 and a random character being the digit 8, next consecutive field location in position 3 and a random character being the digit 5, next consecutive field location in position 4 and a random character being the digit 2, next consecutive field location in position 5 and a random character being the digit 7, next consecutive field location in position 6 and a random character being the digit 9, next consecutive field location in position 7 and a random character being the digit 8, next consecutive field location in position 8 and a random character being the digit 1, next consecutive field location in position 9 and a random character being the digit 4, and the last field location at the full graphical ordered path in position 10 which is presented with digit 0 and a random character being the digit 6. Hence, the full ordered path is presented in this example as the following sequence of characters in the pre-defined field locations along the secret full ordered path: "3, 8, 5, 2, 7, 9, 8, 1, 4, 6". Assume for this example that the second shared secret being a Server Challenge or OTAC consists of coordinates of the six pre-selected field locations on the reference grid. As an example, we will consider a Server Challenge including six data fields storing coordinates of six data field locations on the frame of reference, with the starting field location for the Server Challenge in position 1 and a random character being the digit 5, next consecutive field location in position 2 and a random character being the digit 9, next consecutive field location in position 3 and a random character being the digit 1, next consecutive field location in position 4 and a random character being the digit 4, next consecutive field location in position 5 and a random character being the digit 3, and next consecutive field location in position 6 and a random character being the digit 8. Then, according to the example above, the one-time authentication challenge OTAC consists of the six characters displayed at the field locations corresponding to the Server Challenge on the instance of the grid. Thus, a secret OTAC (5, 9, 1, 4, 3, 8) is built into the reference grid as a second user/server static shared secret digitized path on the session specific instance of the grid. While the secret is static, the digital OTAC content is dynamic and gets updated each authentication session when the reference grid is invoked.

The user is prompted to deduce OTAR and to compare it with the one displayed in the data entry field on the graphical user interface according to the OTAC. In this particular example, the first character of the challenge points to field position 5 along the path, where the displayed random character is the digit 7. Then, the second character of the challenge points to field position 9 along the path, where the displayed random character is the digit 4. Going the same way across remaining points in the OTAC path 3, 4, 5, and 6, one can derive a random session-only one time authentication response OTAR "7 4 3 2 5 1". The user completes the matching process of comparing deduced field values with the OTAR sent from the server to the user in- or out-of-band (block 2070, FIG. 2B). If the input data matches the field content derived at the server (or, in one of other preferred embodiments of this invention, generated manually or edited by the user) for the very same path, challenge and the random session-only characters in the array, then the user, having an assurance that the server is not a fraudulent one, can proceed entering user authentication credentials or PII, or any confidential and business security sensitive information.

Graphical User Interface for User's Personalized Server Authentication Factor

Figure 3A:
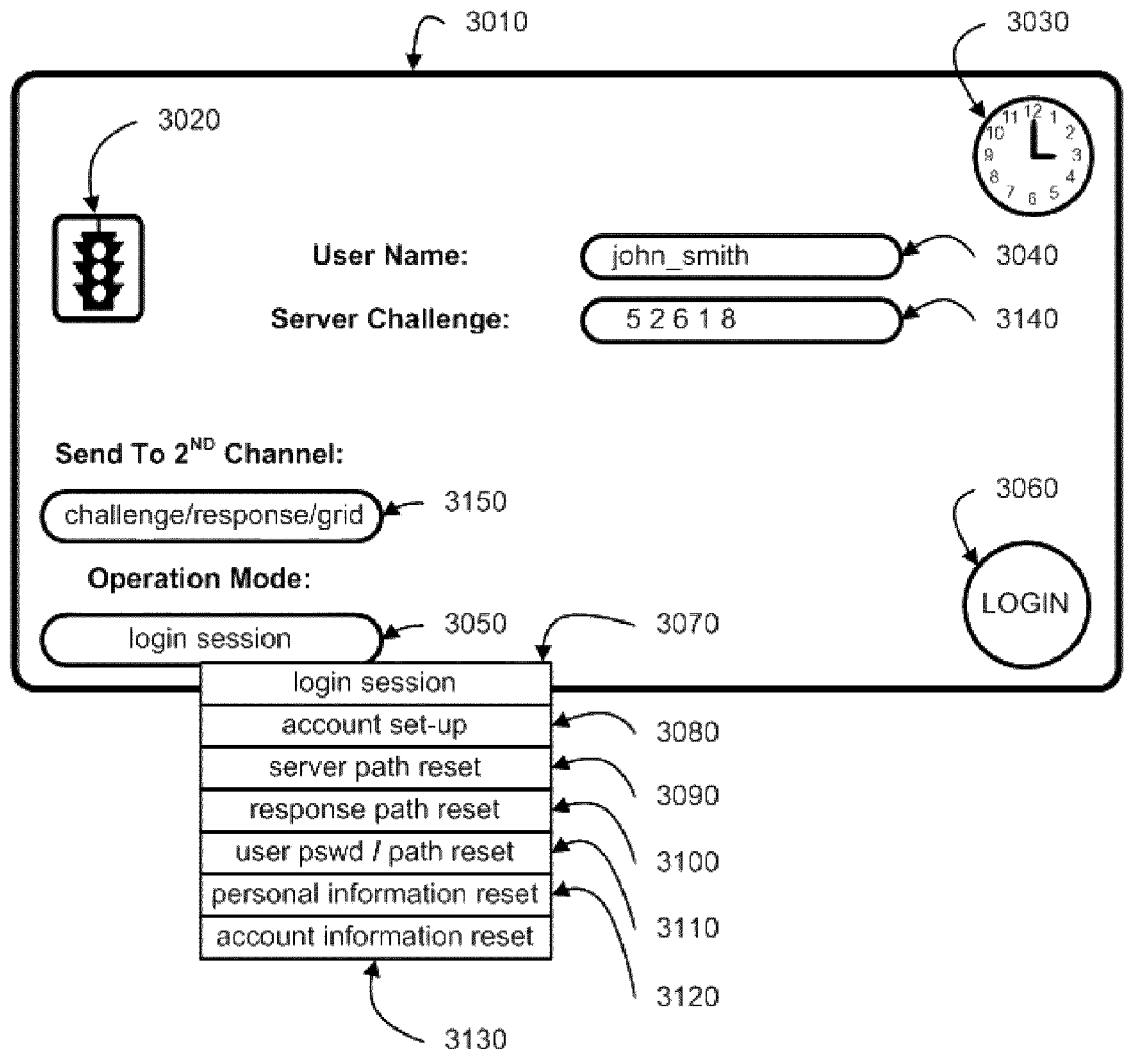
FIG. 3A illustrates a graphical user interface in a desktop or laptop's browser or on a screen supporting a variety of operation modes in client (a user at a client platform)/server mutual authentication system, and particularly, the operation mode menu entry selection process, and the first step of the login (or a credential reset) process at the User Name entry state and a Server Challenge entry state used in one example of an authentication program according to one of the preferred embodiments of the present invention.

FIGS. 3A-3G illustrate input constructs based on graphical user interfaces presented using Web browsers for a login and authentication session. FIG. 3A illustrates an opening screen 3010 which is presented to the user at the beginning of a server authentication session. In the opening screen 3010, data entry fields 3040 and 3140 are used for entry of a user name and a server challenge (OTAC to a server). The Server Challenge or OTAC is generated manually by the user, or it is generated automatically as a session-only random OTAC with an option to be edited by the user at the user's will, before it is sent to a server. Login button 3060 is indicated to initiate processing of field data and to start a login process.

"Operation mode:" menu 3050 is included and when it is indicated, it causes a drop-down menu of operation mode buttons including 'login session' operation mode button 3070, 'account set-up' operation mode button 3080, 'server path reset' operation mode button 3090, server 'response path reset' operation mode button 3100, user credentials to authenticate a user to the server (path or password, or password and path together) reset operation mode 'user pswd/path reset' button 3110, user 'personal information reset' (a set of personalized security questions not disclosing user's personally identifiable information) button 3120, and user 'account information reset' button 3130. Stoplight icon 3030 is included in screen 3010. Out-of-band second channel selection menu "Send to $2^{nd}$ Channel:" 3150 is included and its buttons are described in FIG. 3B. Stoplight icon 3020 is red before the user name and, in some preferred embodiment, the Server Challenge are entered (either by indicating LOGIN button 3060, or hitting the "Enter" key on the user's keyboard), is yellow during client-server communications while the client (the user at a client platform) is waiting for verification of the user name and the OTAC compliance with the system administrator's set policies (say OTAC is to be between 4 and 6 digits), and turns green when the data are accepted. Then, the initial first step of user/client multi-factor mutual authentication GUI is replaced with any of the GUIs in FIGS. 7A-7I or FIGS. 8A-8E used to perform the second step of verifying as to whether a server got authenticated to the user and entering user credentials to authenticate the user to the server, if the server has been positively authenticated by the user. Until the data are entered in these GUIs, the stoplight 3020 is red; it is yellow during client-server communications while the client (the user at a client platform) is waiting for verification of the user's credential(s) to be authenticated by the server, then the stoplight 3020 turns green if the user is positively authenticated by the server. Also included in screen 3010 is session timer icon 3030 indicating session elapsed time for the mutually authenticated login session. The elapsed session time 3030 continues and uninterrupted when the user is presented with GUIs replacing each other during different steps of the mutual authentication session. The system administrator can set parameters in the server that terminate the login process or any other selected by user operation mode session in menu 3050, if the timer expires (session time can have different time limits for various operation modes), or otherwise react to timer expiry.

Figure 3B:
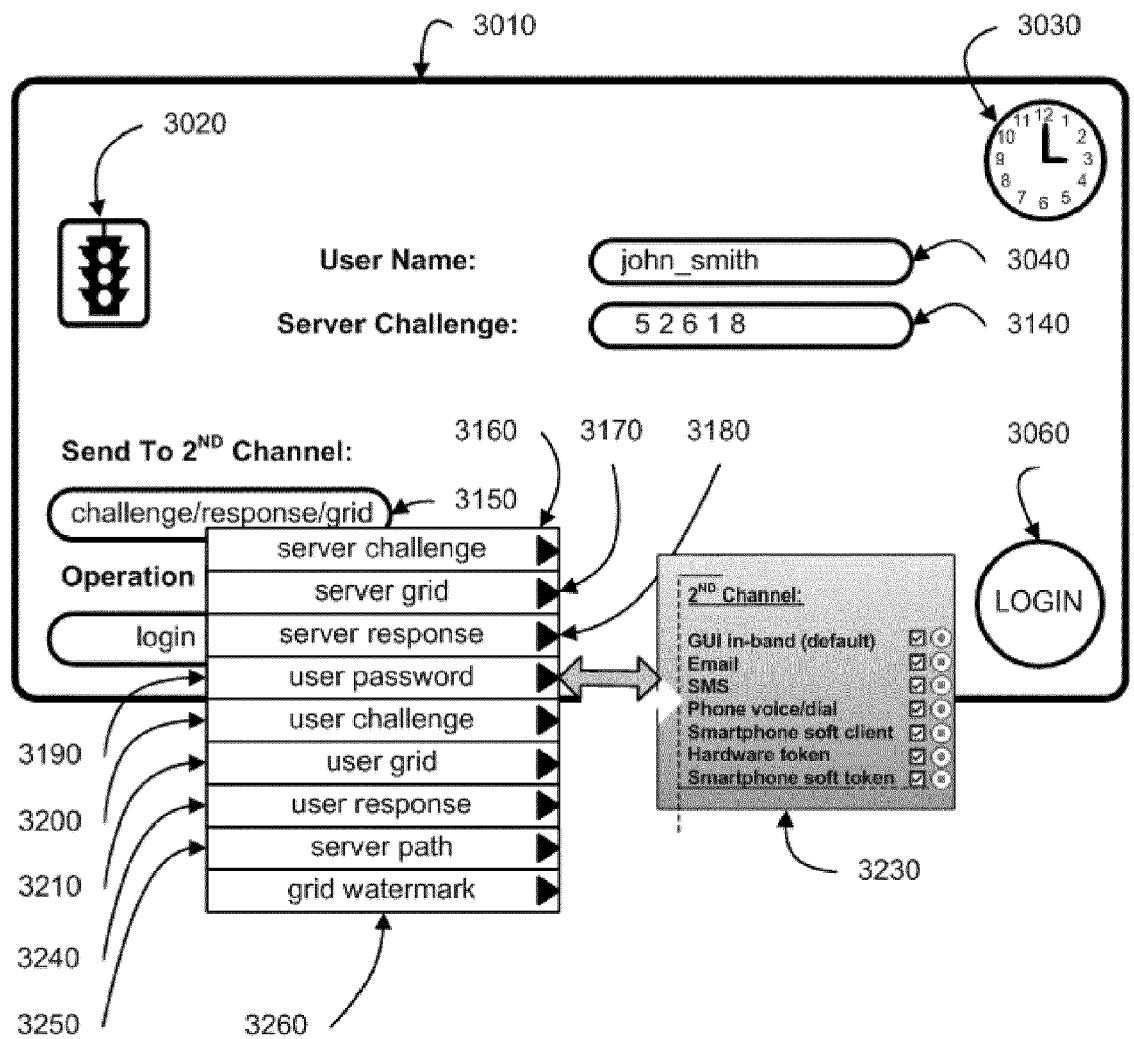
FIG. 3B illustrates a graphical user interface in a desktop or laptop's browser or on a screen supporting a variety of a second communication channel options in client (a user at a client platform)/server mutual authentication system, and particularly, the 'Send To $2^{nd}$ Channel:" menu entry selection process, and the first step of the login (or a credential reset) process at the User Name entry state and a Server Challenge entry state used in one example of an authentication program according to one of the preferred embodiments of the present invention.

FIG. 3B is similar to FIG. 3A while providing more pictorial information on "Send to $2^{nd}$ Channel:" menu 3150. The RPDPR-based user/server mutual authentication factor components that can be utilized out-of-band in various operation modes are presented by the following buttons: 'server challenge' 3160, 'server grid' 3170, 'server response' 3180, 'user password' 3190, 'user challenge' 3200, 'user grid' 3210, 'user response' 3240, 'server path' 3250, and 'grid watermark' 3260. Each of these components can be used by a variety of different out-of-band channels 3230 like email, SMS, phone voice/dial, smartphone software client, hardware token, smartphone software token. If out-of-band channels are not used, all in-band solutions are supported with "GUI in-band (default)" entry in menu 3150.

Figure 3C:
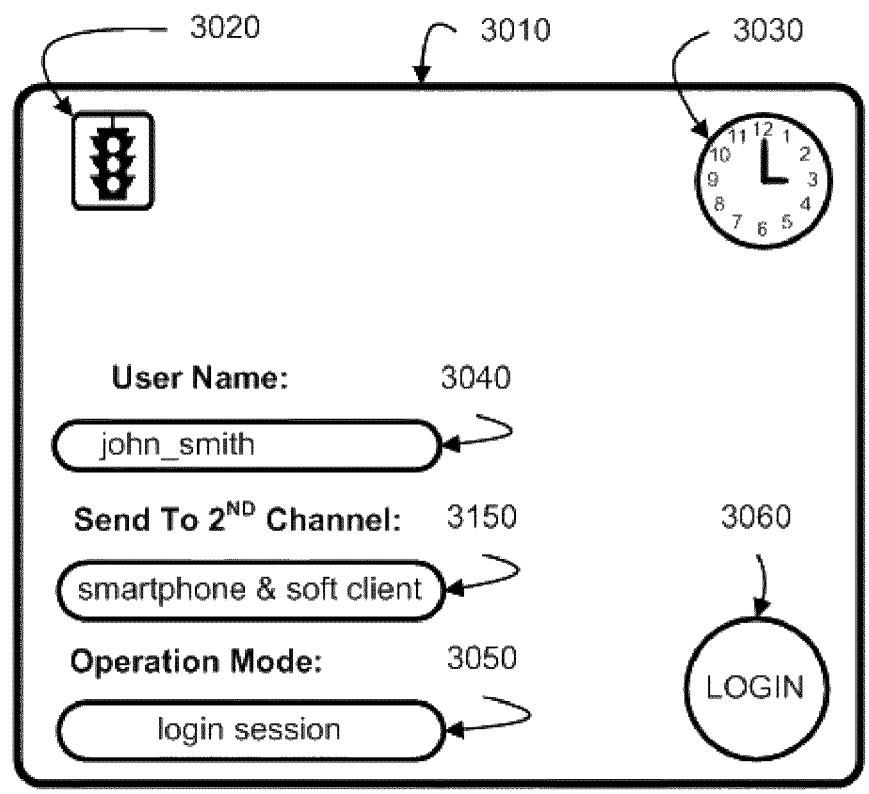
FIG. 3C illustrates a graphical user interface in a desktop or laptop's browser or on a screen supporting a particular out-of-band server to the user (at a client platform) authentication option in a user/server mutual authentication system, and particularly, the login operation mode entry selected along with a server generated grid and the server generated authentication challenge to be delivered to the software client on a mobile device in one example of an authentication program according to one of the preferred embodiments of the present invention.

FIG. 3C illustrates an input construct used by the user to enter the user's name in field 3040, whereas the server having obtained and verified the user name, securely communicates with the software client on the user's mobile device to deliver the session only grid and the Server Challenge or OTAC (see field 3150 of the "Send To $2^{nd}$ Channel:" menu—it points to "smartphone & soft token' as an out-of-band second channel). Concurrently, the Session Response or OTAR is delivered in-band from the server to the browser or the user's login screen. The OTAR deduced by the user from the data in the mobile device is to be matching the one delivered through the browser GUI—this way the server gets authenticated. It is worth to note that a grid sent to the software client in a mobile device can be combined not necessarily with the OTAC but instead, it can be combined for instance with a OTAR, whereas the OTAC will be concurrently displayed in the browser GUI. Then, the OTAC applied to the obtained out-of-band grid (sent to the software client in the mobile device) is to produce the same OTAR that is displayed in the mobile device, which is positively authenticating the server to the user.

Figure 3D:
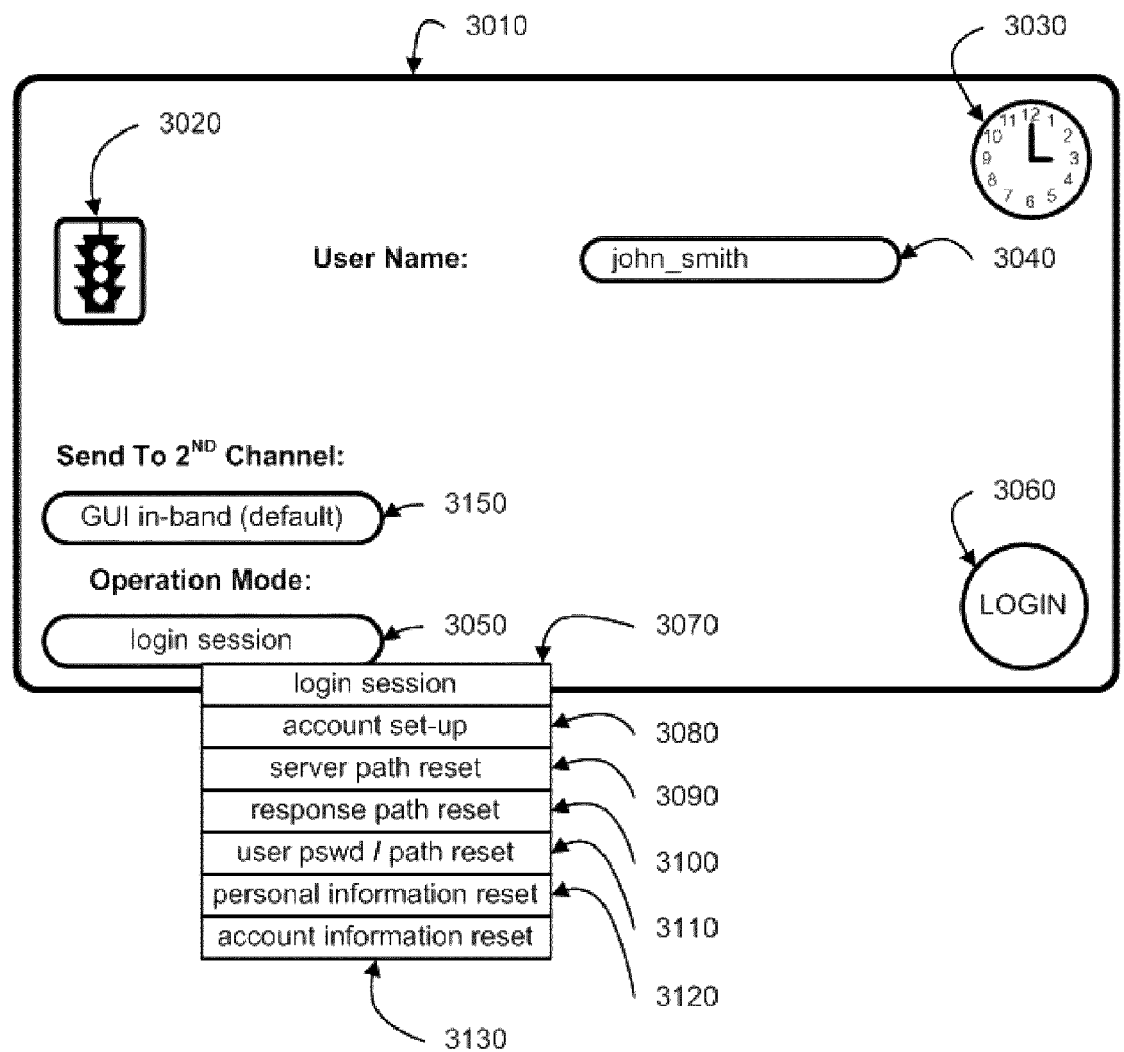
FIG. 3D illustrates a graphical user interface in a desktop or laptop's browser or on a screen supporting a particular in-band server to client authentication option in client (a user at a client platform)/server mutual authentication system, and particularly, the login operation mode entry selected along with Server Path and Server Response being delivered to the graphical user interface in a desktop or laptop's browser or on a screen in one example of an authentication program according to one of the preferred embodiments of the present invention. Server Challenge in this case is always the first four ("four" can be reset by a system administrator) fields for enumerated positions along the Server Path.

FIG. 3D illustrates an input construct based on graphical user interface presented using a Web browser for a login and authentication session. The only difference with FIG. 3A is that instead of a session-only random authentication challenge OTAC sent in-band to the server, the user authentication challenge in one of the preferred embodiments of this invention is always (according to the policies set by the system administrator) a session-only random digital content in the first four enumerated positions of the Server Path. Certainly, the number of the first enumerated field positions on the Server Path used as OTAC can be varied with the system administrator policy change.

Figure 3E:
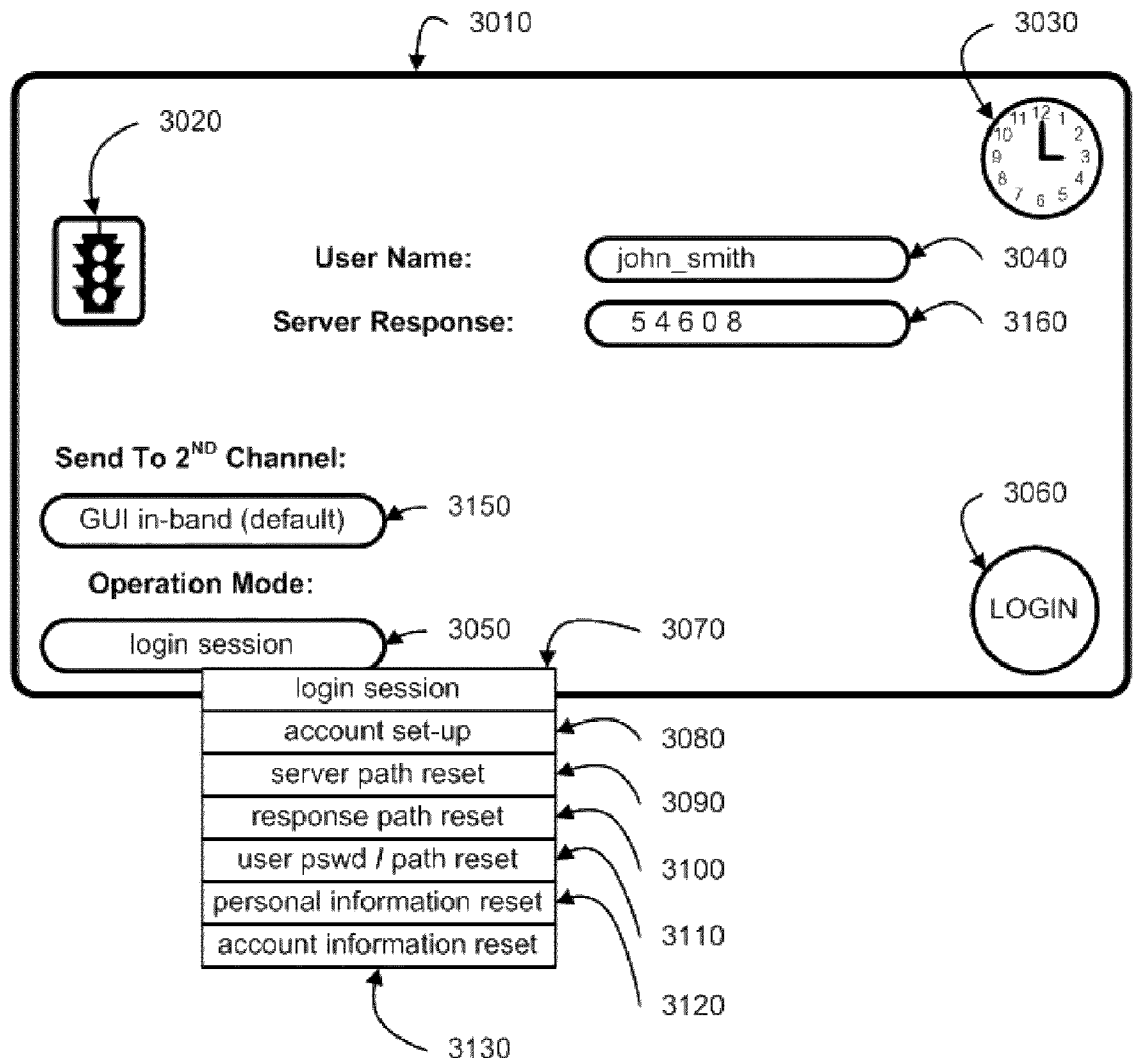
FIG. 3E illustrates a graphical user interface in a desktop or laptop's browser or on a screen supporting a particular in-band first step of server to client authentication option in client (a user at a client platform)/server mutual authentication system, and particularly, the 'login session' operation mode entry selected and User Name is entered, whereas Server Response is manually generated by the User (or the User edits an automatically generated Server Response) in one of the preferred embodiments of the present invention. All the entries are sent to the server.

FIG. 3E illustrates the input graphical construct for an in-band authentication of the user to a server during various operation modes. The OTAC to a server is either generated manually or it is generated automatically, and then optionally edited by the user. The grid then sent to the user allows to test the Server Response embedded into the grid along with the Server Path. The Server Response is to correspond to the OTAC initially chosen by the user and displayed in the browser or the user's login screen.

Figure 3F:
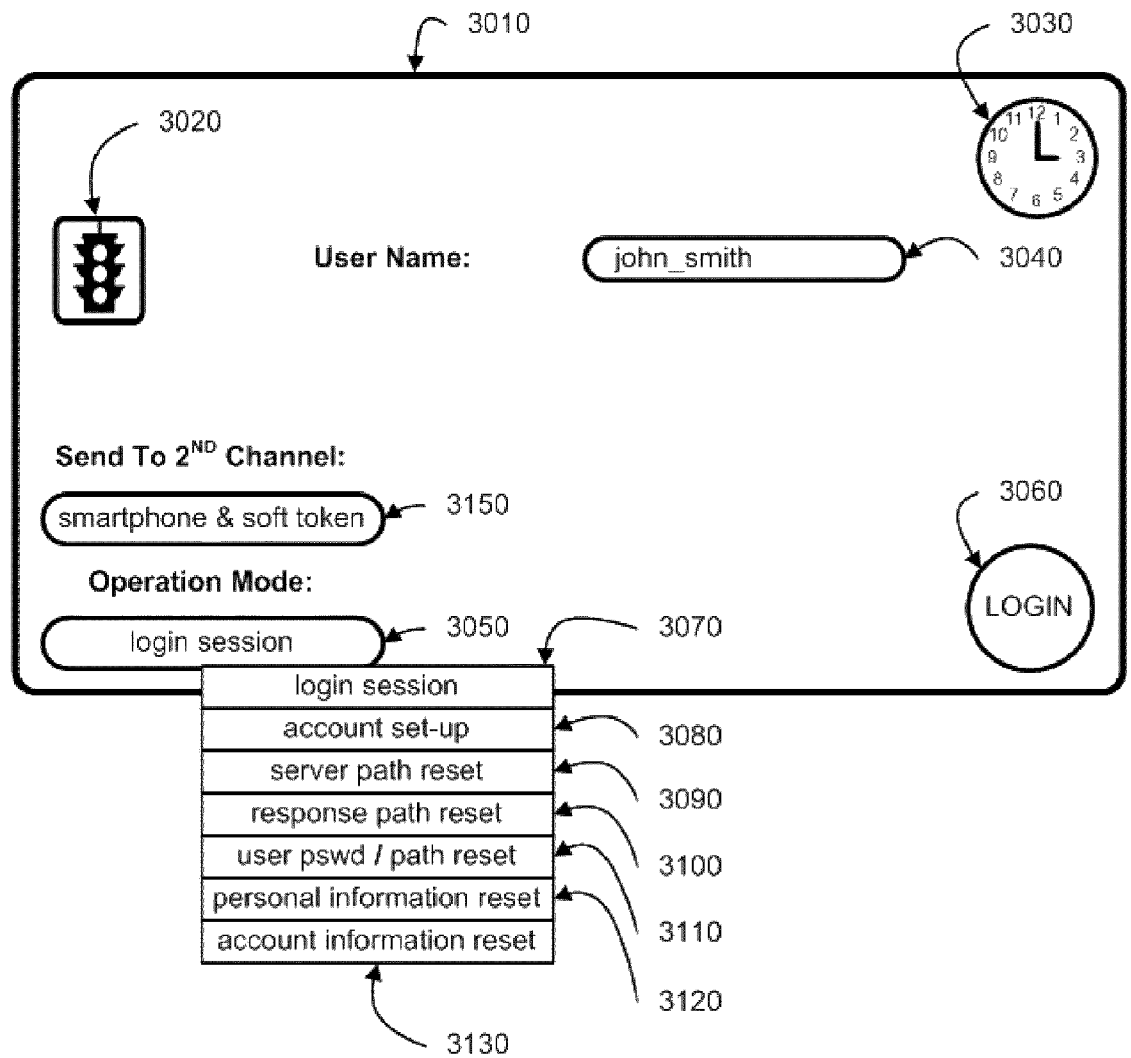
FIG. 3F illustrates a graphical user interface in a desktop or laptop's browser or on a screen supporting a particular first step of out-of-band server to client authentication option in client (a user at a client platform)/server mutual authentication system, and particularly, the login operation mode entry selected along with either Server Challenge, or Server Response, or Grid Watermark contents to be delivered with a software token preset on a smartphone in one example of an authentication program according to one of the preferred embodiments of the present invention.

FIG. 3F illustrates an input construct based on a graphical user interface presented using a Web browser for an out-of-band login authentication session. One of the RPDPR components (in one of the preferred embodiments of this invention it can be a Server Response value or OTAR) is delivered to the user through a software token at the user's mobile device. In other preferred embodiments it can be either a Server Challenge value or a Server Watermark value instead of a Server Response value.

Figure 3G:
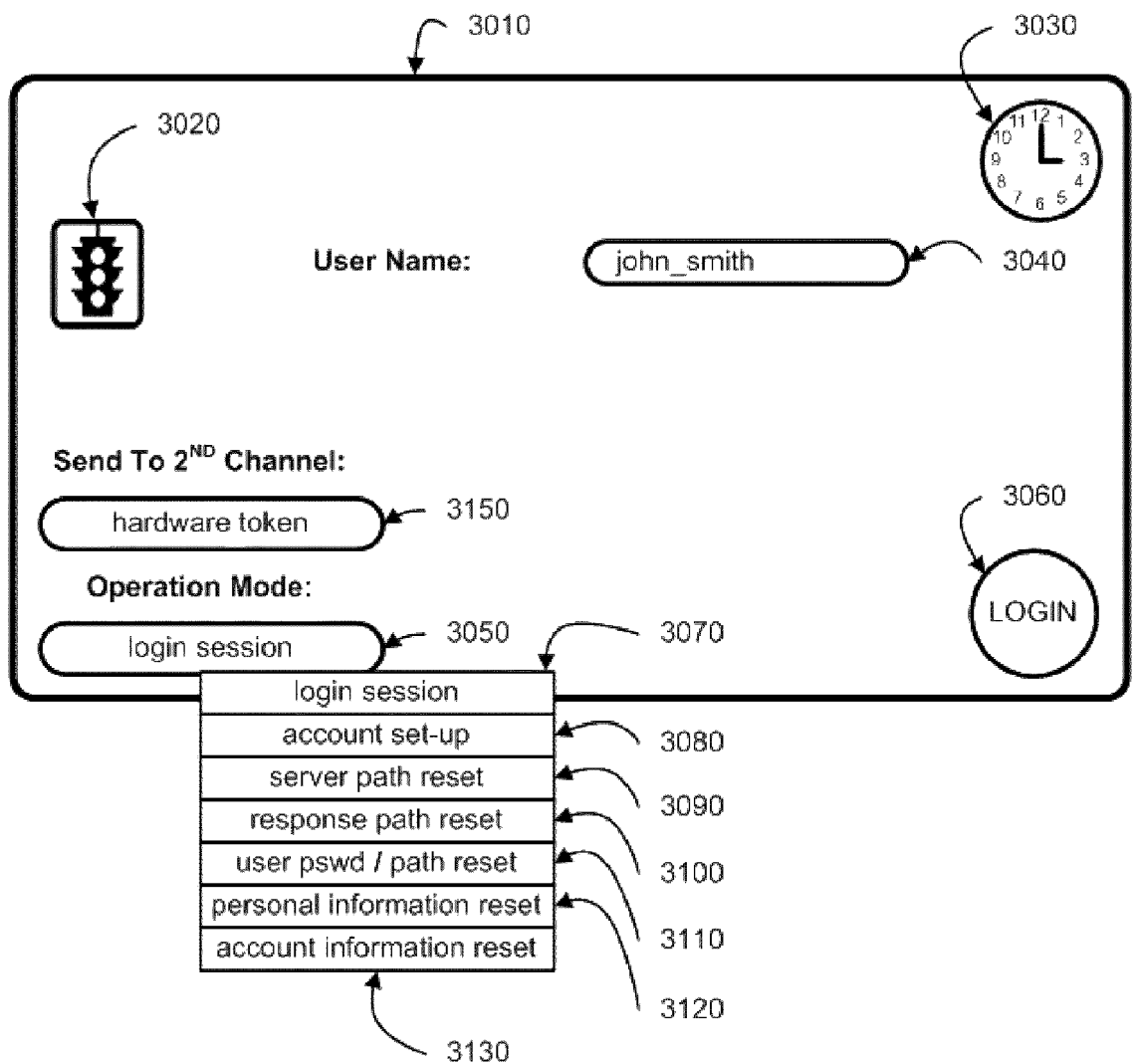
FIG. 3G illustrates a graphical user interface in a desktop or laptop's browser or on a screen supporting a particular first step of out-of-band server to client authentication option in client (a user at a client platform)/server mutual authentication system, and particularly, the login operation mode entry selected along with either Server Challenge, or Server Response, or Grid Watermark contents to be delivered with a hardware token in one example of an authentication program according to one of the preferred embodiments of the present invention.

FIG. 3G illustrates an input construct based on a graphical user interface presented using a Web browser for an out-of-band login authentication session. One of the RPDPR components (in one of the preferred embodiments of this invention it can be a Server Response or OTAR) is delivered to the user through a hardware token (similar to the RSA SecureID token). In other preferred embodiments, it can be either a Server Challenge value or a Server Watermark value instead of a Server Response value.

Selecting a Full Graphical Ordered Path on a Grid at User Account Set Up

Figures 4, 5A-1, 5B-1, 5C-1, 5D-1, 5E-1:
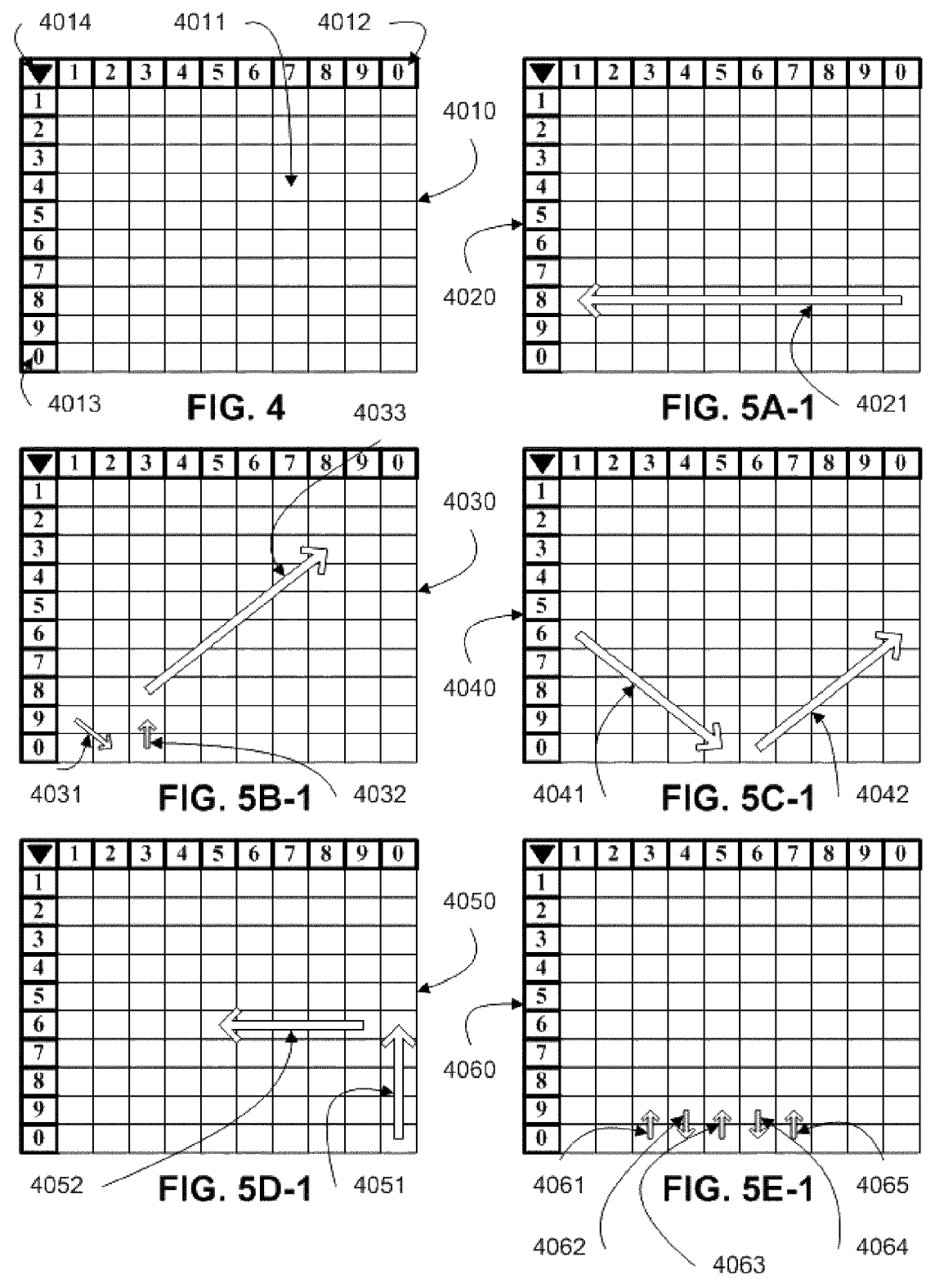
Figures 5A-2, 5B-2, 5C-2, 5D-2, 5E-2:
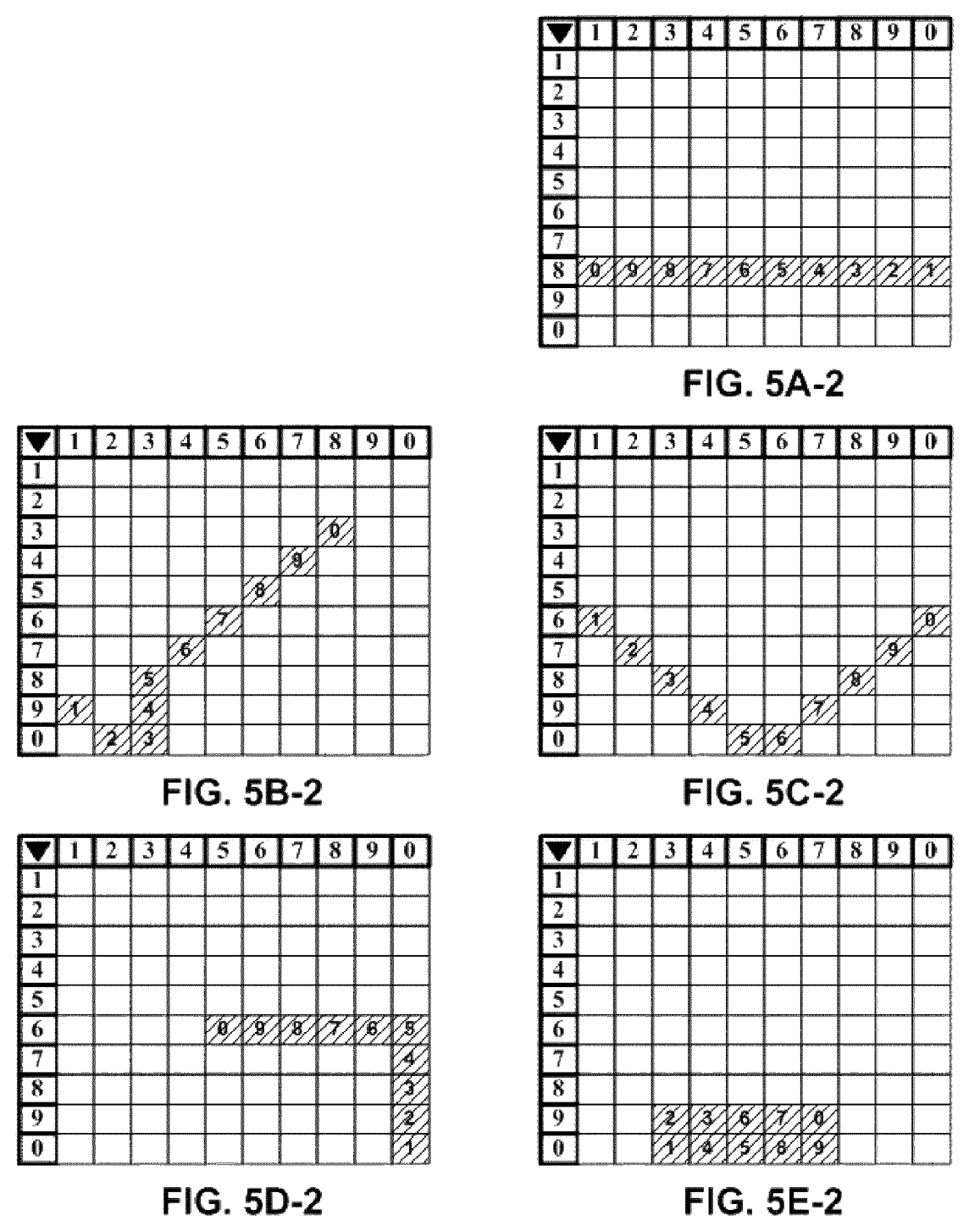
Figures 6A-2, 6B-2, 6C-2, 6D-2, 6E-2, 6F-2:
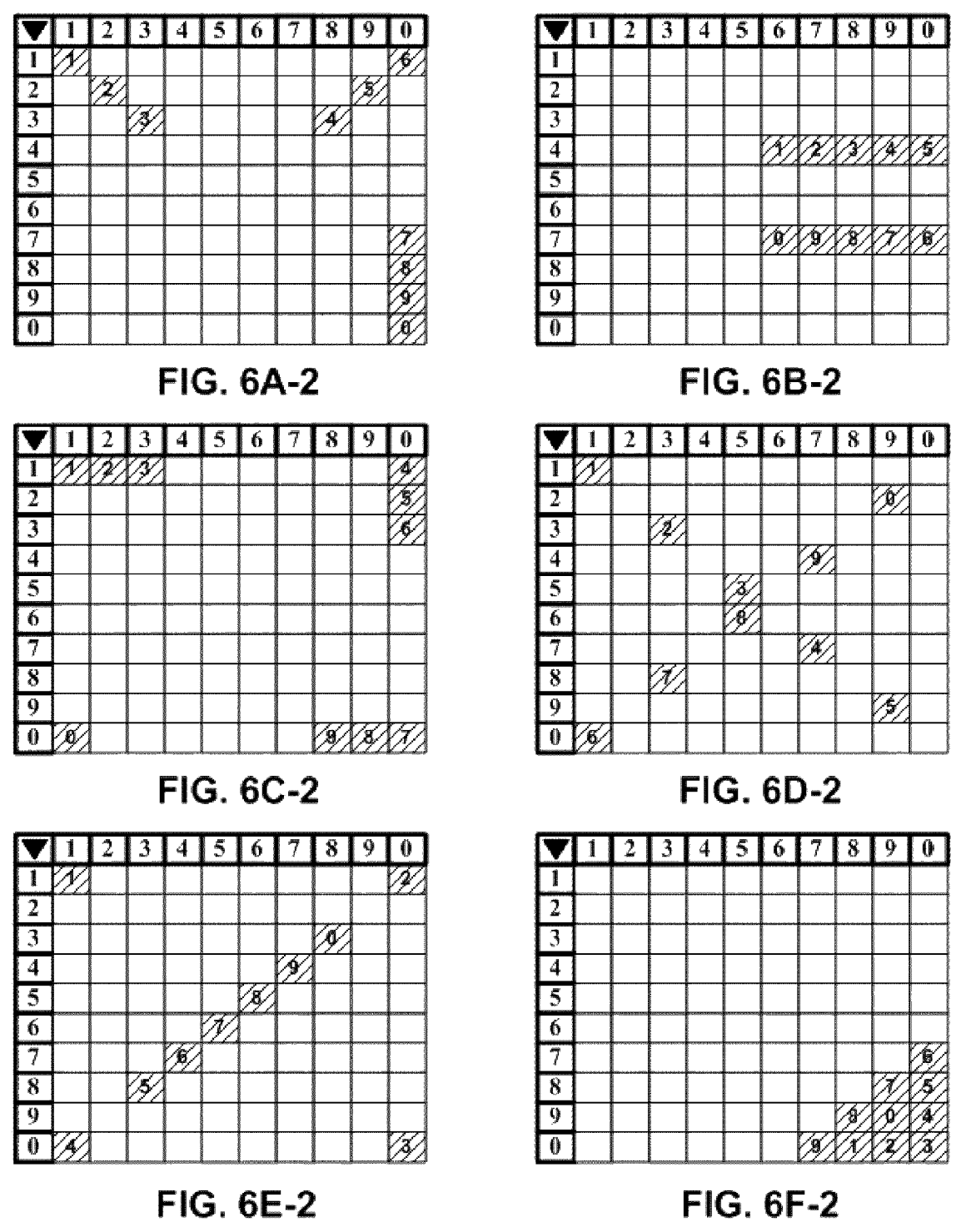

FIG. 4 and FIGS. 5A-1 to 5E-1, when related to FIGS. 5A-2 to 5E-2, and FIGS. 6A-1 to 6F-1, when related to FIGS. 6A-2 to 6F-2, illustrate how an ordered path is specified with respect to a frame of reference for use as a personalized for any particular user a server's authentication factor, which is utilized later to authenticate a server to the user. In this example, the frame of reference consists of a reference grid as shown in FIG. 4. Reference grid 4010 in this embodiment consists of an array of pre-defined locations (e.g. 4011) that can be characterized by coordinates along horizontal and vertical axes 4012, 4013 respectively, as in a Cartesian coordinate system. Other frames of reference may be organized according to other coordinate systems, such as polar coordinate systems, three dimensional coordinate systems, and so on. In the example shown in FIG. 4, location 4011 can be characterized by coordinates (7, 4). FIG. 4 represents an instance of a frame of reference in which the locations on the grid are not populated with characters, for display on a user interface during an account setup procedure, for example, and used by a client to specify a full graphical ordered path. Thus, the instance includes icon 4014 with a black triangle (or more preferably a triangle that is highlighted in some form, such as by being colored red) depicted on it at the intersection of the reference axes, used as a button for opening and closing the instance. The client may draw (or choose, or select) a graphical path on the reference grid with a mouse, a keyboard, or other input device, or the graphical path may be provided by a server, as suits a particular instance of the set up algorithm.

FIGS. 5A-1 to 5E-1, illustrate representative graphical ordered paths which can be set up using the frame of reference 4010. Related FIGS. 5A-2 to 5E-2 disclose the meaning of word "ordered" as an adjective for "graphical path" as used herein. Shaded grid locations consecutively numbered with digits 1, 2, 3, 4, 5, 6, 7, 8, 9, 0 from the beginning to the end of the graphical path comprise full graphical ordered paths. Any subset of this path's fields can be selected as a sub-path representing an authentication challenge built into the path. The number of a field represents the field position in the order along a full graphical ordered path. Thus, FIG. 5A-1 and its related Figure, FIG. 5A-2, illustrate graphical path 4021 on an instance 4020 of the reference grid. The path includes a set of locations beginning with a location at coordinates (0, 8). The path proceeds in a straight line in order with locations at the coordinates (9, 8), (8, 8), (7, 8), . . . , (1, 8). A data set corresponding with this ordered path comprises a set of data fields having positions 1 through 0 (here and everywhere in this application 0 represents position number 10) in the data set (where the positions can be represented by a field number using a data set that comprises a linear array of data fields). The data fields at the positions respectively store combinations of coordinates (0, 8) through (1, 8) in order. In this manner, if the client knows the path and the location of a data field in the data set, the client can determine the coordinates stored in the data field. Those coordinates can be used to fulfill the authentication factor as described below.

FIG. 5B-1 and its related Figure, FIG. 5B-2, illustrate a graphical path represented by arrows 4031, 4032, 4033 on an instance 4030 of the frame of reference. The graphical path of FIG. 5B-1 and its position number representation in FIG. 5B-2 include the coordinates in order: (1, 9), (2, 0), (3,0), (3, 9), (3, 8), (4, 7), (5, 6), (6, 5), (7, 4), and (8, 3). These coordinates are stored in the data fields in positions 1 through 0 respectively (see FIG. 5B-2) in the data set used as the authentication factor based on the path in FIG. 5B-1.

FIG. 5C-1 and its related Figure, FIG. 5C-2, illustrate a path represented by arrows 4041, 4042 on an instance 4040 of the frame of reference. The graphical path of FIG. 5C-1 and its related Figure, FIG. 5C-2, include the coordinates in order: (1, 6), (2, 7), (3, 8), (4, 9), (5, 0), (6, 0), (7, 9), (8, 8), (9, 7), and (0, 6). These coordinates are stored in the data fields in positions 1 through 0 respectively (see FIG. 5C-2) in the data set used as the authentication factor based on the path in FIG. 5C-1.

FIG. 5D-1 and its related Figure, FIG. 5D-2, illustrate a path represented by arrows 4051, 4052 on instance 4050 of the frame of reference. The graphical path of FIG. 5D-1 and its position number representation in FIG. 5D-2, include the coordinates in order: (0, 0), (0, 9), (0, 8), (0, 7), (0, 6), (9, 6), (8, 6), (7, 6), (6, 6), and (5, 6). These coordinates are stored in the data fields in positions 1 through 0 respectively (see FIG. 5D-2) in the data set used as the authentication factor based on the path in FIG. 5D-1.

FIG. 5E-1 and its related Figure, FIG. 5E-2, illustrate a path represented by arrows 4061, 4062, 4063, 4064, 4065 on instance 4060 of the frame of reference. The graphical path of FIG. 5E-1 and its position number representation in FIG. 5E-2 include the coordinates in order: (3, 0), (3, 9), (4, 9), (4, 0), (5, 0), (5, 9), (6, 9), (6, 0), (7, 0), and (7, 9). These coordinates are stored in the data fields in positions 1 through 0 respectively (see FIG. 5E-2) in the data set used as the authentication factor based on the path in FIG. 5E-1.

The ordered paths shown in FIGS. 5A-1 through 5E-1 and their related Figures, FIGS. 5A-2 through 5E-2, are herein considered continuous ordered paths, because all of the locations have coordinates on the path are adjacent to coordinates of other locations on the path in order. Continuous paths may be easier to remember for some clients.

Also, all in the set of representative ordered paths have the same number of data field locations (or data fields). Using the same number of locations (or data fields) on each graphical path facilitates the execution of the RPDPR authentication algorithm. In alternative, lengths of the ordered paths can vary from client to client.

Other embodiments of the invention use ordered paths that are non-continuous, such as described in reference to FIGS. 6A-1 to 6F-1 and their related Figures, FIGS. 6A-2 to 6F-2.

FIG. 6A-1 and its related Figure, FIG. 6A-2, illustrate a non-continuous path represented by arrows 6011, 6012, 6013 on instance 6010 of the frame of reference. The graphical path of FIG. 6A-1 and its position number representation in FIG. 6A-2 include the coordinates in order: (1, 1), (2, 2), (3, 3), (8, 3), (9, 2), (0, 1), (0, 7), (0, 8), (0, 9), and (0, 0). A discontinuity in the path occurs between coordinates (3, 3) and (8, 3). Also, a discontinuity occurs between coordinates (0, 1) and (0, 7). These coordinates are stored in the data fields in positions 1 through 0 (see FIG. 6A-2) respectively in the data set used as the authentication factor based on the path in FIG. 6A-1.

FIG. 6B-1 and its related Figure, FIG. 6B-2, illustrate a non-continuous path represented by arrows 6021, 6022 on instance 6020 of the frame of reference. The graphical path of FIG. 6B-1 and its position number representation in FIG. 6B-2 include the coordinates in order: (6, 4), (7, 4), (8, 4), (9, 4), (0, 4), (0, 7), (9, 7), (8, 7), (7, 7), and (6, 7). These coordinates are stored in the data fields in positions 1 through 0 respectively (see FIG. 6B-2) in the data set used as the authentication factor based on the path in FIG. 6B-1.

FIG. 6C-1 and its related Figure, FIG. 6C-2, illustrate a non-continuous path represented by arrows 6031, 6032, 6033 and cross 6034 on instance 6030 of the frame of reference. The path of FIG. 6C-1 and its position number representation in FIG. 6C-2 include the coordinates in order: (1, 1), (2, 1), (3, 1), (0, 1), (0, 2), (0, 3), (0, 0), (9, 0), (8, 0), and (1, 0). These coordinates are stored in the data fields in positions 1 through 0 respectively (see FIG. 6C-2) in the data set used as the authentication factor based on the path in FIG. 6C-1.

FIG. 6D-1 and its related Figure, FIG. 6D-2, illustrate a non-continuous path represented by crosses 6041, 6042, 6043, 6044, 6045, 6046, 6047, 6048, 6049, 6059 on instance 6040 of the frame of reference. The graphical path of FIG. 6D-1 and its position number representation in FIG. 6D-2 include the coordinates in order: (1, 1), (3, 3), (5, 5), (7, 7), (9, 9), (1, 0), (3, 8), (5, 6), (7, 4), and (9, 2). These coordinates are stored in the data fields in positions 1 through 0 respectively (see FIG. 6D-2) in the data set used as the authentication factor based on the path in FIG. 6D-1.

FIG. 6E-1 and its related Figure, FIG. 6E-2, illustrate a non-continuous path represented by crosses 6051, 6052, 6053, 6054 and arrow 6055 on instance 6050 of the frame of reference. The graphical path of FIG. 6E-1 and its position number representation in FIG. 6E-2 include the coordinates in order: (1, 1), (0, 1), (0, 0), (1, 0), (3, 8), (4, 7), (5, 6), (6, 5), (7, 4), and (8, 3). These coordinates are stored in the data fields in positions 1 through 0 respectively (see FIG. 6E-2) in the data set used as the authentication factor based on the path in FIG. 6E-1.

FIG. 6F-1 and its related Figure, FIG. 6F-2, illustrate a non-continuous path represented by arrows 6061, 6062, 6063 and cross 6064 on instance 6060 of the frame of reference. The graphical path of FIG. 6F-1 and its position number representation in FIG. 6F-2 include the coordinates in order: (8, 0), (9, 0), (0, 0), (0, 9), (0, 8), (0, 7), (9, 8), (8, 9), (7, 0), and (9, 9). These coordinates are stored in the data fields in positions 1 through 0 respectively (see FIG. 6F-2) in the data set used as the authentication factor based on the path in FIG. 6F-1.

In-Band Server Authentication to the User and User/Server Mutual Authentication

Figure 7A:
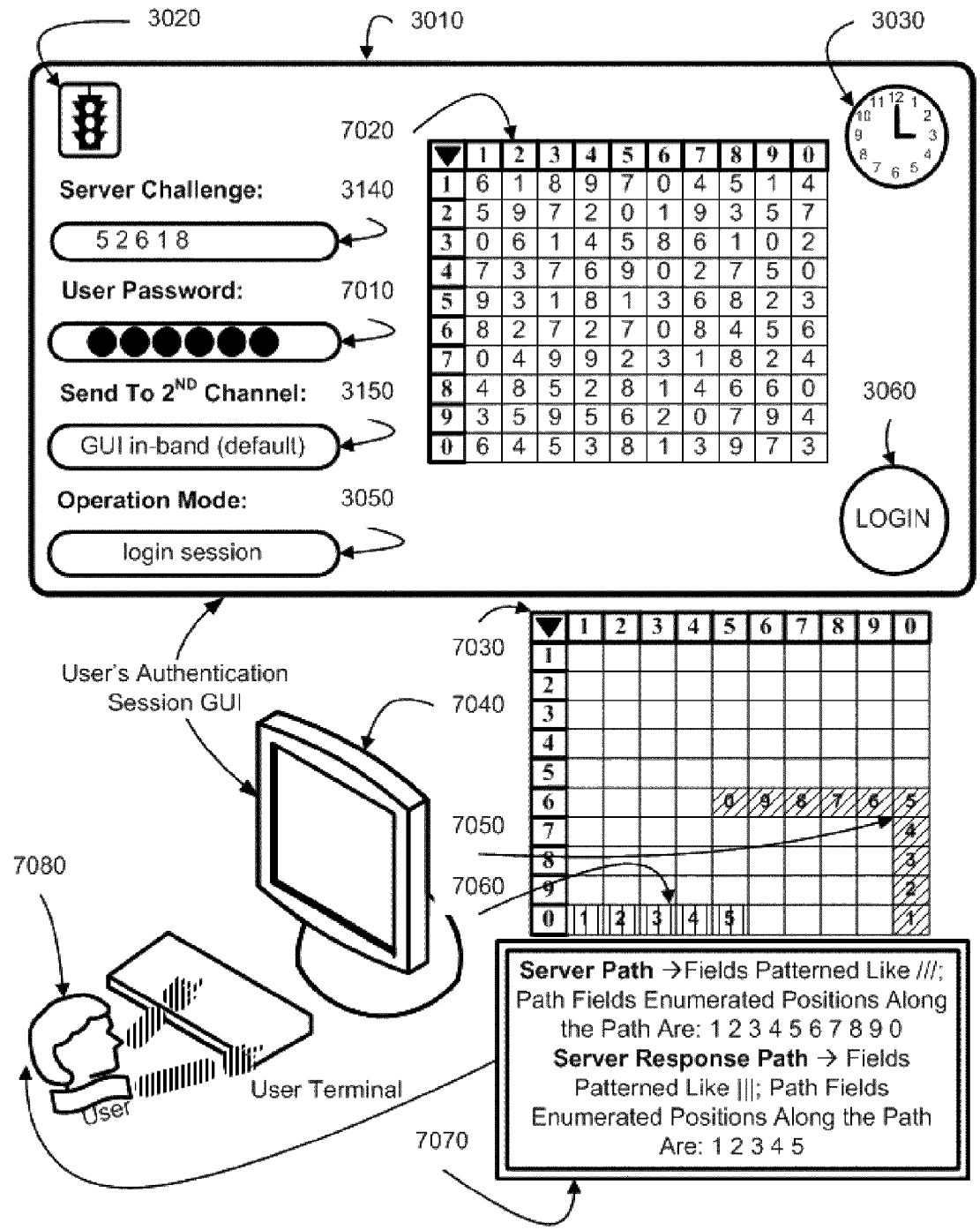
FIG. 7A illustrates a graphical user interface in a desktop or laptop's browser or on a screen supporting the second step of server to the user in-band authentication with a challenge to a server previously manually generated by the user (or generated automatically with an option of being either edited, or approved by the user as it was shown at the first login or reset process step in FIGS. 3A and 3B). The hidden in the grid shared secret credentials to authenticate the server are Server Path and Server Response Path. Upon successful server authentication by the user, the user's password is entered to authenticate the user to the server and to complete user/server mutual authentication in one of the preferred embodiments of this invention.

FIG. 7A illustrates a server authentication to the user based on two static shared secrets hidden in reference grid 7030-Server Path 7050 and Server Response Path 7060, which are both user 7080/server shared secrets 7070 being directed patterns of fields (paths of fields) in reference grid 7020. Server Path 7050 in one of the preferred embodiments of this invention is a ten fields long continues path of fields, whereas Server Response Path 7060 is a five fields long continues path of fields. First, as it is shown in FIG. 3B, the user starts a server authentication process to user 7080 by sending to a server User Name in field 3040 and Server Challenge in field 3140 when clicking on LOGIN button 3060. "Send To 2nd Channel:" menu 3150 selection is "GUI in-band (default)" 3230 for any in-band case, and Operation Mode menu 3050 (see FIG. 3A) is set to "login session" in one of the preferred embodiments of this invention. Second, Server Challenge is displayed in FIG. 7A at field 3140 of graphical construct 3010 returned from a server to the user. The Server Challenge has the same value 5 2 6 1 8 that was sent to a server in FIG. 3B, and it is shown back in FIG. 7A for a user convenience. Reference grid 7020 is populated in every field with a session-only random digital content. Each digit from 0 to 9 is met ten times in session-only random field locations for every grid instantiation. For instance, digit "8" is met in the following grid (X, Y) locations in FIG. 7A: 1. (3, 1), 2. (6, 3), 3. (4, 5), 4. (8, 5), 5. (1, 6), 6. (7, 6), 7. (8, 7), 8. (2, 8), 9. (5, 8), 10. (5, 0). Once the grid is invoked for another session, this set of coordinates for "8" will be updated as well as for all other digits populating the grid fields. Nevertheless, each digit will still be met ten times on the grid.

User 7080 in FIG. 7A looks at grid 7020 and Server Challenge in field 3140 on User Terminal 7040, and having remembered Server Path 7050 information in reference grid 7030, user 7080 deduces the value of a Server Response based on a cognitive recognition according to Random Partial Digitized Path Recognition (RPDPR) algorithm. The first digit in the Server Challenge 5 2 6 1 8 in field 3140 is "5" pointing to the fifth field position on Server Path 7050. According to grid 7020, the fifth field along the Server Path contains a digit which value is "6". The second digit in the Server Challenge 5 2 6 1 8 in field 3140 is "2" pointing to the second field position on Server Path 7050. According to grid 7020 the second field along the Server Path contains a digit which value is "4". The third digit in the Server Challenge 5 2 6 1 8 in field 3140 is "6" pointing to the sixth field position on Server Path 7050. According to grid 7020 the sixth field along the Server Path contains a digit which value is "5". Continue in a similar fashion with remaining digits "1" and "8" of the Server Challenge 5 2 6 1 8 in field 3140, user 7080 finds that the Server Response is to be 6 4 5 3 8. Eventually, user 7080 looks at User Terminal 7040, at grid 7020 where Server Response Path 7060 is located and user 7080 compares the Server Response which user 7080 has already deduced with the sequence of digit values displayed inside Server Response Path in 7020. It is apparent in this case that Server Response Path in grid 7020 that is located in grid fields with (X, Y) coordinates 1. (1, 0), 2. (2, 0), 3. (3, 0), 4. (4, 0), 5. (5, 0) according to Server Response Path 7060 set during the user account setup, has the same sequence of digits 6 4 5 3 8 as deduced earlier by user 7080.

Hence, the deduced Server Response and the Server Response displayed in the grid 7020 are the same. This entire match of the deduced and displayed Server Response values is possible only under condition that the server knows both credentials—Server Path 7050 and Server Response Path

7060 in FIG. 7A. From now on, having an assurance that the server has been authenticated to the user, user 7080 can proceed to either entering user's credentials to authenticate user 7080 to the server, or enter into a server page field some required by the server Personally Identifiable Information (PII), or enter in a server page any personally or business security sensitive information. It is shown in FIG. 7A that in one preferred embodiment of this invention user 7080 enters user's password in field 7010. Then, user clicks LOGIN button 3060 sending password information to the server. At this point, the stop light turns from red to yellow while the data are in transit on communication lines or processed by the server's CPU—this time is limited by the bandwidth, computer CPU power, and data traffic. Eventually, the traffic light 3020 turns green once the user is positively authenticated by the server. That would also manifest the completion of user/server mutual authentication process/protocol. Otherwise, the server will flag a failed user authentication by returning back red color of the traffic light 3020 and may be showing a warning or error message.

Figure 7B:
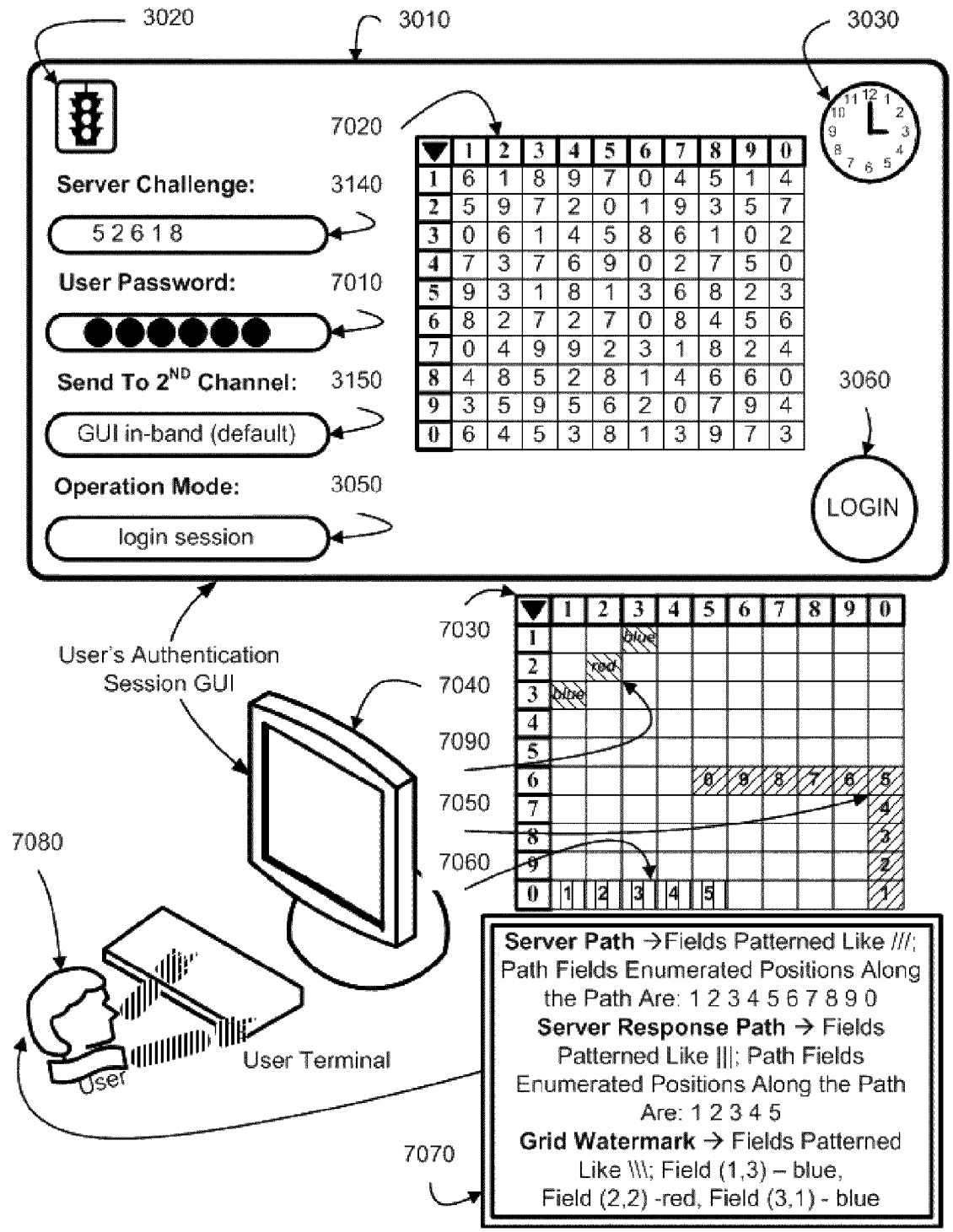
FIG. 7B illustrates a graphical user interface in a desktop or laptop's browser or on a screen supporting the second step of server to the user in-band authentication with a challenge to a server previously manually generated by the user (or generated automatically with an option of being either edited, or approved by the user as it was shown at the first login or reset process step in FIGS. 3A and 3B). The hidden in the grid shared secret credentials to authenticate the server are Server Path and Server Response Path and Grid Watermark. Upon successful server authentication by the user, the user's password is entered to authenticate the user to the server and to complete user/server mutual authentication in one of the preferred embodiments of this invention.

FIG. 7B is similar to FIG. 7A with the only exception that user 7080 is to remember Grid Watermark pattern 7090 in the reference grid 7030. This pattern is to be presented exactly as pattern 7090 at each grid instantiation like 7020. In one of the preferred embodiments of this invention, Grid Watermark 7090 is a set of certain, customized by user 7080 during the account setup, selected fields' background colors. In FIG. 7B, Grid Watermark is a blue background color in a field with (X, Y) coordinates (1, 3), a red background color in a field with (X, Y) coordinates (2, 2), and a blue background color in a field with (X, Y) coordinates (3, 1). Grid Watermark 7090 is a user personalized server credential. Used together with Server Path 7050 and Server Response Path 7060, Grid Watermark 7090 can be considered as a first server's authentication factor to get authenticated to the user, whereas Server Path and Server Response can be considered as the second and third server's authentication factors. That is, we have three-factor server authentication to the user. While not being highly secure server authentication factor, Grid Watermark 7090 based on a pattern of grid fields with user personalized background colors provides an additional layer of practical security against phishing and pharming attacks by hackers or exploiting their skills criminal organizations.

The session-only random Server Challenge placed in field 3140 in FIGS. 3A, 3B, 7A, and 7B is being generated on a client side by user 7080. It is an effective protection against targeted replay attacks, when an intruder records the correct graphical constructs that led to a positive server authentication event, and then trying to replay them again. Essentially, it is more than that, and it is presenting a paradigm shift in a server authentication to the user, because besides a protection against replay attacks, it brings interactivity in user/server communication providing, in combination with RPSSR algorithms used to authenticate a server to the user, a low entropy leakage (a loss of credential security per one authentication session), high resilience against guessing attacks, and scalable security with a very strong sense of the personal user engagement in a server authentication process security. A Server Challenge or a Server Response or a Grid Watermark values defined by the user at a client platform and sent to a server, which begins an interactive user/server authentication protocol, and the entire RPSSR-based protocol for a server authentication to the user are introduced here. A unique capability of the technology introduced here is a secure veiling of the server credentials as the user who looks at the FIG. 7A graphical construct performs cognitive recognition process of matching Server Responses without actually performing any visible physical instructions or operations. Therefore, there are no traces left during the session that would allow the intruder to easily uncover the server credentials like Server Path and Server Response. It is apparent, if compared with the SiteKey technology developed by Passmark Security and sold to Bank of America and The Vanguard Group (see http://en.wikipedia.org/wiki/SiteKey). The personalized image and the related to the image text are weakly protected by so called security questions that can be easily guessed or stolen, then, the SiteKey can be copied by an intruder in several authentication session leading to 100% entropy leakage in few authentication sessions, not speaking of huge usability issues by requiring all users to answer security questions even before the actual mutual authentication session begins. Credentials entropy leakage analysis shows that the technology introduced above has serious security advantages over the SiteKey based approach.

Figure 7C:
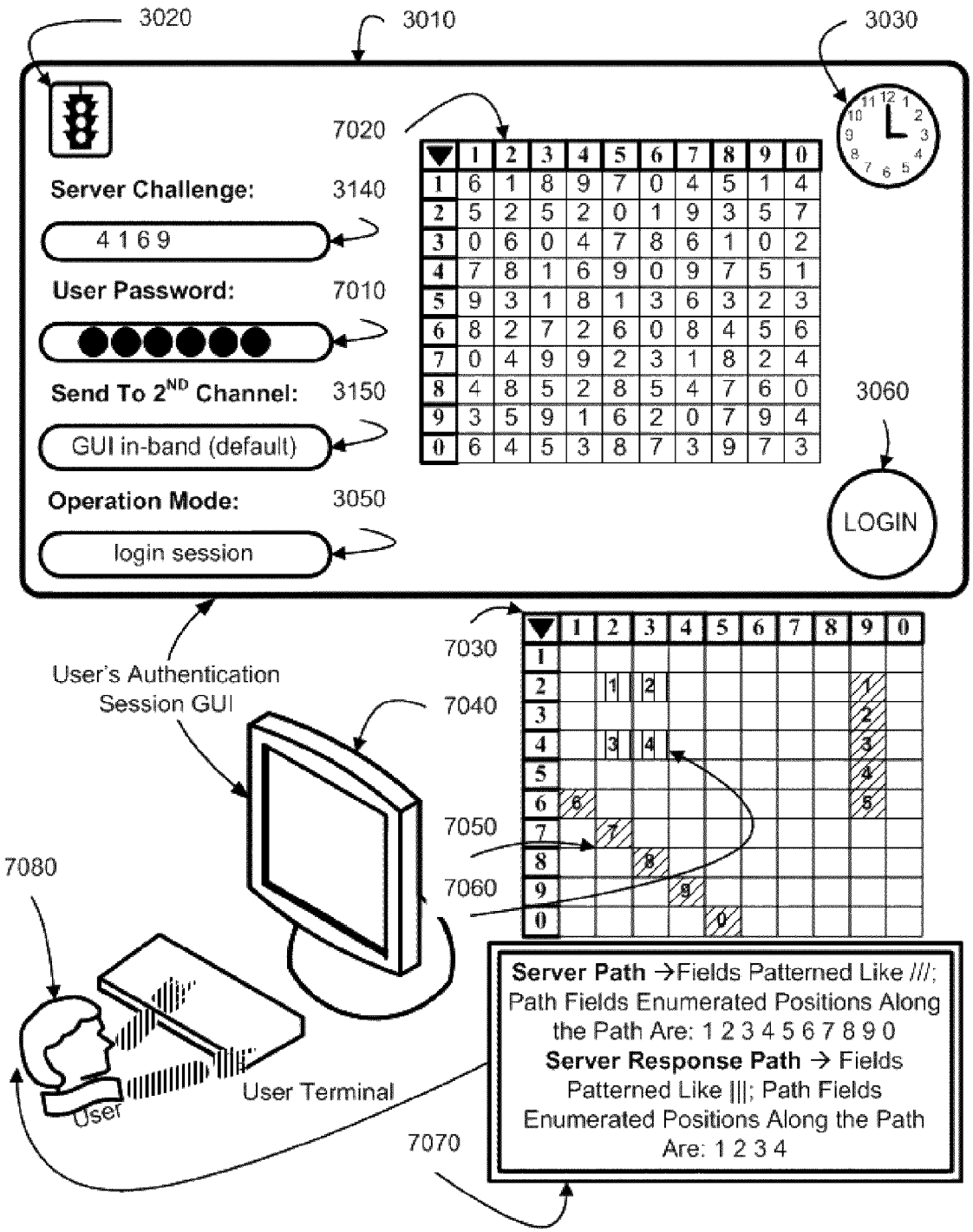
FIG. 7C illustrates a graphical user interface in a desktop or laptop's browser or on a screen supporting the second step of server to the user in-band authentication with a challenge to a server previously manually generated by the user (or generated automatically with an option of being either edited, or approved by the user as it was shown at the first login or reset process step in FIGS. 3A and 3B). The hidden in the grid shared secret credentials to authenticate the server are Server Path and Server Response Path, each having a one path discontinuity on the grid. Upon successful server authentication by the user, the user's password is entered to authenticate the user to the server and to complete user/server mutual authentication in one of the preferred embodiments of this invention.

FIG. 7C is similar to FIG. 7A with the only one exception that the server credentials Server Path 7050 and Server Response Path 7060 have one break point of path continuity each. Server Path 7050 has a discontinuity (or a break point) between fields having enumerated positions 5 and 6 along the Server Path, whereas Server Response Path 7060 has a discontinuity (or a break point) between fields having enumerated positions 2 and 3 along the Server Response Path. These break points drastically increase credentials' combinatorial capacity (guessing entropy) and hence, resilience against guessing attacks.

Server Challenge in field 3140 is pointing to Server Path 7050 fields having enumerated positions 4 1 6 9 along Server Path 7050. The digits populated by the server in these positions are 2 5 8 1. This sequence of digits is completely matching with the digits along Server Response Path 7060. Looking at grid 7020, one can see that indeed the digital content in fields with (X, Y) coordinates 1. (2, 2), 2. (3, 2), 3. (2, 4), 4. (3, 4) is exactly the same 2 5 8 1. Hence, the deduced Server Response and the Server Response displayed in the grid 7020 are the same. This entire match of a deduced and displayed Server Response values is possible only under condition that the server knows both credentials—Server Path 7050 and Server Response Path 7060 in FIG. 7A. From now on, having an assurance that the server has been authenticated to the user, user 7080 can proceed to either entering user's credentials to authenticate user 7080 to the server, or enter into a server page field some required by the server Personally Identifiable Information (PII), or enter in a server page any personally or business security sensitive information. It is shown in FIG. 7C, that in one of the preferred embodiments of this invention user 7080 enters user's password in field 7010. Then, user clicks LOGIN button 3060 sending password information to the server. At this point, the stop light turns from red to yellow, while the data are in transit on communication lines or processed by the server's CPU—this time is limited by the bandwidth, computer CPU power, and data traffic. Eventually, the traffic light 3020 turns green, once the user is positively authenticated by the server. That would also manifest the completion of user/server mutual authentication process/protocol. Otherwise, the server will flag a failed user authentication by returning back red color of the traffic light 3020 and may be showing a warning or error message.

Figure 7D:
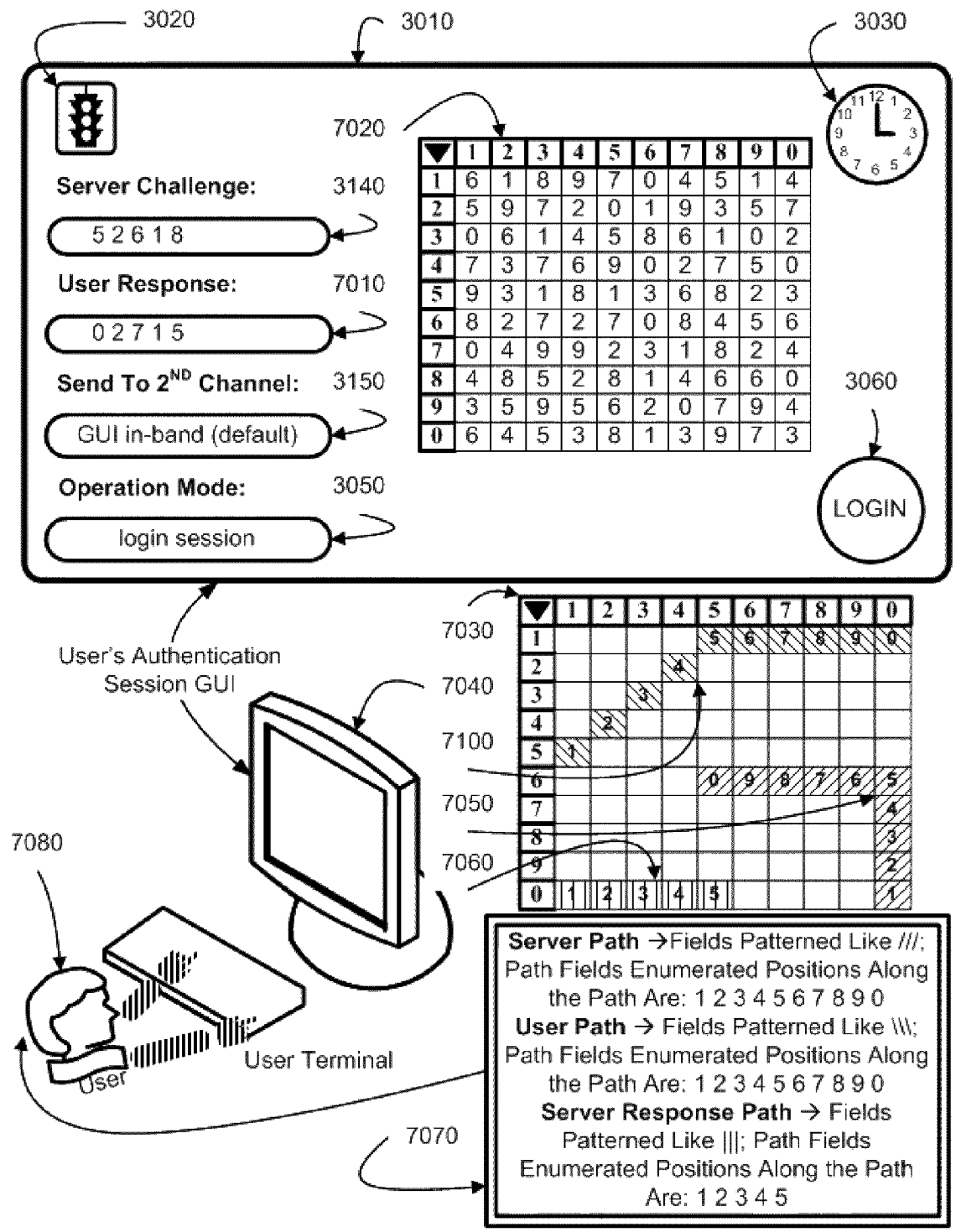
FIG. 7D illustrates a graphical user interface in a desktop or laptop's browser or on a screen supporting the second step of server to the user in-band authentication with a challenge to a server previously manually generated by the user (or generated automatically with an option of being either edited, or approved by the user as it was shown at the first login or reset process step in FIGS. 3A and 3B). The hidden in the grid shared secret credentials to authenticate the server are Server Path and Server Response Path. Upon successful server authentication by the user, the server's authentication response is used as a server authentication challenge to the hidden in the grid shared secret User Path, then the User Response is entered to authenticate the user to the server and to complete user/server mutual authentication in one of the preferred embodiments of this invention.

FIG. 7D is similar to FIG. 7A with the only one difference that the user authenticates to the server using RPDPR authentication credential—User Path 7100 in grid 7030. First, similarly to what was described for FIG. 7A, a server to the user authentication process takes place. Second, Server Response Path data 6 4 5 3 8 that are placed in field 7060 are used as a User Challenge (or OTAC) to enter User Response (or OTAR)

for user 7080 into field 7010 based on this User Challenge (which is the same as Server Response 7060 in FIG. 7D) and User Path 7100 in the grid 7030. Hence, FIG. 7D illustrates user/server mutual authentication based on the same RPDPR authentication factor but different credentials used: Server Path 7050 and Server Response Path are used to authenticate a server to the user, whereas User Path 7100 and User Challenge (equal to Server Response Path 7060 in FIG. 7D) is used to authenticate a user to the server.

Figure 7E:
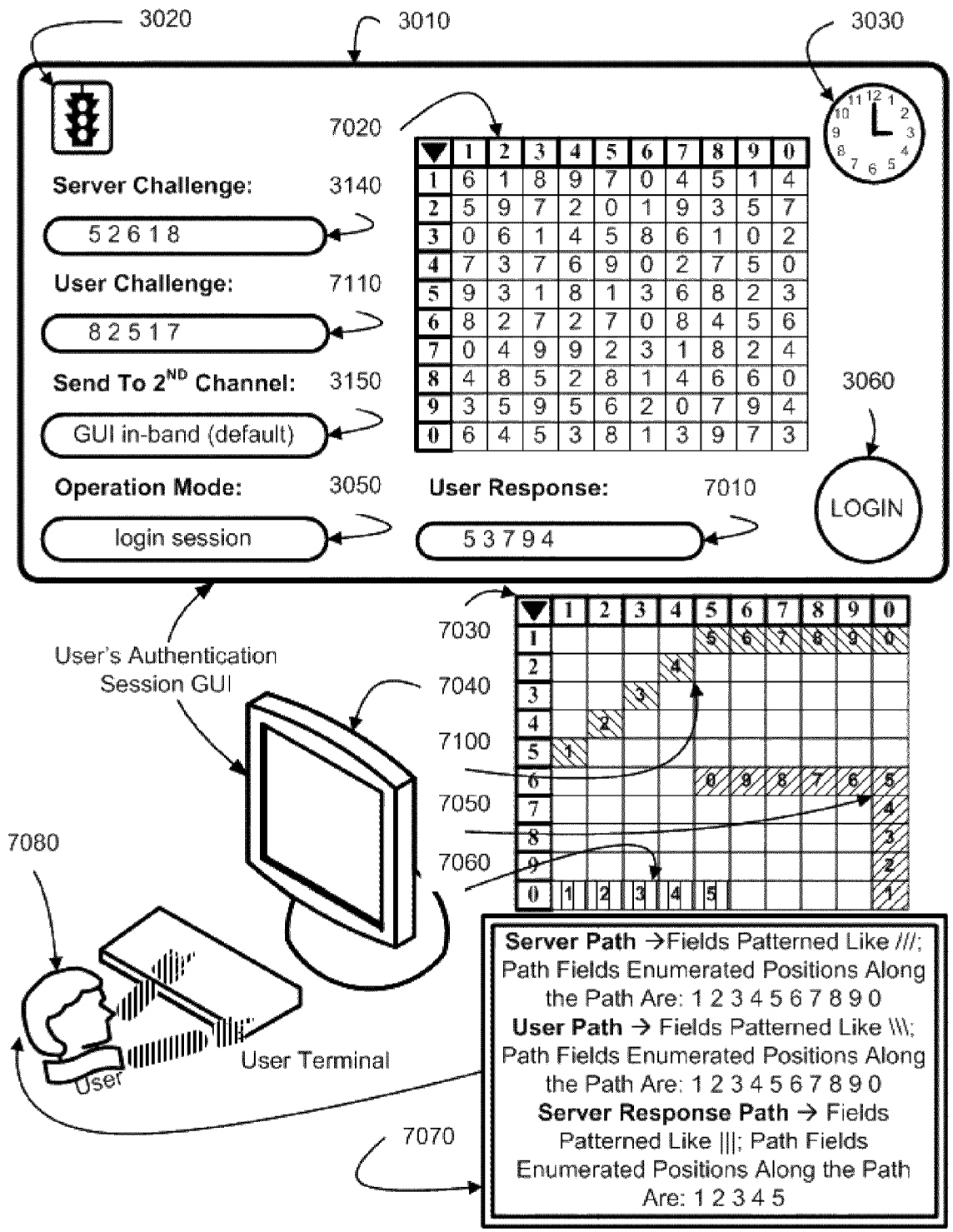
FIG. 7E illustrates a graphical user interface in a desktop or laptop's browser or on a screen supporting the second step of server to the user in-band authentication with a challenge to a server previously manually generated by the user (or generated automatically with an option of being either edited, or approved by the user as it was shown at the first login or reset process step in FIGS. 3A and 3B). The hidden in the grid shared secret credentials to authenticate the server are Server Path and Server Response Path. Upon successful server authentication by the user, the server generated User Challenge and the hidden in the grid shared secret User Path are used to enter the User Response to authenticate the user to the server and to complete user/server mutual authentication in one of the preferred embodiments of this invention.

FIG. 7E differs from FIG. 7D only in one respect—instead of using Server Response Path 7060 as a User Challenge, field 7110 is assigned in graphical construct 3010 to display User Challenge generated by the server, once the server returns to the user grid 7020 along with Server Challenge 3140. In the particular case presented in FIG. 7E, a User Challenge value in field 7110 is equal to 8 2 5 1 7 with each consecutive digit pointing to a respective field position along User Path 7100. The digital content in such pointed fields on User Path 7100 having (X, Y) coordinates 8→(8, 1), 2→(2, 4), 5→(5, 1), 1→(1, 5), 7→(4, 1) will be User Authentication Response 5 3 7 9 4 placed in field 7010. When user 7080 begins entering the password in field 7010, traffic light 3020 turns from green to red. Then, user clicks LOGIN button 3060 sending RPDPR OTAR (User Response 7010) information to the server. At this point, stop light 3020 turns from red to yellow while the data are in transit on communication lines or processed by the server's CPU—this time is limited by the bandwidth, computer CPU power, and data traffic. Eventually, traffic light 3020 turns green once the user is positively authenticated by the server. That would also manifest the completion of user/server mutual authentication process/protocol. Otherwise, the server will flag a failed user authentication by returning back red color of the traffic light 3020 and may be showing a warning or error message. FIG. 7E implementation of mutual user/server authentication presents more usable and secure technology as compared to the one presented in FIG. 7D because User Challenge is unrelated to the Server Response Path and explicitly generated at the server and presented to the user in field 7110, so that the user and server credentials are completely unbound reducing credentials reengineering opportunities for a hacker.

Figure 7F:
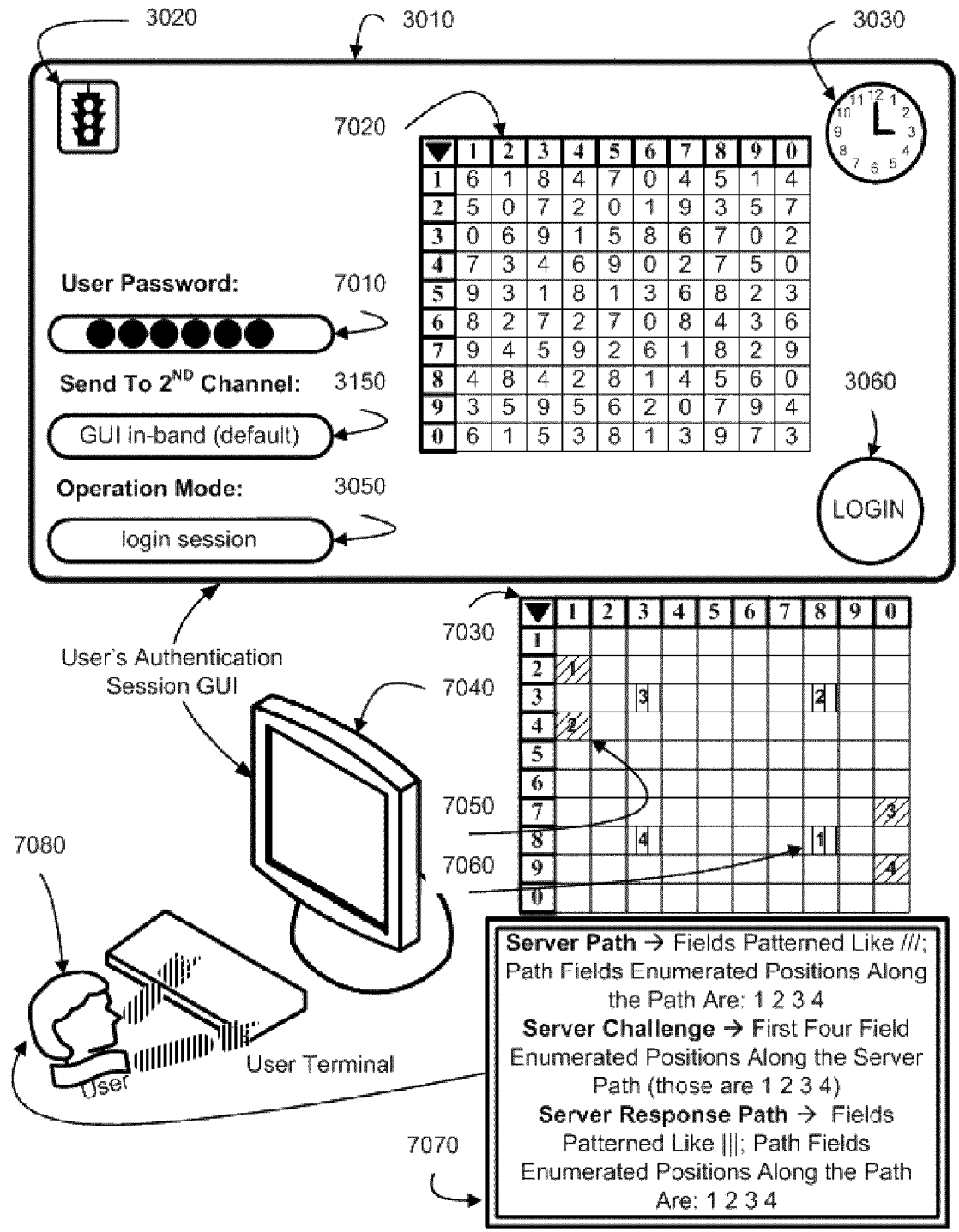
FIG. 7F illustrates a graphical user interface in a desktop or laptop's browser or on a screen supporting the second step of server to the user in-band authentication with a Server Challenge being the first four consecutive enumerated field positions on the Server Path. Hence, the first step (see FIG. 3D) is just the User Name which is sent to a server alone without accompanying it with a Server Challenge. The hidden in the grid shared secret credentials to authenticate the server are Server Path and Server Response Path, each having several discontinuities along the paths on the grid. Upon successful server authentication by the user, the user's password is entered to authenticate the user to the server and to complete user/server mutual authentication in one of the preferred embodiments of this invention.

FIG. 7F is illustrating another concept of a Server Challenge. First, user 7080 sends to a server just a user name without any session-specific challenge to a server, as in FIG. 3D. Now, it is not something generated by the user, but it is a digital content in the first four fields ("four" is just a setting selected by the system administrator; instead, it can be any value within a reasonable range, say from three to six) of Server Path 7050. That is the Server Challenge value will be the digital content in the first consecutive fields of the Server Path having (X, Y) coordinates 1. (1, 2), 2. (1, 4), 3. (0, 7), 4. (0, 9) and the corresponding value according to the current session grid instantiation 7020 in graphical construct 3010 of FIG. 7F is 5 7 9 4. Server Response Path 7060 presents exactly the same values in its fields with (X, Y) coordinates 1. (8, 8), 2. (8, 3), 3. (3, 3), 4. (3, 8). Thus, the server proves to user 7080 that that it knows Server Path 7050 credential and Server Response Path 7060 credential, so that server gets authenticated to the user. The danger with this technology lays in a possibility of a replay attack. A possible remedy preventing replay attacks is discussed later in the text.

Figure 7G:
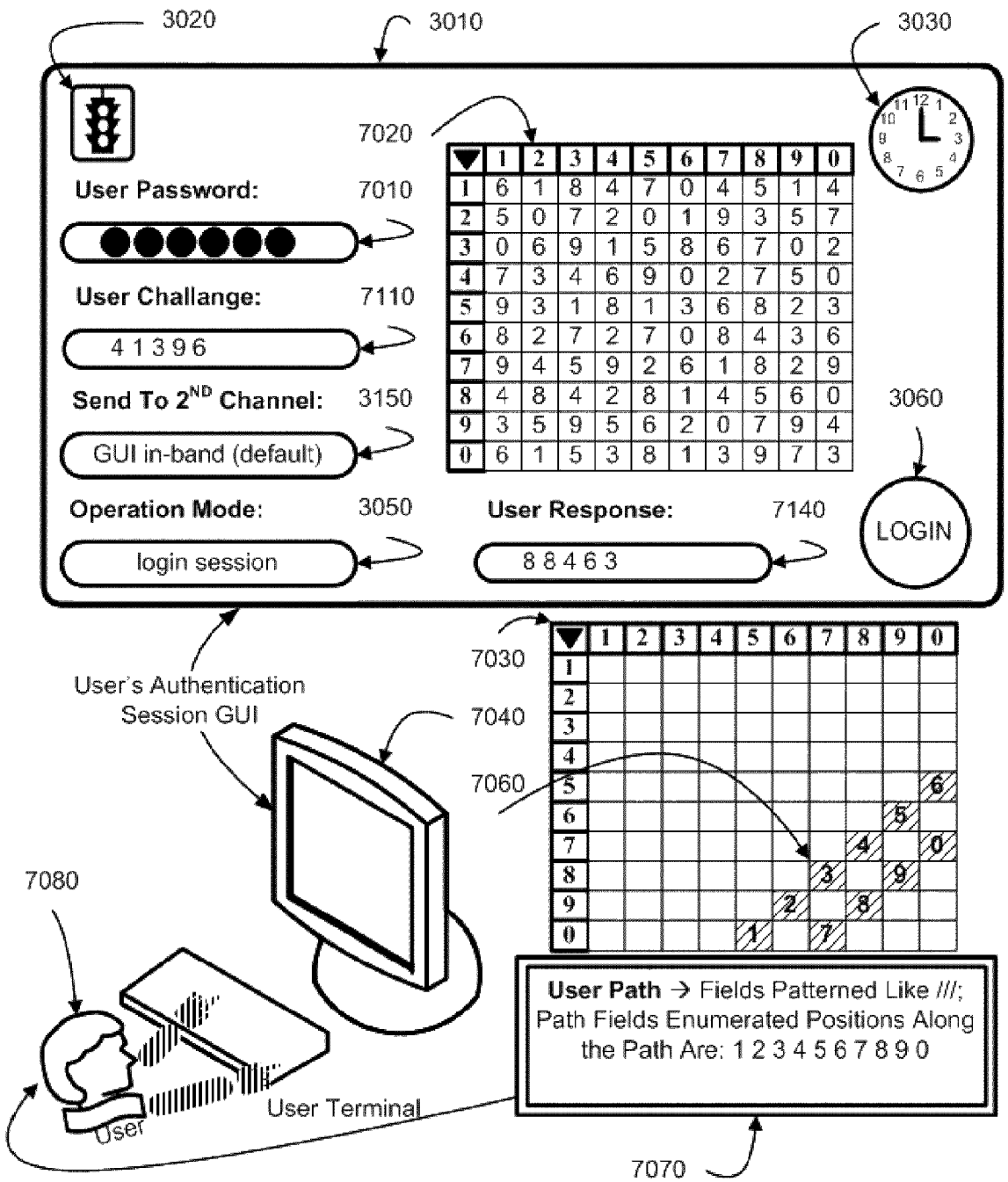
FIG. 7G illustrates a possible continuation of the processes depicted in FIG. 7F with the only difference related to the user authentication to the server, which this time is being a two-factor authentication with a shared secret User Path hidden in the grid and the server generated User Challenge used by the user after entering the User Password into graphical user interface. That completes the user/server mutual authentication process in one of the preferred embodiments of this invention.

FIG. 7G illustrates that after the server got authenticated to the user 7080, then user 7080 authentication to the server can be a two-factor authentication as well, unlike all the previous presented cases. The first authentication factor in FIG. 7G is based on user 7080 password 7010, and the second factor is based on RPDPR with User Challenge 7110, User Response 7140, and User Path 7060 (the user's credential) in user 7080 account set up grid 7030.

Figure 7H:
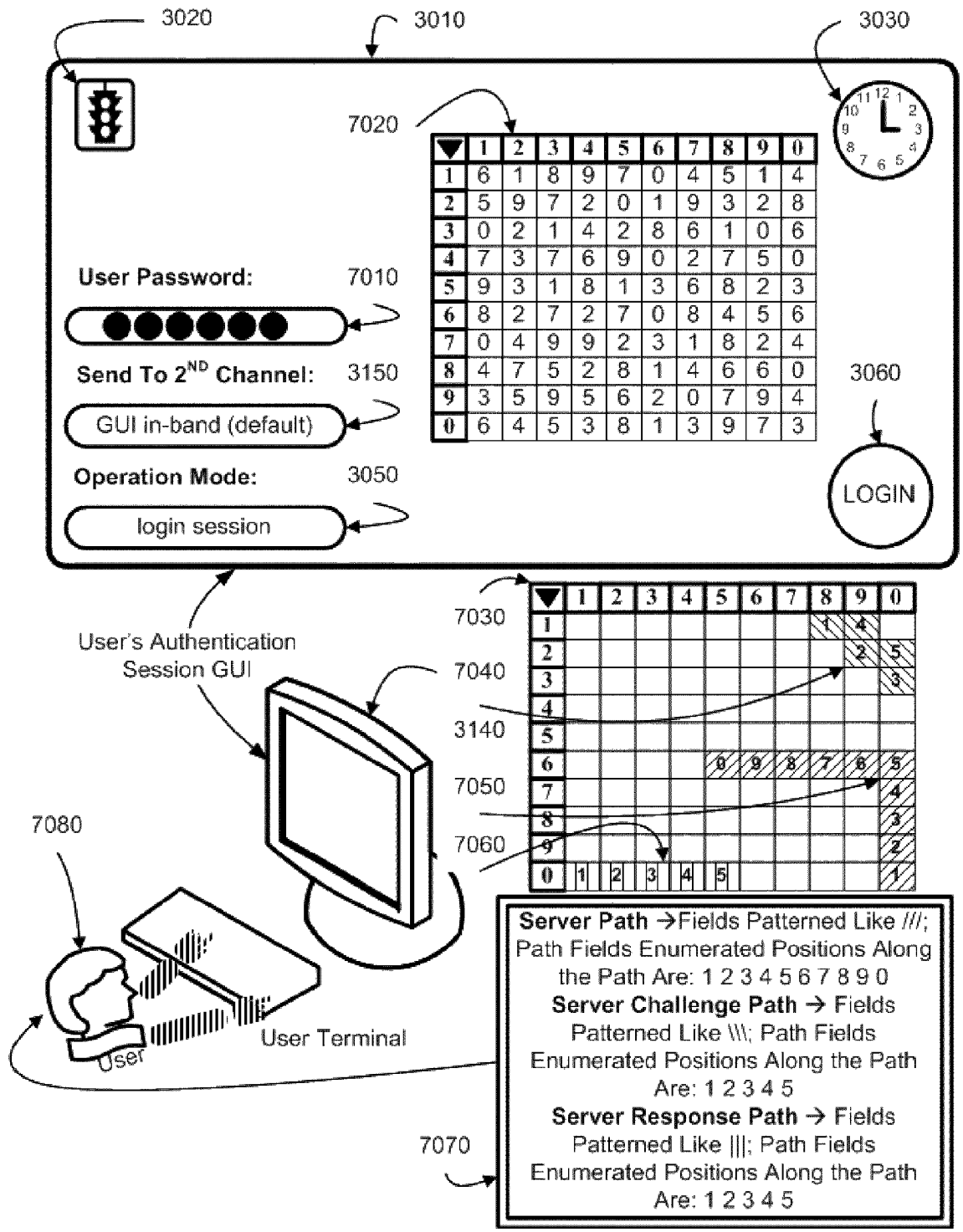
FIG. 7H illustrates a graphical user interface in a desktop or laptop's browser or on a screen supporting the second step of a server to the user in-band authentication. The first step (see FIG. 3D) is just the User Name is sent to a server alone without accompanying it with a Server Challenge. The hidden in the grid shared secret credentials to authenticate the server are Server Path, Server Challenge Path, and Server Response Path. Upon successful server authentication by the user, the user's password is entered to authenticate the user to the server and to complete user/server mutual authentication in one of the preferred embodiments of this invention.

FIG. 7H illustrates another preferred embodiment of a server authentication to user 7080 based on RPDPR authentication factor. First, user 7080 sends to a server just a user name without any session-specific challenge to a server, as in FIG. 3D. In the returned to user 7080 graphical construct 3010 Server Challenge Path 7040, Server Path 7050, and Server Response Path 7060 are all hidden in grid 3010, all three being server credentials. Similarly to FIG. 7G, the danger with this technology lays in a possibility of a replay attack. A possible remedy preventing replay attacks is discussed later in the text.

Figure 7I:
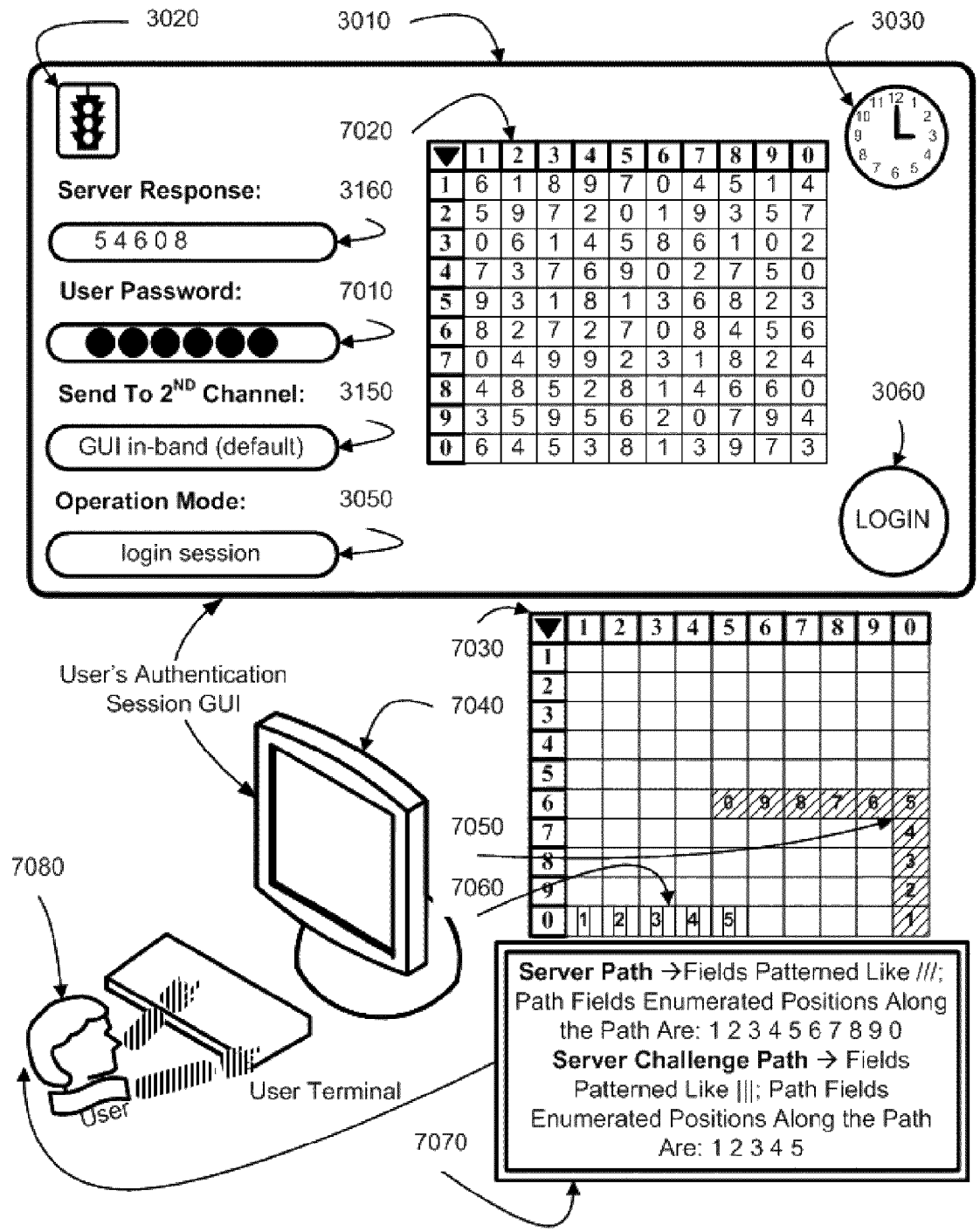
FIG. 7I illustrates a graphical user interface in a desktop or laptop's browser or on a screen supporting the second step of a server to the user in-band authentication. The first step (see FIG. 3E) is just the User Name and Server Response value generated or edited by the user is sent to a server. The hidden in the grid shared secret credentials to authenticate the server are Server Path and Server Challenge Path, and Server Response value defined by the user in the first step in FIG. 3E is explicitly displayed in the GUI's field. Upon successful server authentication by the user, the user's password is entered to authenticate the user to the server and to complete user/server mutual authentication in one of the preferred embodiments of this invention.

FIG. 7I illustrates another embodiment of this invention for the in-band server authentication to the user. First, user 7080 sends to a server just a user name without any session-specific challenge to a server, as in FIG. 3D. Second, graphical construct 3010 returned from a server to user 7080 contains Server Path 7050 and Server Challenge 7060 hidden in instantiated for the current session grid 7020. Also, these credentials are depicted in virtual grid 7030, which directed patterns user 7080 had chosen as server credentials and remembered them since setting up user's account. The new feature of this technology is the User Response which value 5 4 6 0 8 is placed in field 3160 outside of grid 7020. Similarly to FIG. 7G, the danger with this technology lays in a possibility of a replay attack. A possible remedy preventing replay attacks is discussed later in the text.

Out-of-Band Server Authentication to the User and User/Server Mutual Authentication In-band server authentication to the user described above provides elevated security against phishing and pharming attacks, because RPDPR in particular as well as other RPSSR authentication methods never require to use the entire credential at any given authentication session, but just a session-only random subset of a credential. Another security component is based on the fact that the user, except a cognitive recognition of the server's authentication response (Server Response or OTAR), need not perform any physical steps that could be recorded and somehow interpreted by a hacker. Nevertheless, a hacker can record a session grid and in some cases either a Server Challenge (or OTAC) or a Server Response (or OTAR). That creates a danger that analyzing such information over a number of the server to the user authentication sessions, a hacker may reengineer the Server Path credential. Therefore, in order to enhance practical security of user personalized server credentials, it is important to somehow split access to the mentioned above session authentication information available to a hacker.

Figure 8A:
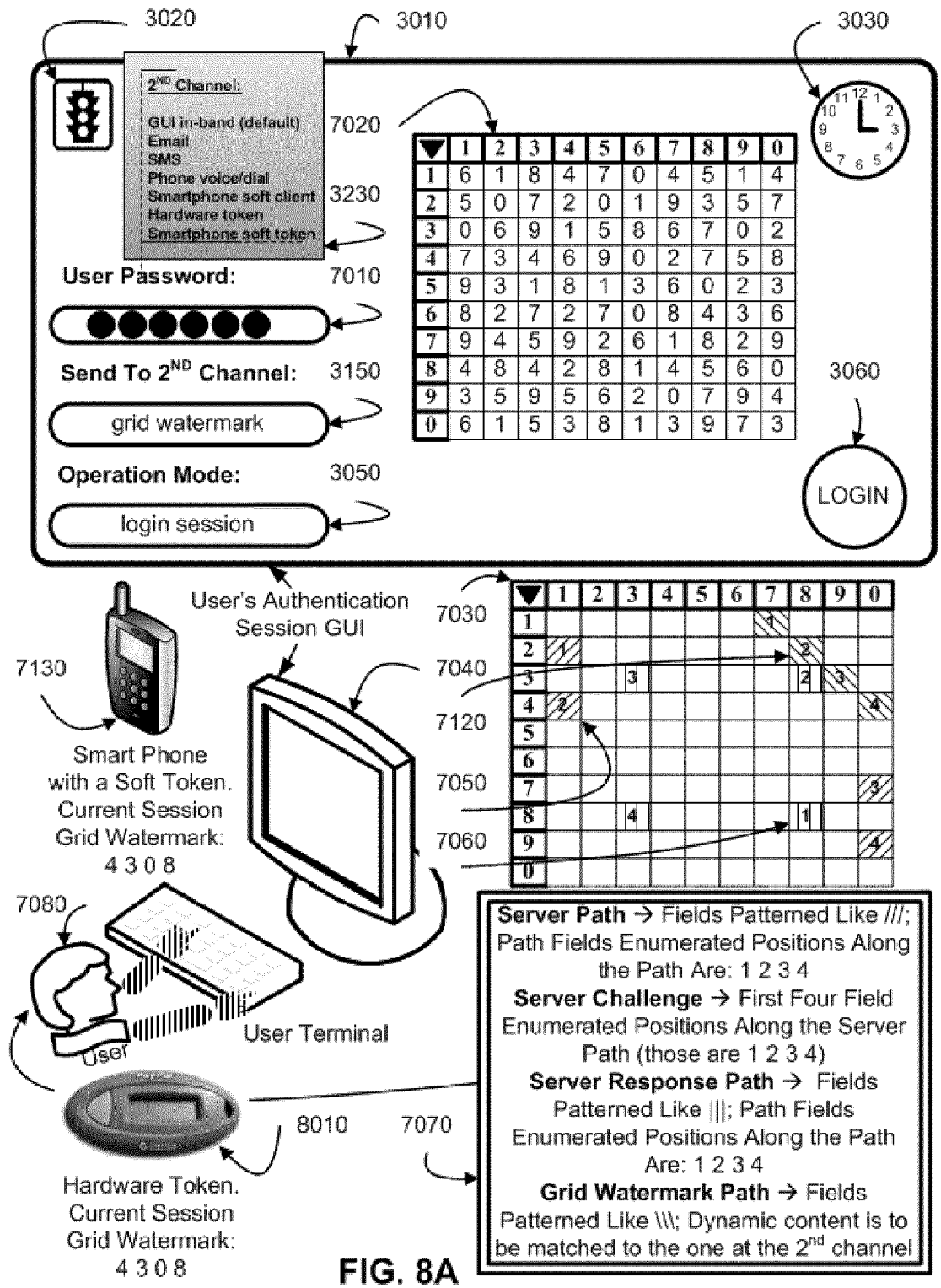
FIG. 8A illustrates a graphical user interface in a desktop or laptop's browser or on a screen supporting the second step of a server to the user out-of-band authentication with a software token in a smartphone as a second channel. The first step (see FIG. 3E) is just the User Name which is sent to a server alone without accompanying it with a Server Challenge. The hidden in the grid shared secret credentials to authenticate the server are Server Path, Server Response Path, and Grid Watermark Path, whereas the Server Challenge is digital content in the first four fields having enumerated positions along the Server Path. Session dynamic content in the fields along the Grid Watermark Path is to be matched to the software token content displayed on the smartphone. Upon successful server authentication by the user, his/her password is entered to authenticate the user to the server and to complete user/server mutual authentication in one of the preferred embodiments of this invention.

FIG. 8A illustrates an out-of-band server authentication to the user being one of the preferred embodiments of this invention. FIG. 8A, quite similarly to FIG. 7F, is illustrating another concept of a Server Challenge. First, user 7080 sends to a server just a user name without any session-specific challenge to a server, as in FIG. 3D. Now, it is not something generated by the user, but it is a digital content in the first four fields of Server Path 7050 ("four" is just a setting selected by the system administrator; instead, it can be any value within a reasonable range, say from three to six). That is the Server Challenge value will be the digital content in several consecutive fields (starting from the first field) of the Server Path having (X, Y) coordinates 1. (1, 2), 2. (1, 4), 3. (0, 7), 4. (0, 9) and the corresponding value according to the current session grid instantiation 7020 in graphical construct 3010 of FIG. 7F is 5 7 9 4. Server Response Path 7060 presents exactly the same values in its fields with (X, Y) coordinates 1. (8, 8), 2. (8, 3), 3. (3, 3), 4. (3, 8). Thus, the server proves to user 7080 that it knows Server Path 7050 credential and Server Response Path 7060 credential, so that the server gets authenticated to the user.

Besides preset credentials Server Path 7050 and Server Response Path 7060 shown in the virtual grid 7030, there is one more server credential preset during the user account setup—Grid Watermark Path 7120. A remedy preventing replay attacks is outlined here. Grid 7020 instantiated for this particular session displays the following digital content 4 3 0 8 in the sequence of Grid Watermark fields with (X, Y) coordinates 1. (7, 1), 2. (8, 2), 3. (9, 3), 4. (0, 4). According to FIG. 8A, the Grid Watermark value is also sent to a second channel that can be seen in field 3150 of the "Send To $2^{nd}$ Channel:" menu—this second channel that can be chosen in menu 3230 in FIG. 8A is either smartphone with software token 7130, or hardware token 8010. In either case, the token in hands of the user displays the same digital value 4 3 0 8 as in the Grid Watermark fields on the currently instantiated session-only grid 7020 in the graphical construct 3010 in FIG. 8A that is received from the server. This match of Grid Watermark digital values in both channels is a strong protection against replay attacks. A server is not authenticated to the user, unless there is a complete match of values, and the values mismatch event can be viewed as an intrusion detection. Once the server is positively authenticated to the user, the user can proceed farther and authenticate itself to the server by entering for instance user's password in field 7010 in FIG. 8A, which eventually completes user/server mutual authentication interactive process.

Despite protecting against replay attacks with the Grid Watermark (see 7070, 7120, 3150, 7130, and 8010 in FIG. 8A) out-of-band control, this method of a server authentication to the user requires some improvement as information about Server Path 7050 and Server Response Path 7060 is still present in the same grid, that is in-band, and therefore can be analyzed over a number of authentication sessions leading to both credentials reengineering.

Figure 8B:
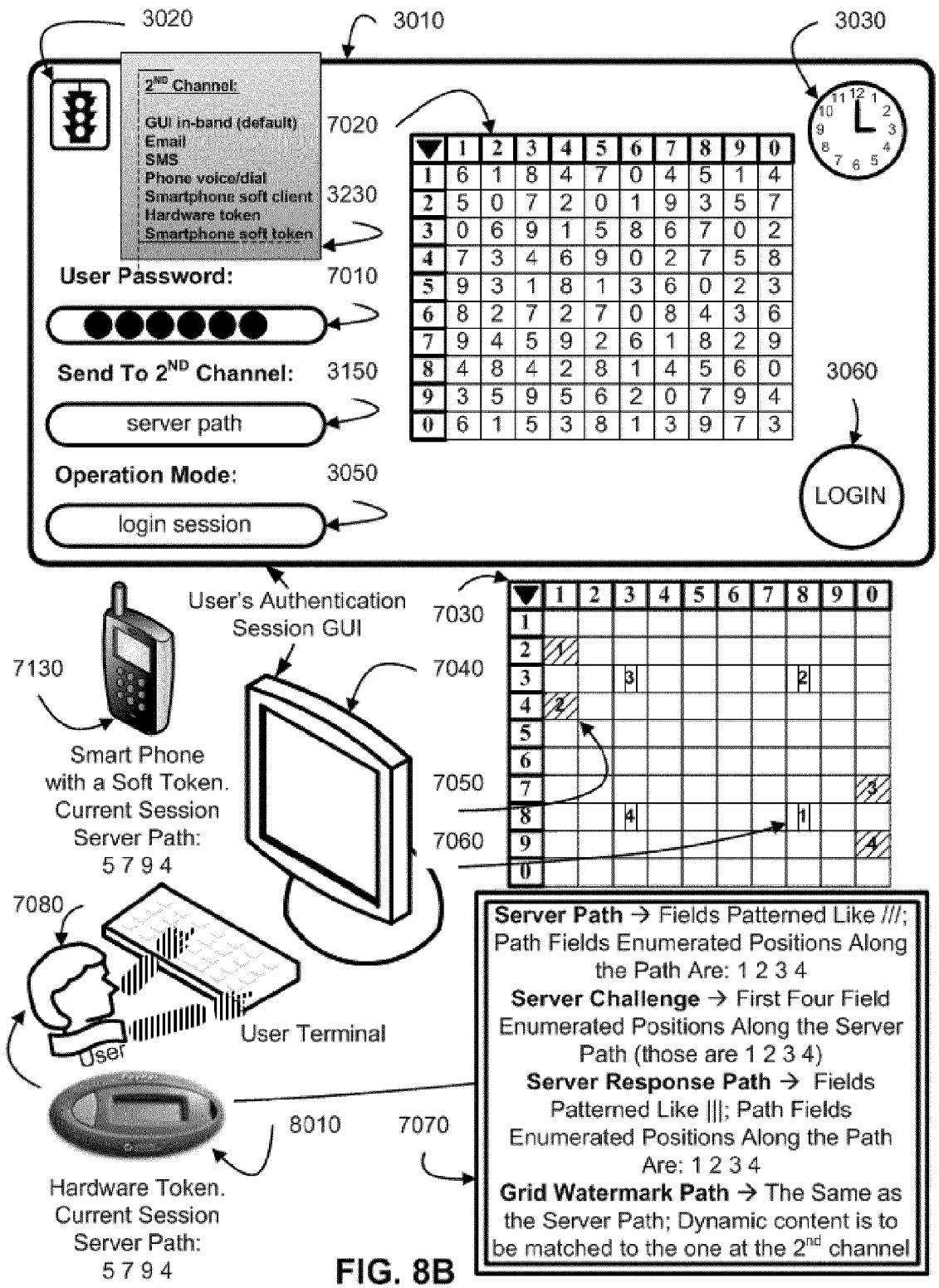
FIG. 8B illustrates a graphical user interface in a desktop or laptop's browser or on a screen supporting the second step of a server to the user out-of-band authentication with a software token in a smartphone as a second channel. The first step (see FIG. 3F) is just the User Name which is sent to a server alone without accompanying it with a Server Challenge. The hidden in the grid shared secret credentials to authenticate the server are Server Path, Server Response Path, and Grid Watermark Path, whereas the Server Challenge is fields' digital content in the first four fields having enumerated positions along the Server Path. Session dynamic content in the fields along the Grid Watermark Path (which is the same in this case as the Server Path) is to be matched to the software token content displayed on the smartphone. Upon successful authentication by the user, his/her password is entered to authenticate the user to the server and to complete user/server mutual authentication in FIG. 7H illustrates a graphical user interface in a desktop or laptop's browser or on a screen supporting the second step of server to the user in-band authentication. The first step (see FIG. 3D) is just the User Name is sent to a server alone without accompanying it with a Server Challenge. The hidden in the grid shared secret credentials to authenticate the server are Server Path, Server Challenge Path, and Server Response Path. Upon successful server authentication by the user, the user's password is entered to authenticate the user to the server and to complete user/server mutual authentication in one of the preferred embodiments of this invention.

FIG. 8B illustrates the case very similar to FIG. 8A with the only difference that there is no a separate Grid Watermark on the virtual grid 7030. The role of a Grid Watermark in this case is taken over by Server Path 7050 for the sake of usability improvement. Indeed, user 7080 has to remember only two pattern-based credentials presented in 7070 in FIG. 8B. One can see that the digital content in Server Path fields with coordinates (X, Y) along the Server Path 1. (1, 2), 2. (1, 4), 3. (0, 7), 4. (0, 9), which is according to currently instantiated grid 7020 in FIG. 8B is equal to 5 7 9 4. As it is shown in FIG. 8B, the Grid Watermark value is also sent to a second channel that can be seen in field 3150 of the "Send To $2^{nd}$ Channel:" menu—this second channel that can be chosen in menu 3230 in FIG. 8B is either smartphone with software token 7130, or hardware token 8010. In either case, the token in hands of the user displays the same digital value 5 7 9 4 as in the Grid Watermark fields on the currently instantiated session-only grid 7020 in the graphical construct 3010 in FIG. 8B that is received from the server. This match requirement of Grid Watermark digital values in both channels is a strong protection against replay attacks. A server is not authenticated to the user, unless there is a complete match of all digit values, and the values mismatch event can be viewed as an intrusion detection. Once the server is positively authenticated to the user, the user can proceed further and authenticate itself to the server by entering for instance user's password in field 7010 in FIG. 8B, which eventually completes user/server mutual authentication interactive process.

It is relevant here to make a general note about Grid Watermarks. In all in-band cases watermark fields can have different background colors—their overall pattern is a shared secret. Because it is a background color, each field has a character (a digit) inside as well. In in-band cases these digits may not have any special meaning, unless a watermark and a server path are coincided. In other words, it is the same path for both functions. However, in out-of-band cases a watermark path for examples described herein can be any of the following combinations of contents: (i) just background color of path fields, (ii) just digital content, and (iii) is a combination of (i) and (ii).

Despite protecting against replay attacks with the Grid Watermark (see 7070, 7120, 3150, 7130, and 8010 in FIG. 8B) out-of-band control, this method of a server authentication to the user requires some improvement as information about Server Path 7050 and Server Response Path 7060 is still present in the same grid, that is in-band, and therefore can be analyzed over a number of authentication sessions leading to both credentials reengineering.

Figure 8C:
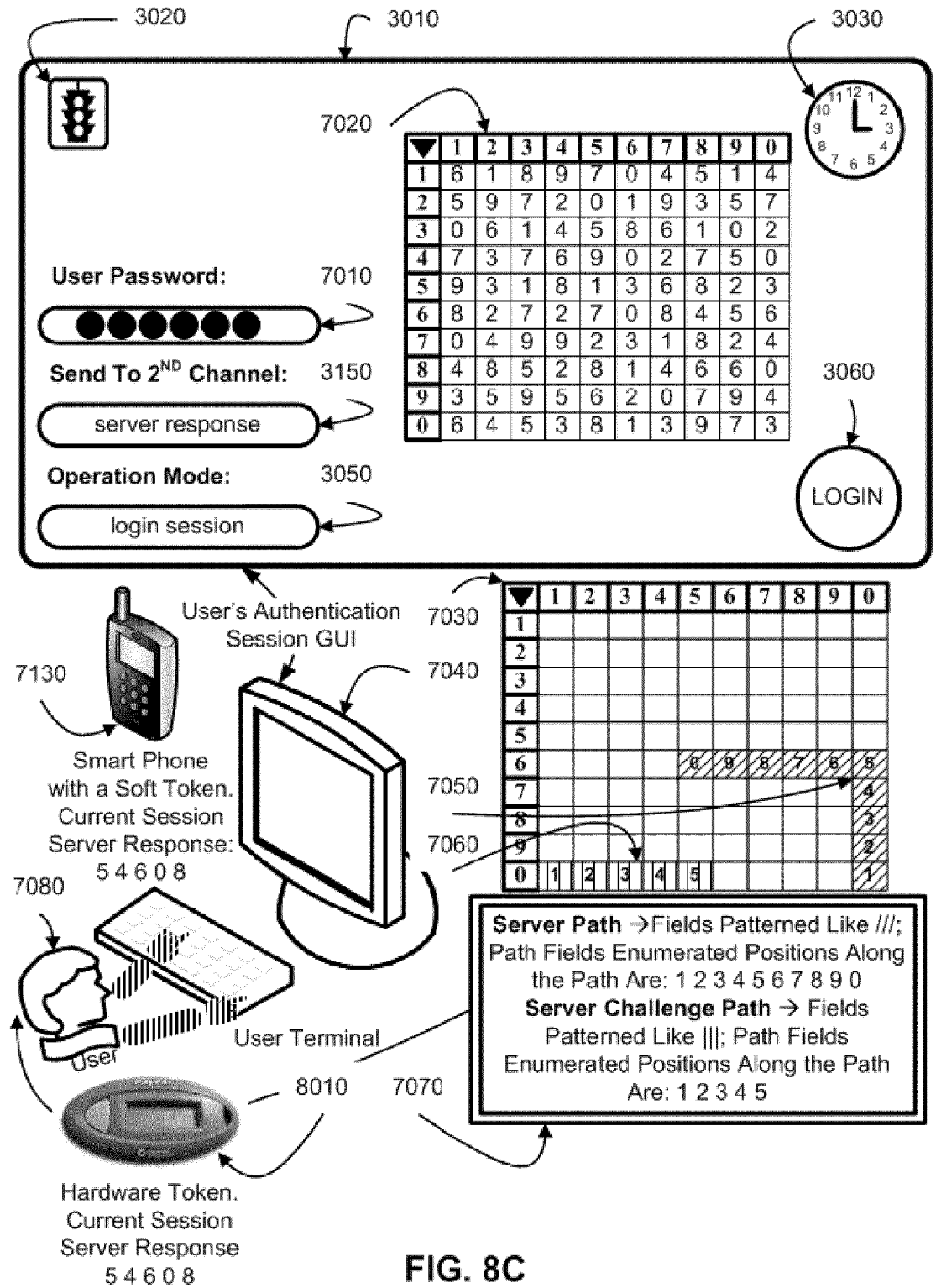
FIG. 8C illustrates a graphical user interface in a desktop or laptop's browser or on a screen supporting the second step of a server to the user out-of-band authentication with a software token in a smartphone as a second channel. The first step (see FIG. 3F) is just the User Name which is sent to a server alone without accompanying it with a Server Challenge. The hidden in the grid shared secret credentials to authenticate the server are the Server Path and the Server Challenge Path, whereas the Server Response is to be matched to the software token content displayed on the smartphone. Upon successful server authentication by the user, his/her password is entered to authenticate the user to the server and to complete user/server mutual authentication in one of the preferred embodiments of this invention.

FIG. 8C illustrates the most secure so far one of the preferred embodiments of this invention for out-of-band server authentication to the user 7080, who has to remember two directed pattern-based credentials Server Path 7050 and Server Challenge Path 7060 in table 7070 on virtual grid 7030. In the case presented in FIG. 8C, the numerical value of the Server Path is delivered to the second channel as it is depicted in field 3150 of "Send To $2^{nd}$ Channel:" menu in graphical construct 3010, and delivered to user 7080 with either smartphone with a software token 7130 or hardware token 8010. First, user 7080 sends to a server just a user name without any session-specific challenge to a server, as in FIG. 3D. Now, it is not something generated by the user, but it is a digital content in the five consecutive fields of Server Challenge 7060 in table 7070 and on virtual grid 7030 ("five" is just a setting selected by the system administrator; instead, it can be any value within a reasonable range, say from three to six). That is the Server Challenge value will be the digital content in the five consecutive fields of the Server Challenge having (X, Y) coordinates 1. (1, 0), 2. (2, 0), 3. (3, 0), 4. (4, 0), 5. (5, 0) and the corresponding value according to the current session grid instantiation 7020 in graphical construct 3010 of FIG. 8C is 6 4 5 3 8. It is important to note that Server Challenge 7060 in grid 7020 is a session-only random value (of OTAC) generated by the server. That is why the role of the Server Challenge is not preventing replay attacks as in FIGS. 8A, 8B but just to enable user 7080 to deduce a one-time authentication response value (the Server Response value or OTAR value deduced from grid 7020 and credentials 7050 and 7060) which has to match the value of Server Response displayed by smartphone software token 7130 or hardware token 8010 in hands of user 7080. Indeed, Server Challenge 7060 value in FIG. 8C as discussed above is 6 4 5 3 8. Each consecutive digit is pointing to particular enumerated field along Server Path with (X, Y) coordinates 1. $6^{th}$ field—(5, 6), 2. $4^{th}$ field—(0, 7), 3. $5^{th}$ field—(0, 6), 4. $3^{rd}$ field—(0, 8), 5. $8^{th}$ field—(7, 6). The digital content value in these fields is 5 4 6 0 8 which is an exact match of the Server Response values displayed by smartphone software token 7130 or hardware token 8010 in hands of user 7080. This match of Grid Watermark digital values in both channels (browser and software token in a smartphone, or browser and hardware token) is a strong protection against replay attacks. A server is not authenticated to the user, unless there is a complete match of all digital values (of every position values), and the values mismatch event can be viewed as an intrusion detection. There is another thing here that is even more or equally important, than protection against the replay attacks. This is the fact of splitting between two channels a session-only grid with the Server Path and the Server Response (or OTAR), which extremely complicates a possibility of reengineering the Server Path by a hacker recording numerous authentication sessions of the same user. Indeed, having the Server Challenge 7060 and Server Path 7050 on the same session-only grid does not shed any light on what the Server Response values should be. Hence, the entropy leakage of Server Path is practically zero, and increasing the number of other sessions to be recorded does not help to reengineer the server credentials 7050 and 7060, unless there is a way to preempt the Server Response value coming through the second channel. Certainly, it is much more complicated for an intruder, than having recorded information about both interrelated credentials like Server Path and Server Response in-band, so that FIG. 8C illustrates a practically very secure out-of-band server authentication to the user. Once the server is positively authenticated to the user, the user can proceed further and authenticate itself to the server by entering for instance user's password in field 7010 in FIG. 8A, which eventually completes user/server mutual authentication interactive process.

Figure 8D:
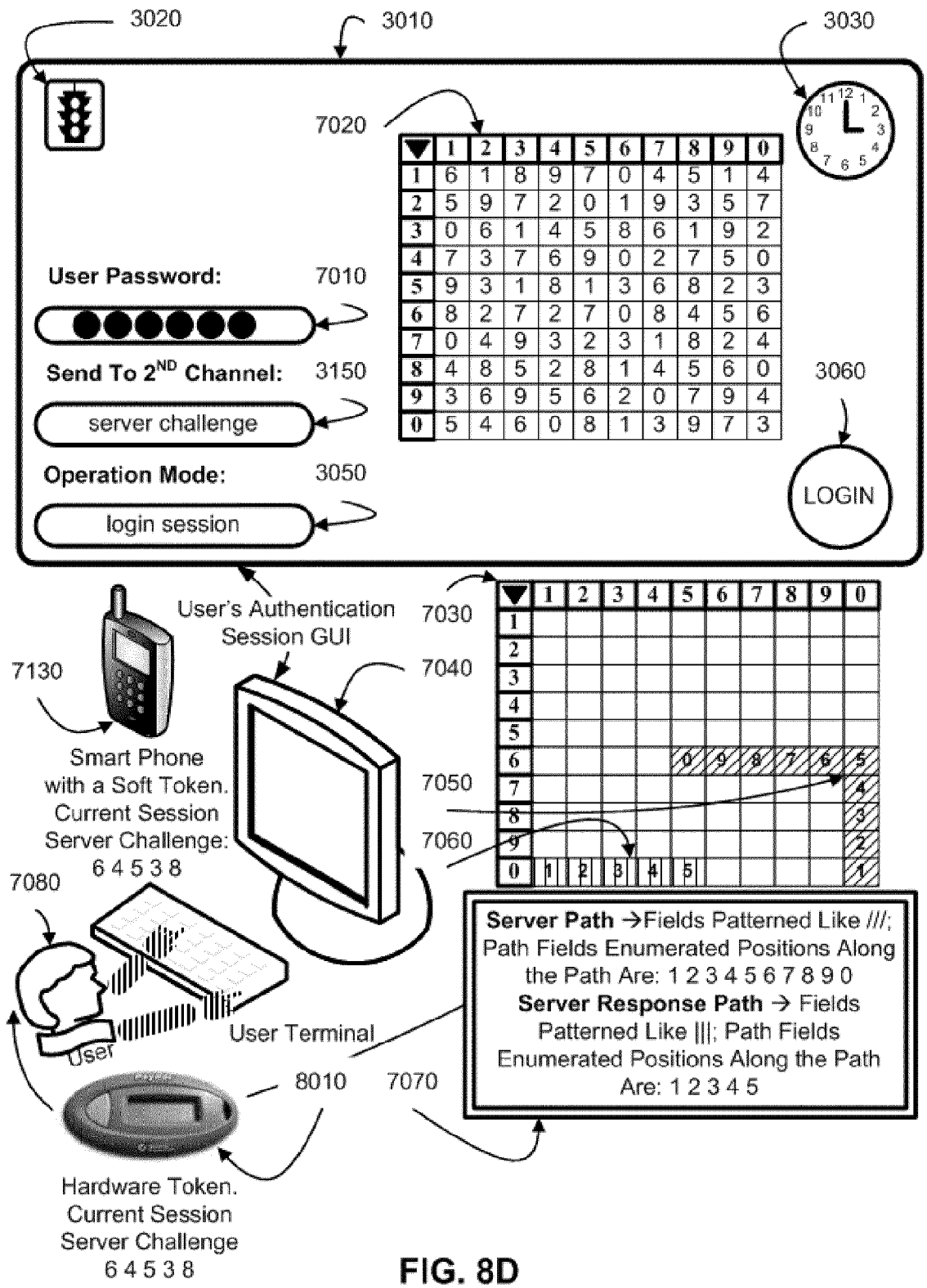
FIG. 8D illustrates a graphical user interface in a desktop or laptop's browser or on a screen supporting the second step of a server to the user out-of-band authentication with a software token on a smartphone or a hardware token as a second channel. The first step (see FIG. 3F) is just the User Name which is sent to a server alone without accompanying it with a Server Challenge. The hidden in the grid shared secret credentials to authenticate the server are the Server Path and the Server Response Path, whereas the Server Challenge is generated by the hardware token or the software token and displayed on the smartphone. Upon successful server authentication by the user, his/her password is entered to authenticate the user to the server and to complete user/server mutual authentication in one of the preferred embodiments of this invention.

FIG. 8D differs from FIG. 8C only in the fact that the Server Challenge and the Server Response swap the channels—now, Software Response Path in table 7070 is displayed in virtual grid 7030 and it is hidden in the grid 7020 in FIG. 8D, whereas Server Challenge is displayed with either a smartphone having inside software token 7130, or hardware token 8010. Certainly, this approach is quite weaker than the technology introduced in FIG. 8C because, despite protecting against replay attacks with the Server Challenge in the second channel of out-of-band control (see 7130, 8010, 3150 in FIG. 8D), this method of a server authentication to the user is vulnerable, as information about Server Path 7050 and Server Response Path 7060 is still present in the same grid 7030 in FIG. 8D, and therefore, can be analyzed over a number of authentication sessions leading to both credentials reengineering.

Figure 8E:
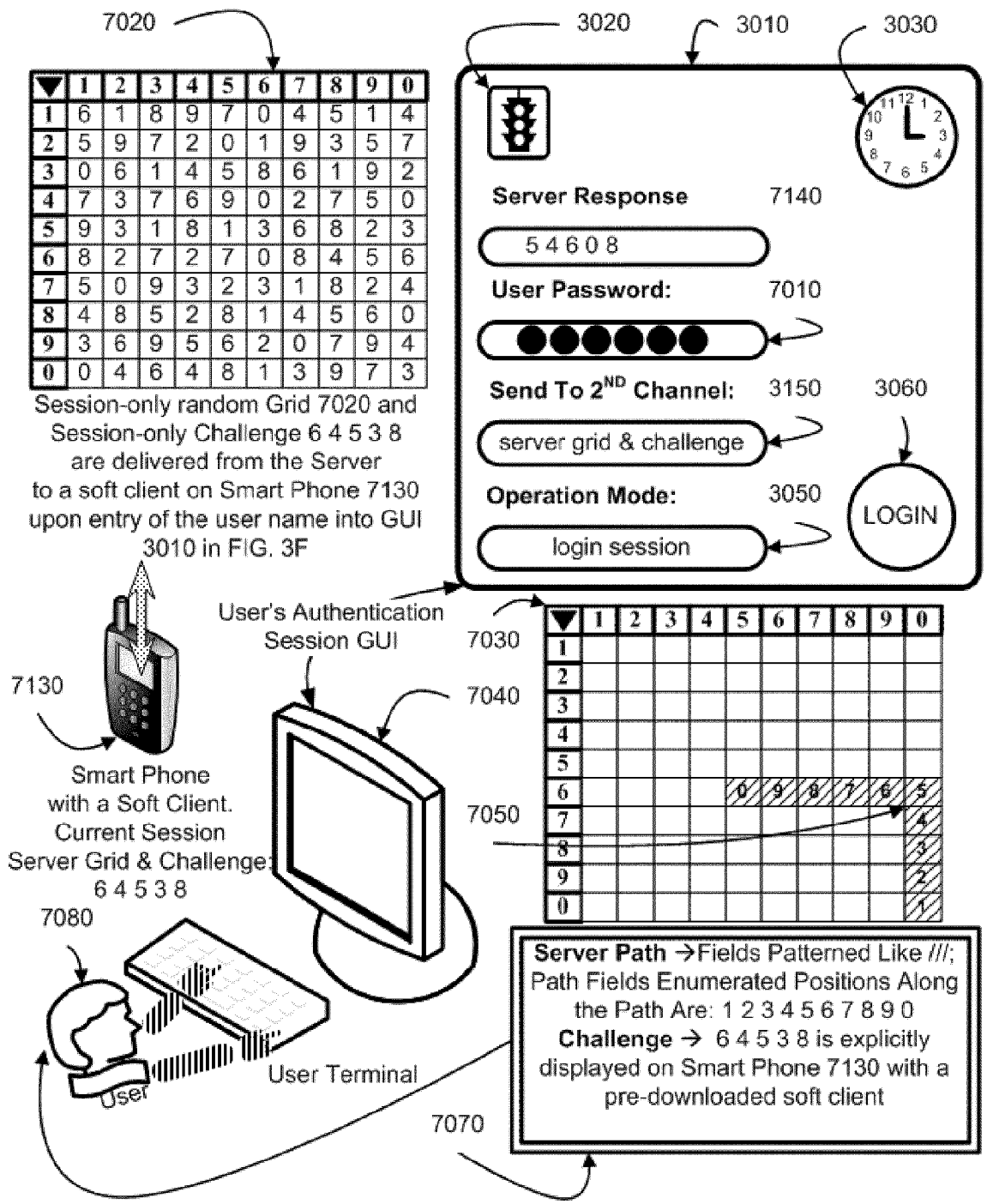
FIG. 8E illustrates a graphical user interface in a desktop or laptop's browser or on a screen supporting the second step of a server to the user out-of-band authentication with a software client in a smartphone as a second channel. The first step (see FIG. 3C) is just the User Name which is sent to a server alone without accompanying it with a Server Challenge. The hidden in the grid shared secret credential to authenticate the server is the Server Path, while both the grid and the session-only authentication challenge are generated by the software client and displayed in the smartphone. Meanwhile, the Server Response is explicitly displayed in the graphical user interface in a desktop or laptop's browser or on a screen, and the Server Response is supposed to match to the one derived from the smartphone display. Upon successful server authentication by the user, his/her password is entered to authenticate the user to the server and to complete user/server mutual authentication in one of the preferred embodiments of this invention.

FIG. 8E displays the most secure so far preferred embodiment of this invention where user name in field 3040 is sent to a server as it is presented in FIG. 3C (note, that field 3150 of "Send To the 2$^{nd}$ Channel:" menu is set to 'smartphone & soft client' in FIG. 3C). Then the server, having recognized the user name, initiates a session-only encrypted messages exchange according to the client/server (machine-to-machine) authentication protocol with the user's smartphone client 7130 in FIG. 8E. This communication results in user 7080 being able to view session-only grid 7020 containing hidden Server Path 7050, while the Server Challenge value 6 4 5 3 8 is explicitly shown on the smartphone with software client 7130 display. Concurrently, the graphical construct 3010 in FIG. 8E is sent from the server to the user's 7080 browser or login screen. This construct has Server Response field 7140, and for the current session in FIG. 8E the value of Server Response placed in field 7140 in GUI is 5 4 6 0 8.

The Server Challenge value 6 4 5 3 8, displayed on smartphone with a software client 7130, points to enumerated Server Path 7050 fields having (X, Y) coordinates 1. 6$^{th}$ field (9, 6), 2. 4$^{th}$ field (0, 7), 3. 5$^{th}$ field (0, 6), 4. 3$^{rd}$ field (0, 8), 5. 8$^{th}$ field (7, 6), and having the following digital content in the very same fields 5 4 6 0 8 which is matching completely with the value displayed in GUI 3010 field 7140. This is an unequivocal proof of the server authentication to the user without any opportunity for a replay attack or Server Path credential reengineering by a hacker. A server is not authenticated to the user, unless there is a complete match of digital values in each considered position, and the values mismatch event can be viewed as an intrusion detection. There is another thing here that is even more or equally important than protection against the replay attacks. This is the fact of splitting between two channels a session-only grid with the Server Path and the Server Response (or OTAR), which extremely complicates a possibility of reengineering the Server Path by a hacker recording numerous authentication sessions of the same user. Indeed, having Server Response 7140 at any given authentication session does not shed any light on what the Server Response values should be next time or what is Server Path in table 7070 and virtual grid 7030.

Hence, the entropy leakage of Server Path is practically zero, and increasing the number of other sessions to be recorded does not help to reengineer server credentials, unless there is a way to preempt the Server Challenge and the grid value coming through the second channel. Certainly, it is much more complicated option for an intruder as compared to recording and then analyzing numerous sessions with both credentials in-band, so that FIG. 8E illustrates a practically very secure out-of-band server authentication to the user. Once the server is positively authenticated to the user, the user can proceed further and authenticate oneself to the server by entering for instance user's password in field 7010 in FIG. 8A, which eventually completes user/server mutual authentication interactive process.

RPSSR Algorithms Applicability for In- and Out-of-Band Solutions

So far, only a server to the user authentication preferred embodiments based on Random Partial Digitized Path Recognition (RPDPR; and RPDPR-SC, SC stands for a Secret Challenge) algorithm have been described. The reason why there are no embodiments in the text of Random Partial PIN/Password Recognition (RPPPR) algorithm or Random Partial Pattern Recognition (RPPR) is because they are not providing good enough opportunity for an in-band solution preserving a low entropy leakage. For instance, look at a password-based server credential like HalfMoonBay: PASSWORD: HalfMoonBay Password Character Enumerated Positions:

| H | a | l | f | M | o | o | n | B | a | y |
|---|---|---|---|---|---|---|---|---|---|---|
| 1 | 2 | 3 | 4 | 5 | 6 | 7 | 8 | 9 | 10 | 11 |

Let's say the user sends a challenge to a server:
OTAC: 6 2 8 5
Then, the server would reply in-band:
OTAC: 6 2 8 5
OTAR: o a n M Intruder recording the session would know right away four alphanumeric characters out of eleven character password and their particular positions in the password. The number of all possible combinations by various four characters in eleven character password is 330 (considering permutations in four character groups, it is 7,920) but the fear is that it might happen that all characters will be exposed with their positions in few login sessions, though the probability of such an event is quite low. For example: 1. OTAC: 1234, 2. OTAC: 5678, 3. OTAC: 12910, in which case the entropy leakage on an average is 33% per session (even if it is 5%-10%, it is desirable to do better than that by having a guard band against targeted intruding attacks of the same user over a number of server to the user authentication sessions).

However, if the same example is extended to out-of-band server authentication to the user, it would work fine. Indeed, let's say the user sees OTAR: o a n M in the user's mobile device (email or SMS) along with the OTAC: 6 2 8 5 in the browser. The user will quickly authenticate the server but an intruder does not see the authentication response, so that the entropy leakage is very low and RPPPR is working just fine. Then, the question is as to why one would need RPPPR if a full password seems to be applicable as well. The answer is that a password is not good because in a case if the mobile device is stolen or preempted for a while, the intruder will have a good opportunity to reengineer the password by initiating a couple of authentication sessions.

Similar analysis being applied for the Random Partial Pattern Recognition algorithm (RPPR) speaks in favor of this algorithm for out-of-band server to the user authentication as well. So that all Random Partial Shared Secret Recognition algorithms are applicable for out-of-band case, whereas only RPDPR and RPDPR-SC are also well applicable for the in-band solutions (the most attractive cases).

Unique Aspects of a Server to the User Authentication Method

Having described above the most preferred embodiments of the present invention, it is appropriate here to briefly outline the unique aspects of the server-to-user authentication method allowing the user controlled protection against phishing, pharming, and guessing attacks aimed at stealing user credentials:

Random Partial Shared Secret Recognition (RPSSR) authentication algorithms and particularly the Random Partial Digitized Path Recognition (RPDPR) algorithm allow to partition server credentials on a number of credential components that can have either a digital value only, or having both—a digital value and a hidden path (a directed pattern) presence on a virtual session-only grid.

That allows performing several important things like sending different components in- and out-of-band, and/or presenting those components in-band, while they have either a hidden path (a directed pattern) presence in a grid or just a displayed in a GUI digital value of these components. Essentially it provides rich opportunities to design various authentication schemes having low entropy leakage for server credentials while preserving their high combinatorial capacity.

A possibility to make any credential component like for instance, a Server Challenge, or a Server Response, or a Grid Watermark to be made in various authentication schemes either just digital values, without any graphical presence on a grid, or presenting them as graphical paths on a grid, similar to a Server Path, which effectively permits to increase a number of authentication credentials from one to two hidden in a grid credentials, or even to three and four credentials, all being as important and necessary to know by the user as a Server Path. This provides a design option to elevate a one-factor authentication to a multi-factor server-to-user authentication scheme.

User controlled/generated credential components values like for instance, Server Challenge, Server Response, or Grid Watermark sent to the server as a first step provide ample opportunities to design server-to-user authentication schemes preventing replay attacks.

The unique feature of this technology is the fact that despite the server credentials are hidden in the session-only grid, the user does not need to perform any physical instruction, for example, hit buttons on a keyboard, or click on any elements of a GUI to exercise cognitive recognition of a positive or negative server authentication to the user, which preserves low entropy leakage of server credentials.

Session-only grid with hidden server credentials having a graphical path presentation on a grid and one of the server credentials like for instance a Server Response, or a Server Challenge having a digital value form only can be split between "what user knows" and "what user has" out-of-band channels, whereas intruder preemption of any of these channels or both of them at the same time do not lead to the key server credential (Server Path) loss. Meanwhile, out-of-band server authentication to the user provides the highest security against replay, phishing, pharming, and guessing attacks.

Network and Hardware Resources

Figure 9A:
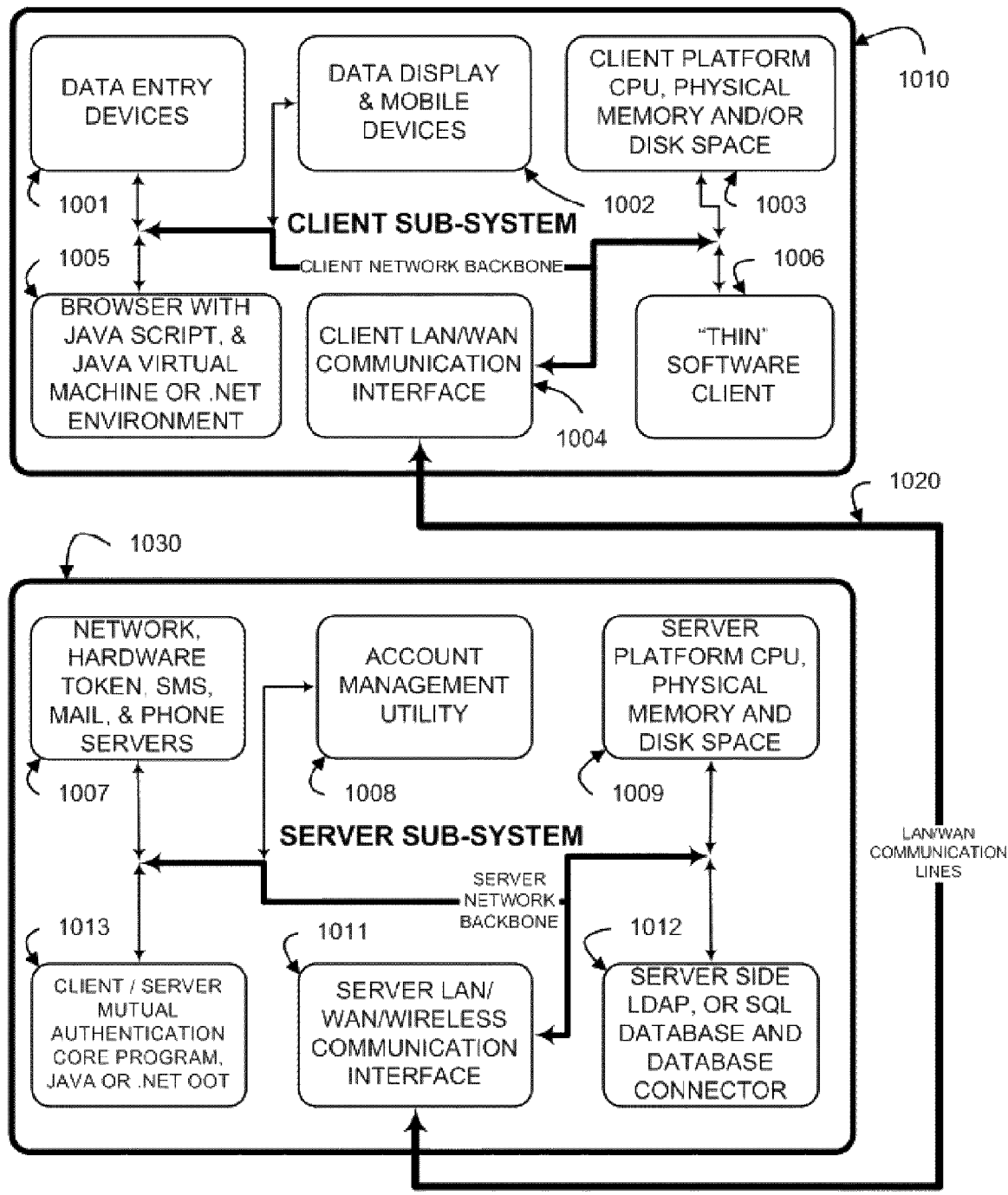
FIG. 9A is a basic architecture diagram for one of the preferred embodiments of a client-server system according to the present invention, including support for the user mutual authentication to a server, which is an authentication process utilizing one (in-band) communication channel (like a channel established using an Internet browser) for interactive client-server authentication session.

FIG. 9A illustrates a basic architecture of an embodiment of a client-server system according to the present invention, including support for Random Partial Shared Secret Recognition (RPSSR) algorithms like Random Partial Password/PIN Recognition (RPPPR), Random Partial Digitized Path Recognition (RPDPR), Random Partial Digitized Path Recognition with a Secret Challenge (RPDPR-SC), and Random Partial Pattern Recognition (RPPR) user/server mutual authentication protocols for a client-server system including authentication resources according to the RPPPR, RPDPR and RPPR based user/server mutual authentication factors of the present invention. The client subsystem 1010 includes data entry devices 1001 (keyboard, mouse, voice input, etc.), a display device 1002 (CRT, LCD panel, mobile communication device, etc.), and a physical platform 1003 (personal computer, hand held computer, internet appliance, etc.) including a processing unit, memory, and other data processing resources. Software running in the client includes a browser 1005 or a "thin" software client 1006 such as may be provided on personal digital assistants, mobile phones, smartphones, and other simple Internet appliances which may not support full browser functionality. The browser 1005 includes Java Virtual Machine or a NET environment which supports the client-server dialog. Likewise, the "thin" software client 1006 may support the client-server dialog. Finally, an interface 1004 to the network communication media 1030 is provided. The communication media 1030 may be a private or public, local area network or a wide area network using wired, wireless or optical media in representative systems.

The server subsystem 1030 includes network server resources 1007 (for instance, network, hardware tokens, SMS protocol, and mail servers) an account management utility 1008 for the user accounts—subject of the authentication process, and a platform 1009 including a processing unit, memory, disk space and other data processing resources. Core program 1010 supporting the user/server mutual authentication process is included in the server subsystem 1030. The core program may be implemented using Java or NET object-oriented technology for examples. Also, a to server database (or a directory service, such as LDAP) and database connector 1012 is included. Finally, an interface 1011 to communication media for server LAN/WAN communication-lines 1020 is provided. In some embodiments, the server and server data are implemented with security features to protect user account information files from intruders.

Figure 9B:
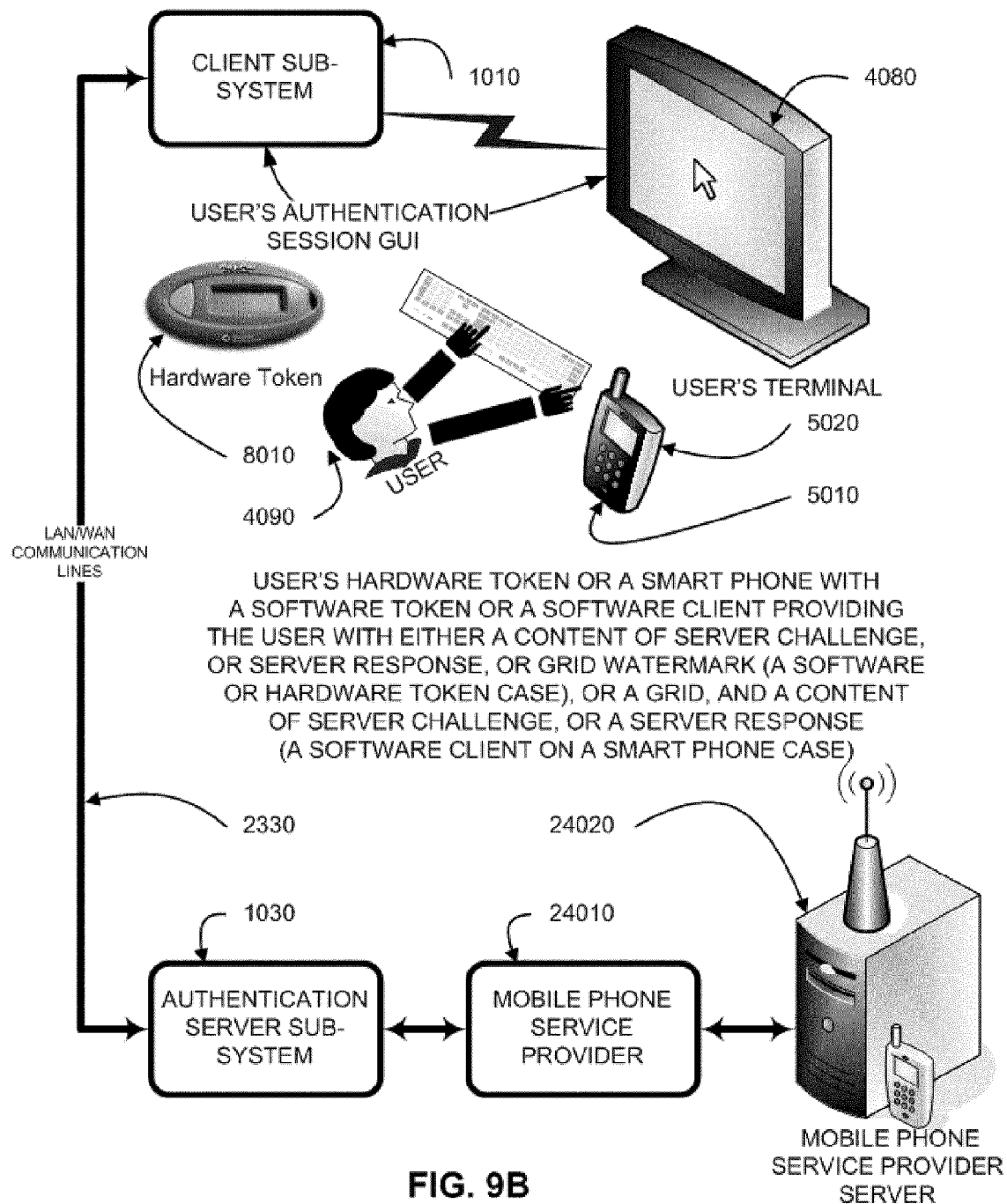
FIG. 9B is a basic architecture diagram for one of the preferred embodiments of a user at a client platform/server system according to the present invention, including support for a Random Partial Digitized Path Recognition (RPDPR) mutual authentication process utilizing two communication channels (like separate channels established using an Internet browser and a mobile communication device like a smartphone pre-downloaded with a software token, or a software client; or a hardware token) to split and deliver to the smartphone either a content of Grid Watermark, or Server Path, or Server Response in a case of a software token, or a hardware token, or a grid and a content of a Server Challenge, or a Software Response in a case of a software client.

FIG. 9B illustrates a basic architecture of an embodiment of a client-server system according to the present invention, including support for Random Partial Shared Secret Recognition (RPSSR) algorithms like Random Partial Password/PIN Recognition (RPPPR), Random Partial Digitized Path Recognition (RPDPR), Random Partial Digitized Path Recognition with a Secret Challenge (RPDPR-SC), and Random Partial Pattern Recognition (RPPR) user/server mutual authentication protocols utilizing two communication channels (such as an Internet browser at terminal 4080 and a personalized mobile communication device 5010 or a personalized hardware token 8010) to split and deliver, for example, a one-time authentication challenge OTAC 5020 and grid 5020 to user's 4090 mobile phone with a software client 5010 or just delivering OTAC to hardware token 8010, and a one-time Server Response or a grid and Server Response to an Internet browser. The two channel processes involve more than one communication channel between server side resources and a user having access to two data processing machines, where the data processing machines may be logical or physical machines. Client sub-system 1010 and server sub-system 1030 along with communication-lines 2330 assure bi-directional message exchange between server 1030 and Internet browser or a screen of user's 4090 desktop or laptop's 2303 terminal 2301 and 4080. Hardware/software token code is time or event synchronized with a token server which is integrated into authentication server sub-system 1030, whereas mobile phone service provider 24010, directed by authentication server sub-system 1030, exchanges encrypted messages resulting in grid and Server Challenge 5020 displayed in user's 4090 mobile phone 5010 through Mobile Phone Service Provider Server 24020. Thus, in the case of a browser on a computer connected via a wired Internet connection, and an application on a cellular telephone having access to a wireless telephone network, the first data processing machine can be said to comprise an application executed on a first processor having an interface to a physical communication medium, and the second data processing machine comprises an application executed on a second processor having an interface to a different physical communication medium. In other embodiments, the first and second data processing machines may share an interface to a physical communication medium, such that the first communication channel comprises a first application layer channel using the physical communication medium, and the second communication channel comprises a second application layer channel using the same physical communication medium. For example in this case, the first data processing machine may comprise a browser executed on a computer while the second data processing machine comprises an e-mail client, or another instantiation of a browser, executed on the same computer. In other embodiments, the first data processing machine comprises a first software application, while the second data processing machine comprises a second software application executed on the same computer, even though they may share the same physical communication medium, or utilize a separate physical communication media coupled to the computer. In general, the first and second data processing machines are characterized by having separately addressable interfaces for communication with the server side resources so that first and second communication channels can be established, so that any party attempting to intercept the authentication session would be required to intercept communications for both of the separately addressable interfaces.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An interactive, computer implemented method for execution by server-side computer resources in a client-server system to authenticate a server to a user at a client platform, comprising:
    storing data defining a graphical representation of a frame of reference adapted for rendering on a display, the frame of reference including a number of pre-defined locations in the frame of reference having coordinates on the frame of reference;
    storing a data set associated with the user in a memory accessible using server-side computer resources, the data set including at least a first shared secret identifying a server path, the server path including a plurality of the pre-defined locations on the frame of reference;
    receiving via data communication, a user identifier from the client platform and initiating a current session;
    presenting via data communications to the client platform a current session instance of the graphical representation of the frame of reference for the current session, the current session instance having characters in the number of pre-defined locations according to a pattern different than used in other sessions with the client;
    sharing between the client platform and the server a challenge for use in the current session identifying a random subset of the plurality of the pre-defined locations in the server path; and
    sharing between the client platform and the server a response distinct from the challenge including characters that match the characters positioned in the random subset of the plurality of the pre-defined locations in the server path, wherein the response for use in the current session is produced by the server and delivered to the client platform;
    whereby the user at the client platform is capable of verifying that the server has access to the first shared secret identifying the server path.

2. The method of claim 1, including:
    storing a second shared secret associated with the user in a memory accessible using server-side computer resources, the second shared secret identifying a response path including a plurality of the pre-defined locations on the frame of reference, in which characters in the response path in the current session instance comprise the response.

3. The method of claim 1, including:
    storing an additional shared secret associated with the user in a memory accessible using server-side computer resources, the additional shared secret identifying a watermark path including a plurality of the pre-defined locations on the frame of reference, and in which watermark contents including indicators, such as colors or characters, are positioned in the watermark path in the current session instance.

4. The method of claim 1, including:
    storing a second shared secret associated with the user in a memory accessible using server-side computer resources, the second shared secret identifying a response path including a plurality of the pre-defined locations on the frame of reference, in which characters in the response path in the current session instance comprise the response; and
    storing a third shared secret associated with the user in a memory accessible using server-side computer resources, the third shared secret identifying a challenge path including a plurality of the pre-defined locations on the frame of reference, in which characters in the challenge path in the current session instance comprise the challenge.

5. The method of claim 4, wherein locations in the plurality of pre-defined locations in the challenge path are embedded in the server path.

6. The method of claim 1, including:
storing a second shared secret associated with the user in a memory accessible using server-side computer resources, the second shared secret identifying a challenge path including a plurality of the pre-defined locations on the frame of reference, in which characters in the challenge path in the current session instance comprise the challenge.

7. The method of claim 1, wherein the user has access to, and the client platform includes, a first data processing machine and a second data processing machine, and including:
receiving the data communication including the user identifier via data communication on a first channel from the first data processing machine, and wherein the sharing of at least one of the challenge and the response is carried out outside the first channel using the second data processing machine.

8. The method of claim 1, wherein the user has access to, and the client platform includes, a first data processing machine and a second data processing machine, and including
storing an additional shared secret associated with the user in a memory accessible using server-side computer resources, the additional shared secret identifying a watermark path including a plurality of the pre-defined locations on the frame of reference, and in which watermark contents including indicators such as colors or pre-defined characters are positioned in the watermark path in the current session instance;
receiving the data communication including the user identifier via data communication on a first channel from the first data processing machine; and
sharing data matching the watermark contents with the user outside the first channel using the second data processing machine.

9. The method of claim 8, wherein locations in the plurality of pre-defined locations in the watermark path are embedded in the server path.

10. The method of claim 1, wherein the user has access to, and the client platform includes, a first data processing machine and a second data processing machine, and including:
storing a second shared secret associated with the user in a memory accessible using server-side computer resources, the second shared secret identifying a challenge path including a plurality of the pre-defined locations on the frame of reference, in which characters in the challenge path in the current session instance comprise the challenge;
receiving the data communication including the user identifier via data communication on a first channel from the first data processing machine; and
sharing the response with the user outside the first channel using the second data processing machine.

11. The method of claim 1, wherein the user has access to, and the client platform includes, a first data processing machine and a second data processing machine, and including:
storing a second shared secret associated with the user in a memory accessible using server-side computer resources, the second shared secret identifying a response path including a plurality of the pre-defined locations on the frame of reference, in which characters in the response path in the current session instance comprise the response;
receiving the data communication including the user identifier via data communication on a first channel from the first data processing machine; and
sharing the challenge with the user outside the first channel using the second data processing machine.

12. The method of claim 1, wherein the user has access to, and the client platform includes, a first data processing machine and a second data processing machine, and including:
receiving the data communication including the user identifier via data communication on a first channel from the first data processing machine;
presenting the current session instance of the graphical representation of the frame of reference for the current session to the user outside the first channel using the second data processing machine; and
wherein the sharing of at least one of the challenge and the response is carried out by data communications on the first channel using the first data processing machine.

13. The method of claim 12, including sharing the challenge with the user outside the first channel using the second data processing machine; and
wherein sharing the response between the client platform and the server is carried out by data communications on the first channel using the first data processing machine.

14. The method of claim 1, wherein the user has access to, and the client platform includes, a first data processing machine and a second data processing machine, and including:
storing a second shared secret associated with the client in a memory accessible using server-side computer resources, the second shared secret identifying a response path including a plurality of the pre-defined locations on the frame of reference, in which characters in the response path in the current session instance comprise the response; and
storing a third shared secret associated with the client in a memory accessible using server-side computer resources, the third shared secret identifying a challenge path including a plurality of the pre-defined locations on the frame of reference, in which characters in the challenge path in the current session instance comprise the challenge;
storing an additional shared secret associated with the client in a memory accessible using server-side computer resources, the additional shared secret identifying a watermark path including a plurality of the pre-defined locations on the frame of reference, and in which watermark contents including indicators such as colors or pre-defined characters are positioned in the watermark path in the current session instance;
receiving the data communication including the client identifier via data communication on a first channel from the first data processing machine; and
sharing data matching the watermark contents with the client outside the first channel using the second data processing machine.

15. The method of claim 1, including:
after sharing the response and the challenge with the user, initiating an authentication protocol for authentication of the user to the server; and upon authentication of the user to the server, enabling access by the user to a protected resource.

16. The method of claim 1, wherein said characters represent numbers.

17. The method of claim 1, wherein said challenge includes characters produced at the client platform and delivered to the server.

18. The method of claim 1, wherein said challenge includes characters manually generated at the client platform, or manually edited or approved by the user at the client platform, and delivered to the server.

19. The method of claim 1, wherein said current session instance includes a set of characters in shared secret locations, said set of characters comprising the challenge.

20. An authentication system, comprising:
    data processing resources, including a processor, memory and a communication interface;
    data stored in the memory defining a graphical representation of a frame of reference adapted for rendering on a display, the frame of reference including a number of pre-defined locations in the frame of reference having coordinates on the frame of reference;
    a data set associated with a user stored in the memory, the data set including at least a first shared secret identifying a server path, the server path including a plurality of the pre-defined locations on the frame of reference;
    an authentication server adapted for execution by the data processing resources, including
        logic to initiate a current session upon receiving a user identifier from the user at a client platform via the communication interface;
        logic to present via data communications to the user a current session instance of the graphical representation of the frame of reference for the current session, the current session instance having characters in the number of pre-defined locations according to a pattern different than used in other sessions with the user; and
        logic by which a challenge for use in the current session identifying a random subset of the plurality of the pre-defined locations in the server path and a response distinct from the challenge including characters that match the characters positioned in the random subset of the plurality of the pre-defined locations in the server path are shared between the server and the user, wherein the response for use in the current session is produced by the server and delivered to the user, whereby the user is capable of verifying that the server has access to the first shared secret identifying the server path.

21. The authentication system of claim 20, including:
    a second shared secret associated with the user stored in the memory, the second shared secret identifying a response path including a plurality of the pre-defined locations on the frame of reference, in which characters in the response path in the current session instance comprise the response.

22. The authentication system of claim 20, including:
    an additional shared secret associated with the user stored in the memory accessible using server-side computer resources, the additional shared secret identifying a watermark path including a plurality of the pre-defined locations on the frame of reference, and in which watermark contents including indicators, such as colors or characters, are positioned in the watermark path in the current session instance.

23. The authentication system of claim 20, including:
    a second shared secret associated with the user stored in the memory, the second shared secret identifying a response path including a plurality of the pre-defined locations on the frame of reference, in which characters in the response path in the current session instance comprise the response; and
    a third shared secret associated with the user stored in the memory, the third shared secret identifying a challenge path including a plurality of the pre-defined locations on the frame of reference, in which characters in the challenge path in the current session instance comprise the challenge.

24. The authentication system of claim 23, wherein locations in the plurality of pre-defined locations in the challenge path are embedded in the server path.

25. The authentication system of claim 20, including:
    a second shared secret associated with the user stored in the memory, the second shared secret identifying a challenge path including a plurality of the pre-defined locations on the frame of reference, in which characters in the challenge path in the current session instance comprise the challenge.

26. The authentication system of claim 20, wherein the user has access to, and the client platform includes, a first data processing machine and a second data processing machine, and including
    logic to receive the data communication including the user identifier via data communication on a first channel from the first data processing machine, and wherein the logic to share of at least one of the challenge and the response operates outside the first channel using the second data processing machine.

27. The authentication system of claim 20, wherein the user has access to, and the client platform includes, a first data processing machine and a second data processing machine, and including:
    an additional shared secret associated with the user stored in the memory, the additional shared secret identifying a watermark path including a plurality of the pre-defined locations on the frame of reference, and in which watermark contents including indicators such as colors or pre-defined characters are positioned in the watermark path in the current session instance;
    logic to receive the data communication including the user identifier via data communication on a first channel from the first data processing machine; and
    logic to share data matching the watermark contents with the user outside the first channel using the second data processing machine.

28. The authentication system of claim 27, wherein locations in the plurality of pre-defined locations in the watermark path are embedded in the server path.

29. The authentication system of claim 20, wherein the user has access to, and the client platform includes, a first data processing machine and a second data processing machine, and including:
    a second shared secret associated with the user stored in the memory, the second shared secret identifying a challenge path including a plurality of the pre-defined locations on the frame of reference, in which characters in the challenge path in the current session instance comprise the challenge;
    logic to receive the data communication including the user identifier via data communication on a first channel from the first data processing machine; and the logic by which the response is shared between the user and the server operates outside the first channel using the second data processing machine.

30. The authentication system of claim 20, wherein the user has access to, and the client platform includes, a first data processing machine and a second data processing machine, and including:
a second shared secret associated with the user stored in the memory, the second shared secret identifying a response path including a plurality of the pre-defined locations on the frame of reference, in which characters in the response path in the current session instance comprise the response;
logic to receive the data communication including the user identifier via data communication on a first channel from the first data processing machine; and
the logic by which the challenge is shared between the user and the server operates outside the first channel using the second data processing machine.

31. The authentication system of claim 20, wherein the user has access to, and the client platform includes, a first data processing machine and a second data processing machine, and including:
logic to receive the data communication including the user identifier via data communication on a first channel from the first data processing machine; and
logic to present the current session instance of the graphical representation of the frame of reference for the current session to the user outside the first channel using the second data processing machine;
wherein the logic by which at least one of the challenge and the response is shared between the server and the user operates by data communications on the first channel using the first data processing machine.

32. The authentication system of claim 31, wherein the logic by which the challenge is shared between the user and the server operates outside the first channel using second data processing machine; and
the logic by which the response is shared between the user and the server operates by data communications on the first channel using the first data processing machine.

33. The authentication system of claim 20, wherein the user has access to, and the client platform includes, a first data processing machine and a second data processing machine, and including:
a second shared secret associated with the user stored in the memory, the second shared secret identifying a response path including a plurality of the pre-defined locations on the frame of reference, in which characters in the response path in the current session instance comprise the response;
a third shared secret associated with the user stored in the memory, the third shared secret identifying a challenge path including a plurality of the pre-defined locations on the frame of reference, in which characters in the challenge path in the current session instance comprise the challenge;
an additional shared secret associated with the user stored in the memory, the additional shared secret identifying a watermark path including a plurality of the pre-defined locations on the frame of reference, and in which watermark contents including indicators such as colors or pre-defined characters are positioned in the watermark path in the current session instance;
logic to receive the data communication including the user identifier via data communication on a first channel from the first data processing machine; and logic to share data matching the watermark contents between the server and the user outside the first channel using the second data processing machine.

34. The authentication system of claim 20, including logic to execute an authentication protocol to authenticate the user to the server after executing the logic to present the current session instance to the user; and upon authentication of the user to the server, to enable access by the user to a protected resource.

35. The authentication system of claim 20, wherein said characters represent numbers.

36. The authentication system of claim 20, wherein said challenge includes characters produced at the client platform and delivered to the server.

37. The authentication system of claim 20, wherein said challenge includes characters manually generated at the client platform, or manually edited or approved by the user at the client platform, and delivered to the server.

38. The authentication system of claim 20, wherein said current session instance includes a set of characters in shared secret locations, said set of characters comprising the challenge.

39. A computer program product comprising a non-transitory machine readable data storage medium storing a computer program executable to perform a protocol enabling authentication of a server by a user at a client platform, the protocol including:
storing data defining a graphical representation of a frame of reference adapted for rendering on a display, the frame of reference including a number of pre-defined locations in the frame of reference having coordinates on the frame of reference;
storing a data set associated with the user in a memory accessible using server-side computer resources, the data set including at least a first shared secret identifying a server path, the server path including a plurality of the pre-defined locations on the frame of reference;
receiving via data communication, a user identifier from the user and initiating a current session;
presenting via data communications to the user a current session instance of the graphical representation of the frame of reference for the current session, the current session instance having characters in the number of pre-defined locations according to a pattern different than used in other sessions with the user;
sharing between the user and the server a challenge for use in the current session identifying a random subset of the plurality of the pre-defined locations in the server path; and
sharing between the user and the server a response distinct from the challenge including characters that match the characters positioned in the random subset of the plurality of the pre-defined locations in the server path, wherein the response for use in the current session is produced by the server and delivered to the user;
whereby the user is capable of verifying that the server has access to the first shared secret identifying the server path.

40. The computer program product of claim 39, wherein said challenge includes characters produced at the client platform and delivered to the server.

41. The computer program product of claim 39, wherein said challenge includes characters manually generated at the client platform, or manually edited or approved by the user at the client platform, and delivered to the server.

42. The computer program product of claim 39, wherein said current session instance includes a set of characters in shared secret locations, said set of characters comprising the challenge.

\* \* \* \* \*